(12) United States Patent
Smith

(10) Patent No.: US 8,708,629 B2
(45) Date of Patent: *Apr. 29, 2014

(54) THREAD CLAMPING DEVICE

(76) Inventor: Ronald A. Smith, Los Gatos, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 13/385,135

(22) Filed: Feb. 3, 2012

(65) Prior Publication Data

US 2012/0134764 A1 May 31, 2012

Related U.S. Application Data

(63) Continuation-in-part of application No. 11/667,604, filed on May 11, 2007, now Pat. No. 8,257,004.

(60) Provisional application No. 61/462,599, filed on Feb. 4, 2011.

(51) Int. Cl.
*F16B 37/08* (2006.01)
*F16B 39/36* (2006.01)

(52) U.S. Cl.
CPC .................................. *F16B 37/0857* (2013.01)
USPC ............................................ 411/267; 411/433

(58) Field of Classification Search
USPC ................. 411/265–267, 270, 433; 24/136 R
See application file for complete search history.

(56) References Cited

U.S. PATENT DOCUMENTS

| | | | | | |
|---|---|---|---|---|---|
| 1,475,907 | A | * | 11/1923 | Volman | 411/433 |
| 2,367,480 | A | * | 1/1945 | Beswick | 411/433 |
| 3,695,139 | A | * | 10/1972 | Howe | 411/432 |
| 4,071,158 | A | * | 1/1978 | Maheu | 220/3.2 |
| 4,378,187 | A | * | 3/1983 | Fullerton | 411/267 |
| 4,930,961 | A | * | 6/1990 | Weis | 411/266 |
| 5,015,023 | A | * | 5/1991 | Hall | 294/102.1 |
| 8,257,004 | B2 | * | 9/2012 | Smith | 411/265 |

* cited by examiner

*Primary Examiner* — Flemming Saether
(74) *Attorney, Agent, or Firm* — George Wolten, Jr.

(57) ABSTRACT

The present invention relates to a thread clamping device including a plurality of movable nut segments around a threaded rod, and spring members flexibly holding the segments against the rod. The thread clamping device has a structure adapted to accommodate substantially planar outer surfaces of the segments engaging planar surfaces of the end housing of the device, leading to a more robust device and improved performance. Such a thread clamping device can advantageously be used as a component of a self-adjusting shrinkage compensation device, a coupler for threaded rods, hold-downs, among other uses. Various embodiments of the thread clamping device include a multi nut configuration, a quick release, and including mechanical or magnetic clip attachments.

5 Claims, 60 Drawing Sheets

THREAD CLAMPING DEVICE

CROSS-REFERENCE TO RELATED APPLICATIONS

This application is a continuation-in-part of our application Ser. No. 11/667,604 filed May 11, 2007, now U.S. Pat. No. 8,257,004, that claims priority from provisional patent applications 60/629,664 and 60/724,173, and claims priority therefrom. This application also claims priority from provisional patent application Ser. No. 61/462,599 filed Feb. 4, 2011. The entire contents of all aforesaid patent applications are incorporated herein by reference for all purposes.

BACKGROUND OF THE INVENTION

1. Field of Invention

This invention relates generally to the field of fastening devices and methods of use, more particularly, to threaded fasteners and thread clamping devices capable of motion along a threaded rod in one direction without rotation but requires rotation for motion along the threaded rod in the opposite direction.

2. Description of the Prior Art

Wood is a major construction material in many places throughout the world. Wooden structures frequently use "tie-downs" to secure the wooden structure to its foundation, typically a concrete foundation. The function of tie-downs is thus to secure the wooden structure to its foundation in the presence of forces (perhaps substantial forces) tending to separate the structure from its foundation, such as high winds, seismic events or general shifting and settling of the surrounding earth. However, the wood typically used for construction often has considerable water content when initially installed and with time, the water evaporates and the wood dries out. In the process of drying out, the wood dimensionally shrinks. Approximately 4% shrinkage in the first year following construction of a wooden structure is not uncommon. This shrinkage commonly causes tie-downs to loosen, thereby making the structure more susceptible to damaging displacements in the presence of high winds, earthquakes among other external forces. Catastrophic damage may result.

A common method for implementing a tie-down is by imbedding a vertical threaded rod into the concrete of the foundation at the location where the wooden structure is to be joined to the foundation. The threaded rod generally resides within the walls of a single or multilevel structure as it passes from the concrete foundation up through each floor of the structure. Each floor is typically attached to the threaded rod by a separate tie-down. The primary fastener presently used to implement a tie-down is a standard "hex" nut.

If a standard nut is used, a space will typically develop under the standard nut and above the wood as the wood shrinks in dimension due to loss of water as described above. This space allows the tie-down (and structure) to move vertically when an overturning moment is applied to the structure as might occur, for example, during a seismic event, wind loading, among other circumstances. This motion of the structure with respect to the foundation, in turn, allows for deformation of the structural walls and may produce substantial damage that the tie-down is designed to prevent when functioning properly, that is when holding the structure securely in place on the foundation. Thus, a need exists in the art for a tie-down that is self-compensating, that is, a tie-down that maintains secure attachment of the structure to the foundation despite shrinkage of the wood.

As described in detail below, various embodiments of the present invention relate to thread clamping devices that include movable segments or "nut segments." Some distinguishing characteristics of some embodiments of the present invention relate to flat (or planar) surfaces on the nut segments contacting flat surfaces on the top and/or end housings of the thread clamping device. Other shrinkage compensation devices having moveable segments include those of Sasaki (U.S. Pat. No. 5,081,811) and Taneichi (U.S. Pat. No. 6,007,284). Related art includes the following U.S. Pat. Nos. 3,695,139; 4,378,187; 4,974,888; 5,324,150; 5,427,488; 5,733,084; 5,988,965; 6,361,260; 6,406,240. However, these devices use frustoconical surfaces to support the nut segments. That is, the surfaces of the nut segment and the surface(s) of the housing that the nut segment is matched against are both conical. This is a disadvantageous structure since (among other reasons) two conical surfaces only match exactly at a single position and at any other position the two surfaces contact only at lines and points. This typically causes high stress concentrations along the lines and points of contact. Also, as the two non-planar surfaces slide relative to one another in a radial direction, the two surfaces are forced apart. This causes non-linear motion of the segments and can cause the segments to jam within the supporting top and bottom structures if sufficient clearance is not allowed. The flat surfaces employed on various embodiments of the present invention reduce or avoid these problems by employing flat surfaces and a structure such that no conical surfaces engage one another. These flat surfaces allow linear segment motion and are easily guided as they move between minimum and maximum radial positions. Also, the use of flat surfaces causes the stress loads to be distributed over the entire flat surface area and thus the local stresses remain relatively low within the thread clamping device pursuant to various embodiments of the present invention. This is true even when sufficient forces are applied so as to force the rod engaged by the thread clamping device to fail in tension.

In addition, a major construction cost is often the cost of labor. Therefore, installation of tie-downs in a manner that reduces labor costs is advantageous. For example, one common requirement when installing tie-downs is that threaded rods be connected together end to end. This is generally accomplished with a machined component having internal threads matching the threaded rod. Often, the threaded rod that comes out of the foundation of the structure is of very short length and another threaded rod is connected to this short rod using a connector. The connector is first turned and threaded onto the projecting end of rod protruding from the foundation and a second rod joined to the first by means of the connector. This requirement to connect two threaded rods is fairly common worldwide, and not specific to the construction industry. This process of connecting two rods, most often performed manually, is time consuming and labor intensive. Thus, a need exists in the art for devices and procedures for the efficient and rapid connection of threaded rods.

SUMMARY OF THE INVENTION

Accordingly and advantageously the present invention relates to thread clamping devices including as a component thereof nut segments having flat surfaces that engage corresponding surfaces of the device's end housing and top housing. This flat-against-flat structure provides advantages in strength, stability and durability among other advantages. Such thread clamping devices can be combined with other structures to provide a self-adjusting shrinkage compensation device, couplers for threaded rods, among other devices. Methods of employing such thread clamping devices are also described.

In view of the foregoing, in accordance with the various embodiments of the present invention, there is provided a Thread Clamping Device ("TCD") which may be advantageously configured pursuant to some embodiments of the present invention to move axially along a threaded rod in one direction without rotation, and further, will not move axially in the opposite direction without rotation. Indeed, in one embodiment, the TCD when combined with a bracket or bearing plate may become a "tie-down" for use in construction or for other purposes.

A bearing plate to distribute the load and to prevent medium crushing is typically attached to the shrinking medium (such as wood) using any convenient attaching means such as traditional screws, nails, rivets, adhesives, among others. The bearing plate is typically sandwiched between the TCD and the shrinking medium. That is, the bearing plate is located between the TCD and the shrinking medium. For typical wooden construction, a threaded rod protrudes vertically from a concrete foundation and upwards through components of the wooden structure such as a wooden wall top plate for single level construction or floor plate for the above floors in multilevel construction. Thus, the TCD is "on" the rod above the bearing plate (where "on" denotes having the rod passing through the TCD and engaging therewith substantially as depicted in FIG. 1). In this manner, as shrinkage of the wood occurs, the screws typically attaching the TCD to the top plate or floor plate would pull the TCD downward with respect to the threaded rod. Each time the TCD moves at least one half (½) thread downward, the TCD pursuant to some embodiments of the present invention has a structure that permits the TCD to internally ratchet and lock in place, thus preventing the TCD from moving upward with respect to the threaded rod (where the threaded rod itself cannot move as one end is buried in concrete during the construction process). Thus, the TCD maintains a tight tie-down despite shrinkage.

Additionally, in some embodiments of the present invention, a coupler comprising two TCDs is incorporated into a single package, back to back, to couple ends of two opposing threaded rods. Moreover, in yet other embodiments of the present invention, a quick release mechanism is included within the TCD which allows for fast and convenient release of TCD engagement from the threaded rod. Additionally, further embodiments of the present invention relate to methods of attachment of a TCD to commercially available "hold-downs". Hold-downs attach to the shrinking medium (such as wood) and provide substantially the same load distribution function as a bearing plate. Mechanical and magnetic attachment methods of TCD to hold-downs are described.

Additionally, another advantage of the TCD over a traditional hex nut is that the TCD is capable of successfully engaging a damaged threaded rod, even when a substantial portion of the threads of the rod have been deformed or contaminated with material (such as concrete) to the point where the standard hex nut will jam.

These and other features and advantages of the present invention will be understood upon consideration of the following detailed description of the invention and the accompanying drawings.

BRIEF DESCRIPTION OF THE DRAWINGS

To facilitate understanding, identical reference numerals have been used, where possible, to designate identical elements that are common to the figures. The drawings herein are schematic, not to scale and the relative dimensions of various elements in the drawings are not to scale.

Some of the drawings depict threaded structures having internal threads, external threads or both. An artifact in the drawing program produces threads whose depiction in the figures may appear as lacking the true spiral structure of actual threads, although the thread profile is properly depicted. However, the threads are depicted herein for purposes of explaining various structures, embodiments and/or other features or uses in connection with the present invention, and the possible apparent absence of spirals in the depiction does not affect the description of the invention.

Figure 1:
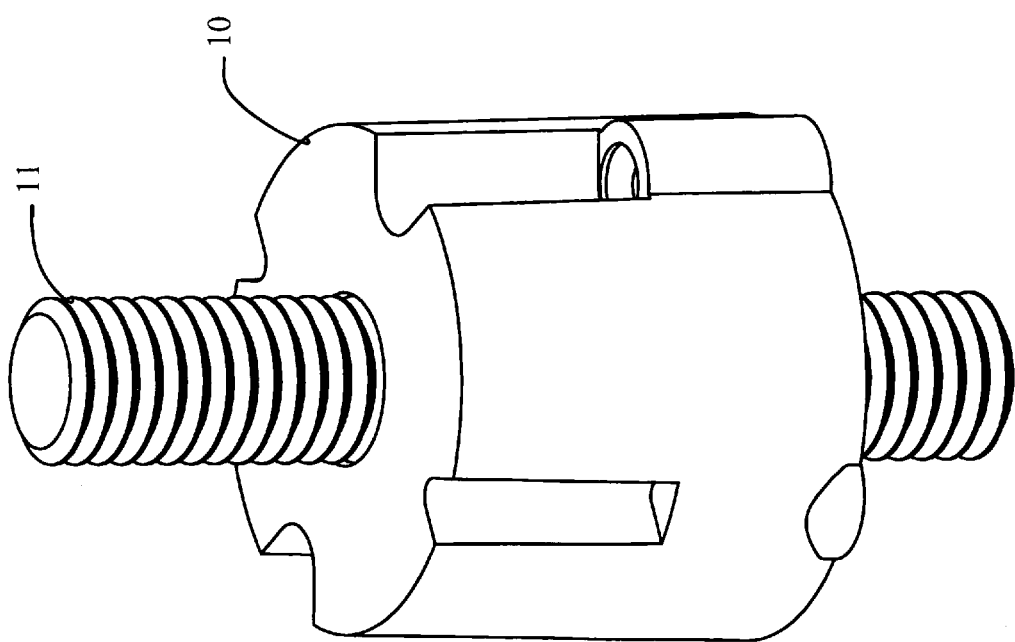

The techniques of the present invention can readily be understood by considering the following detailed description in conjunction with the accompanying drawings, in which:

FIG. 1 is a perspective view of a typical thread clamping device (TCD) and threaded rod.

Figure 2:
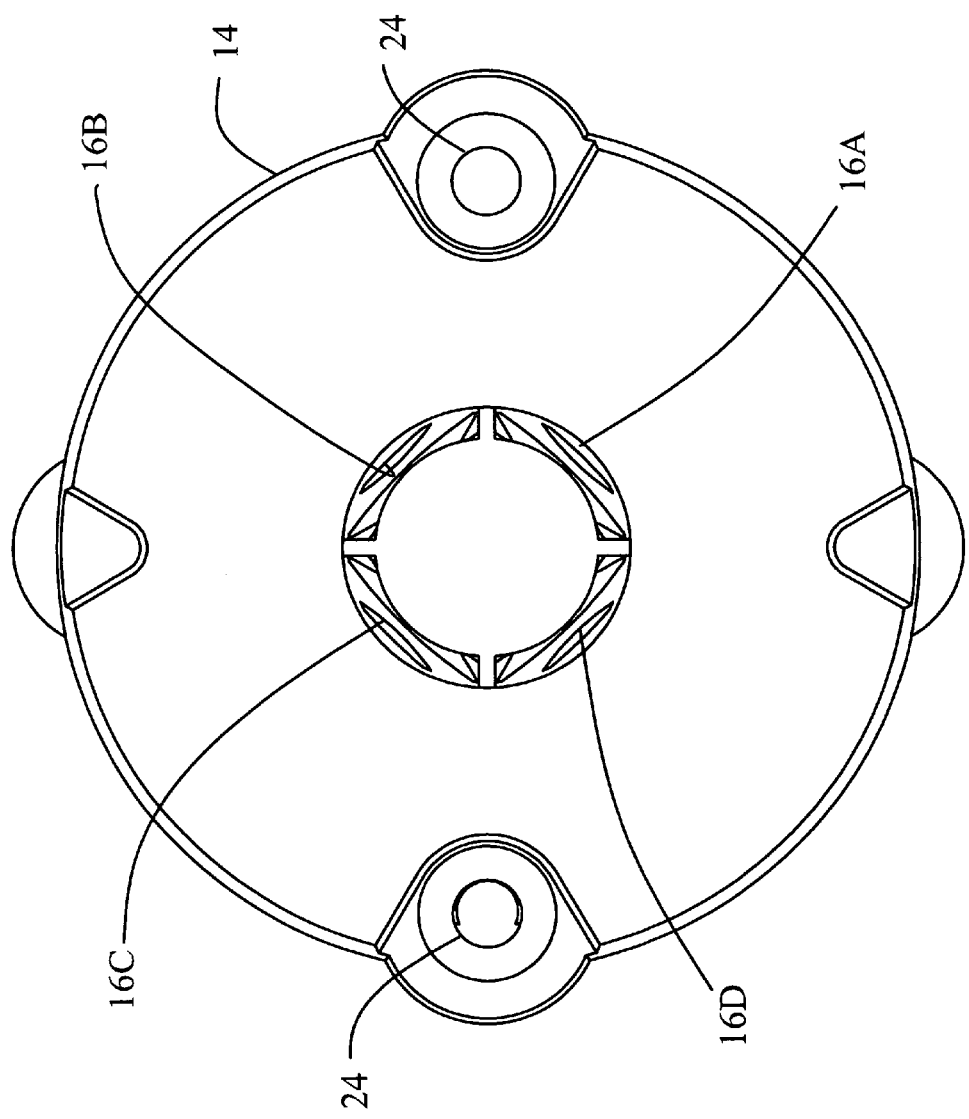

FIG. 2 is a top view of a typical TCD.

Figure 3:
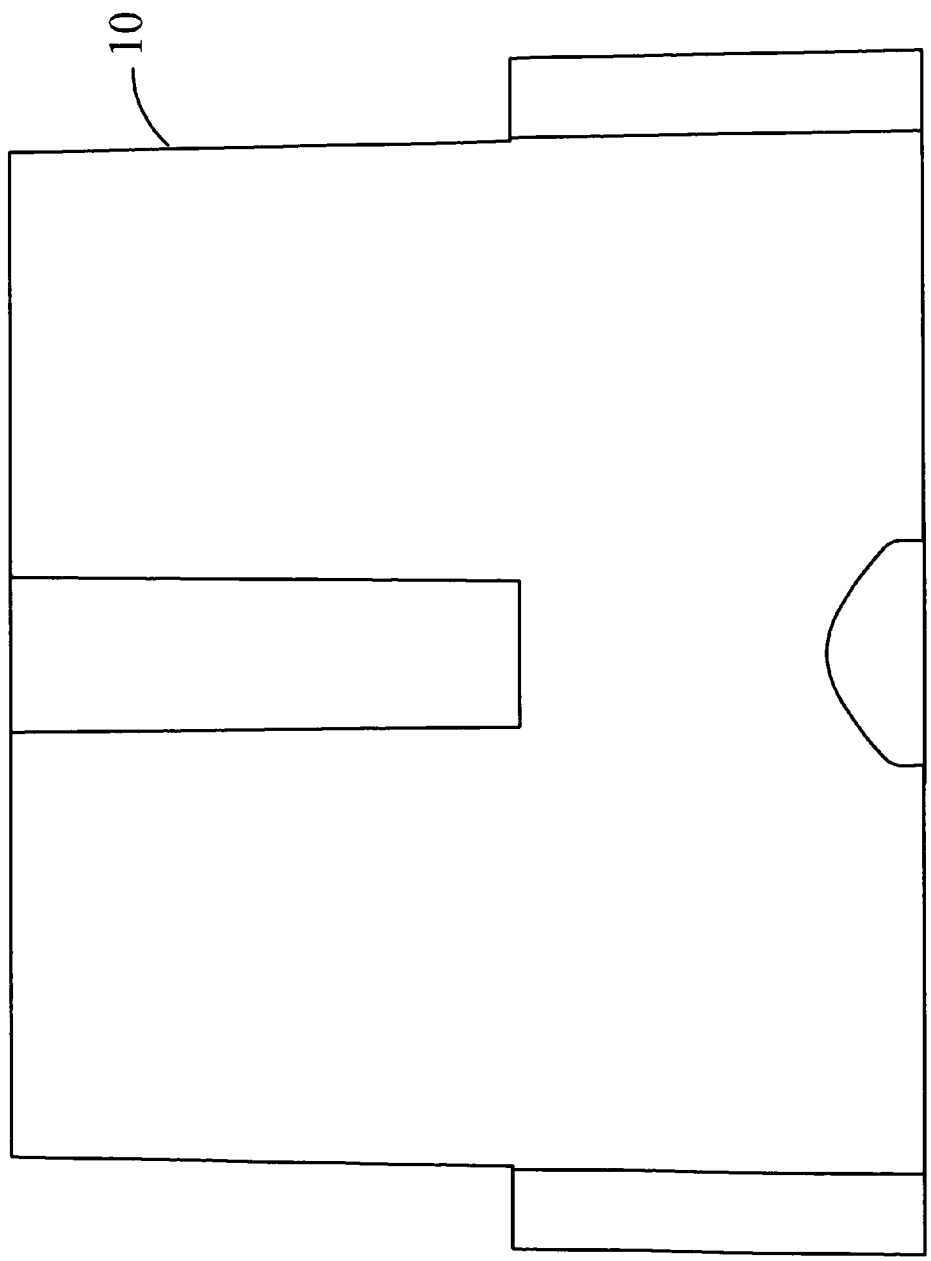

FIG. 3 is a first side view of a typical TCD.

Figure 4:
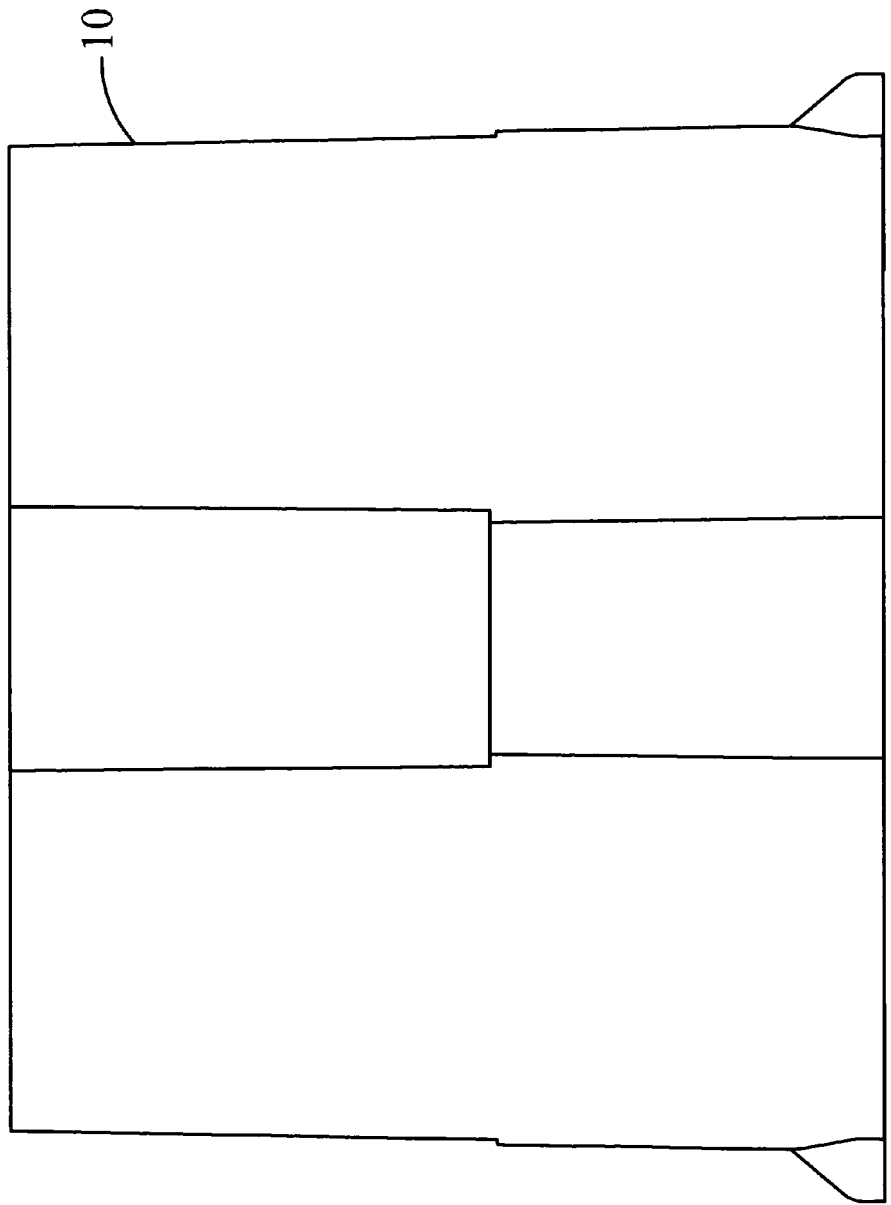

FIG. 4 is a second side view of a typical TCD.

Figure 5:
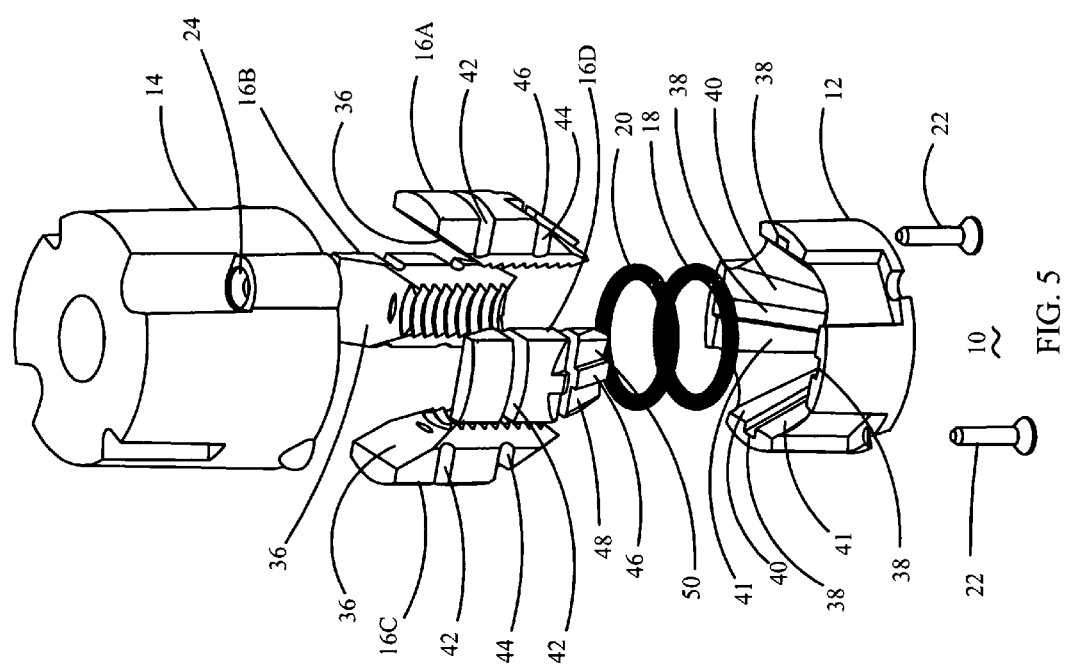

FIG. 5 is a top perspective three dimensional view of a typical TCD disassembled.

Figure 6:
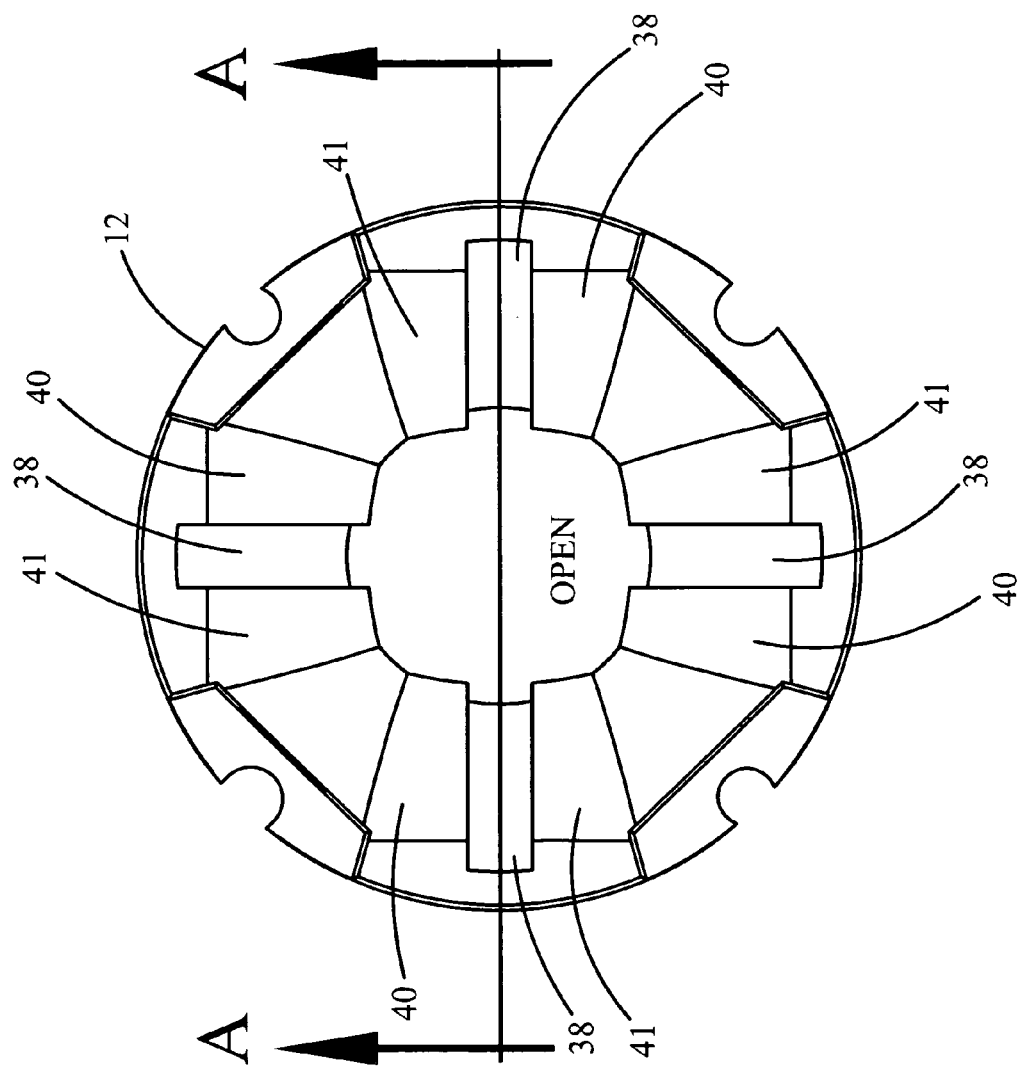

FIG. 6 is a top view of a typical end housing.

Figure 7:
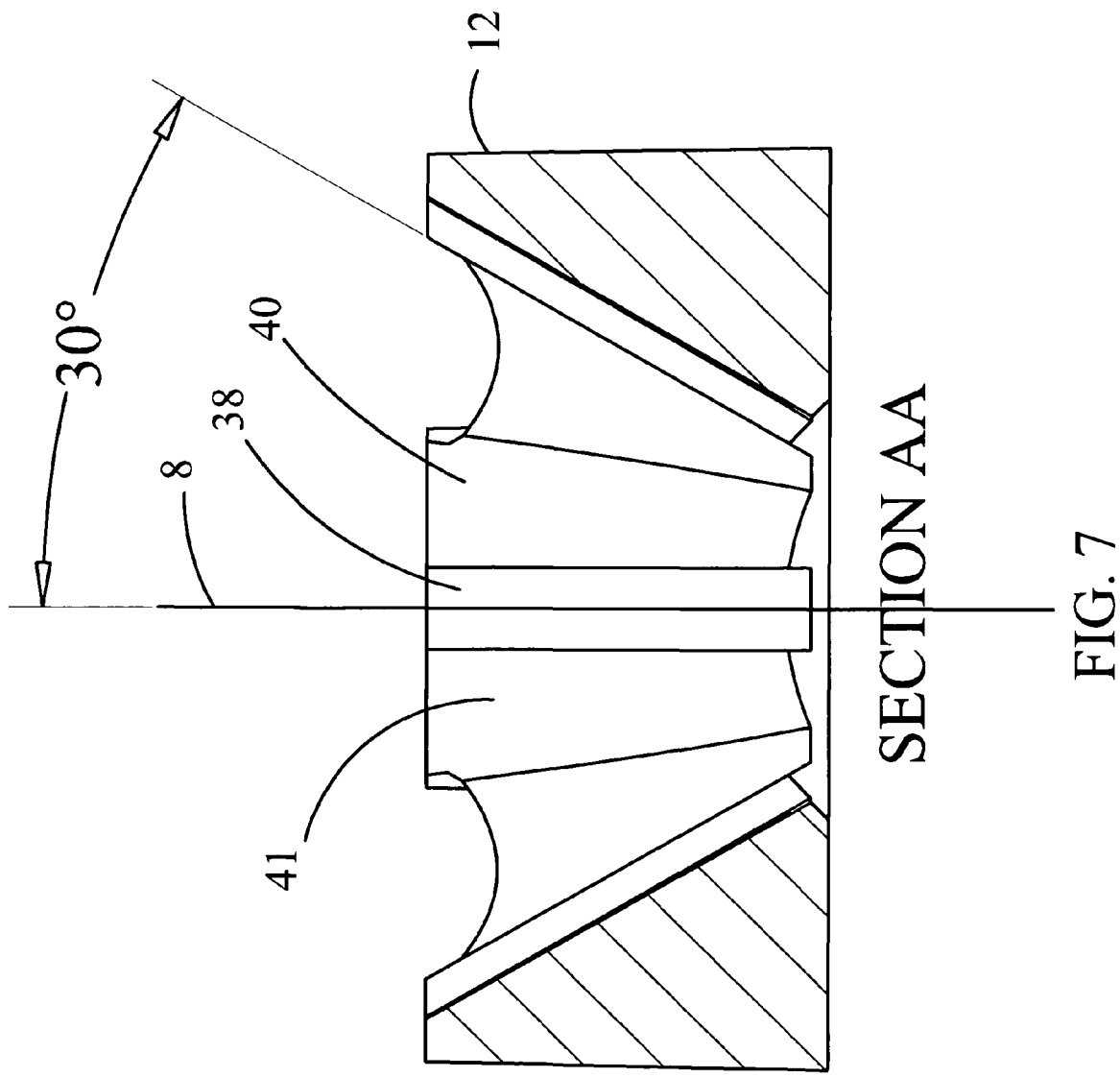

FIG. 7 is a vertical sectional view of the end housing substantially along line A-A of FIG. 6.

Figure 8:
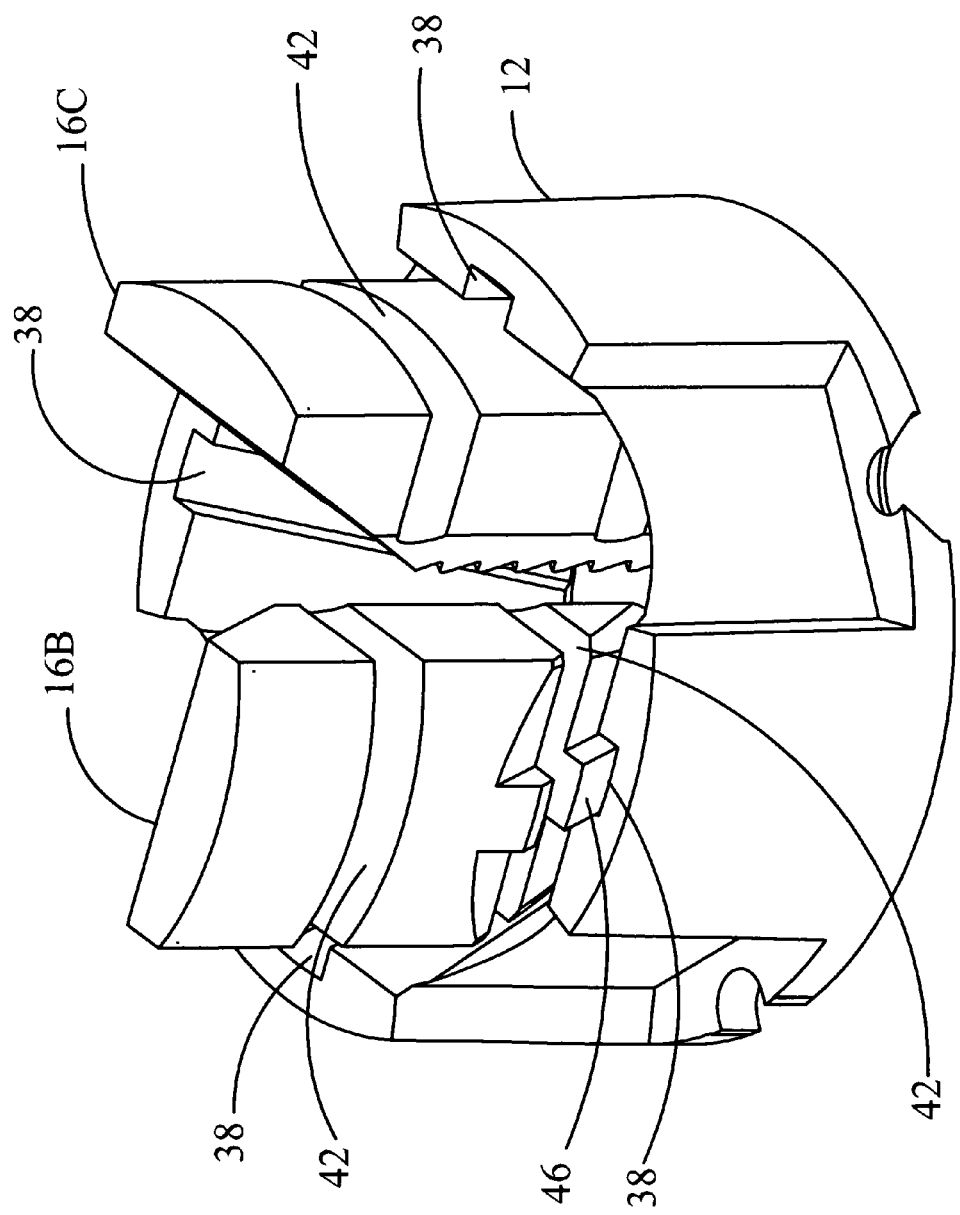

FIG. 8 is a three dimensional top perspective view of a typical end housing depicting segments in different positions.

Figure 9:
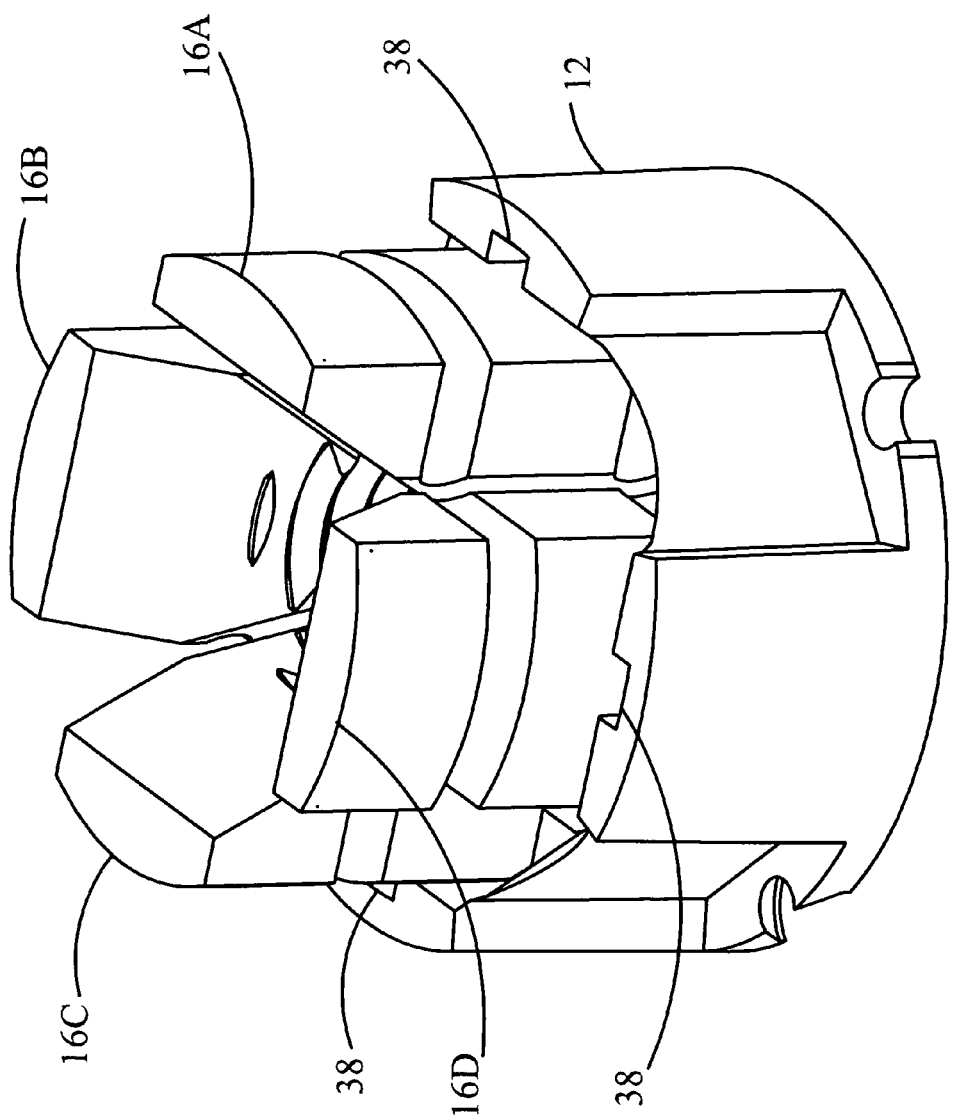

FIG. 9 is a three dimensional top perspective view of a typical end housing and four segments in the engaged position.

Figure 10:
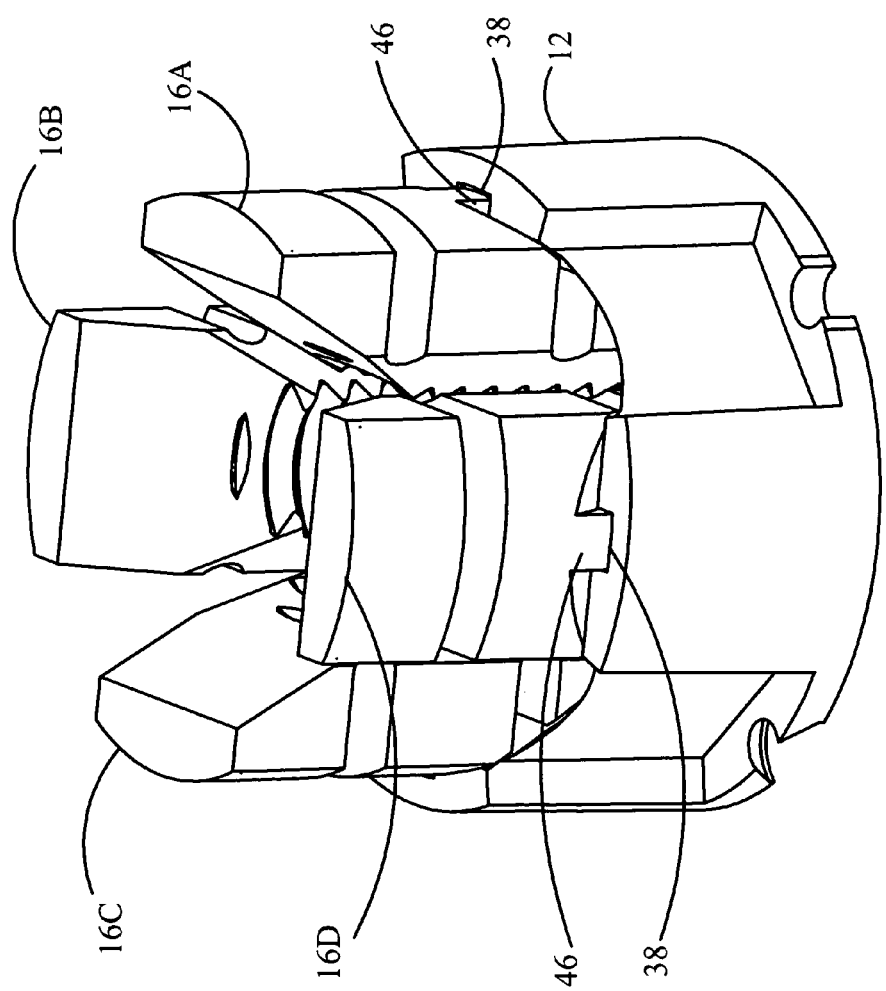

FIG. 10 is a three dimensional top perspective view of a typical end housing and four segments in the disengaged position.

Figure 11:
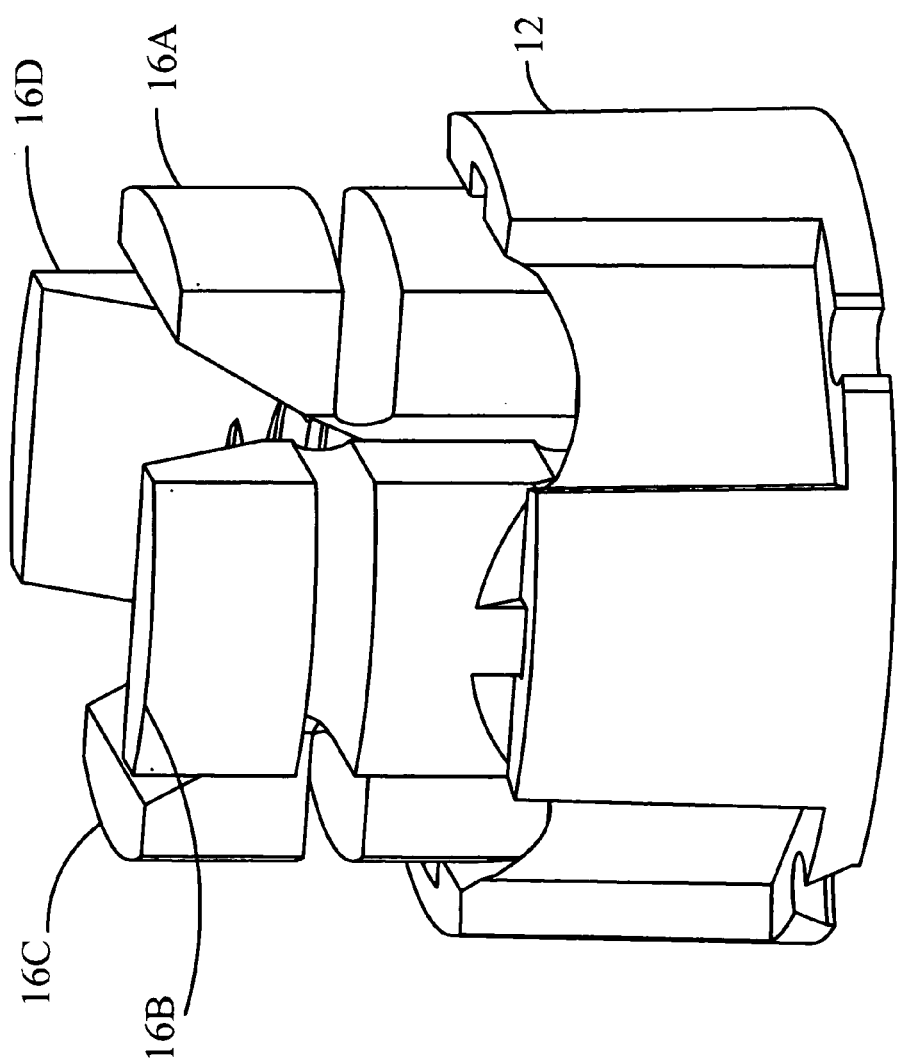

FIG. 11 is a three dimensional top perspective view of a typical end housing and four segments.

Figure 12:
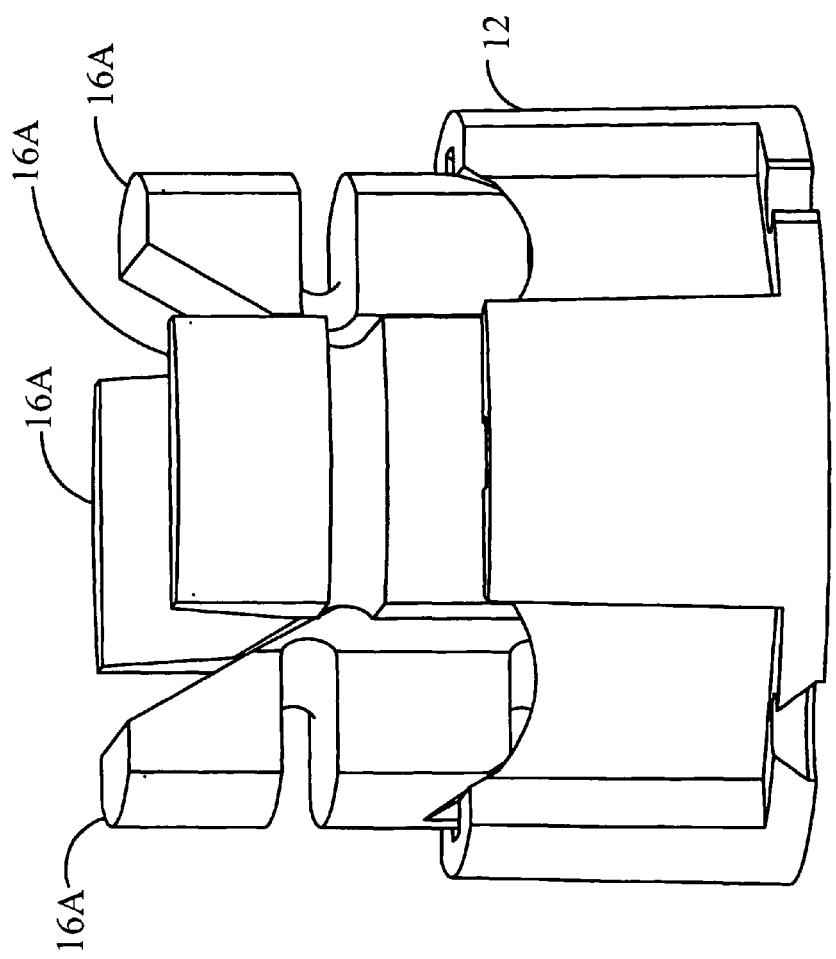

FIG. 12 is a three dimensional top perspective view of a typical end housing and four segments of identical threaded phase.

Figure 13:
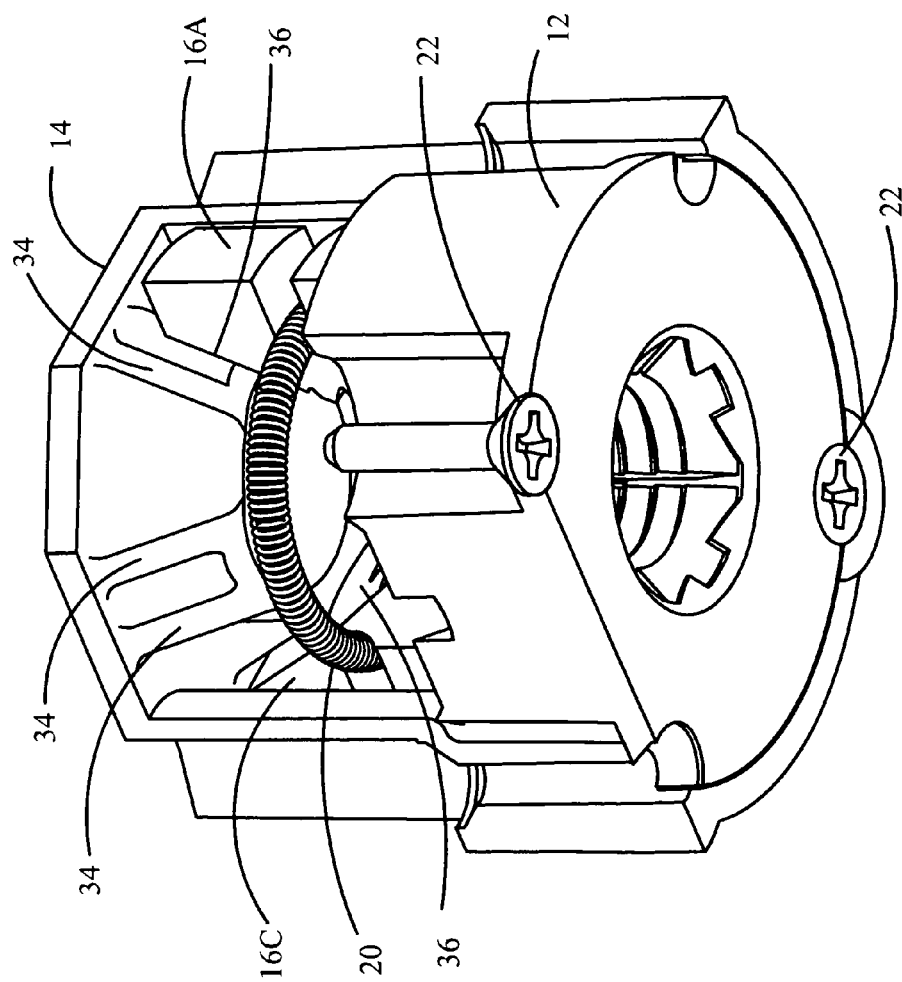

FIG. 13 is a bottom perspective view of a typical TCD with top housing partially removed to reveal internal components.

Figure 14:
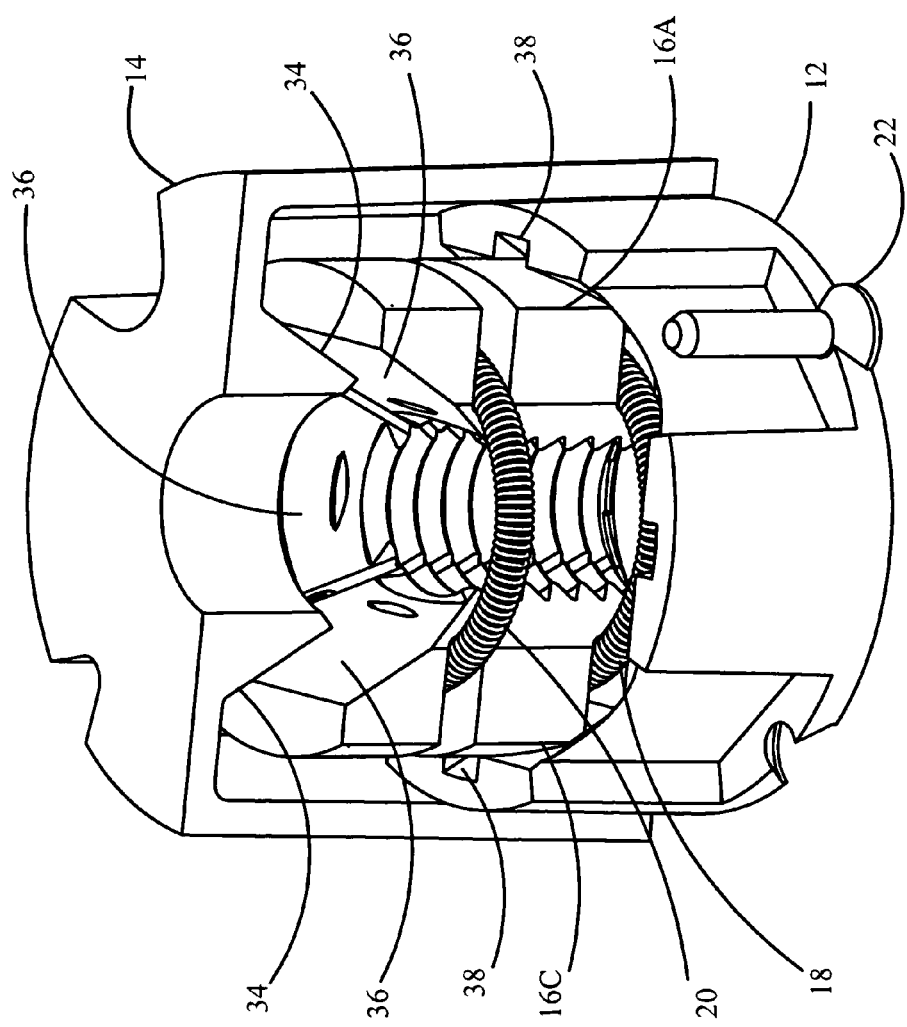

FIG. 14 is a top perspective view of a typical TCD with top housing partially removed to reveal internal components.

Figure 15:
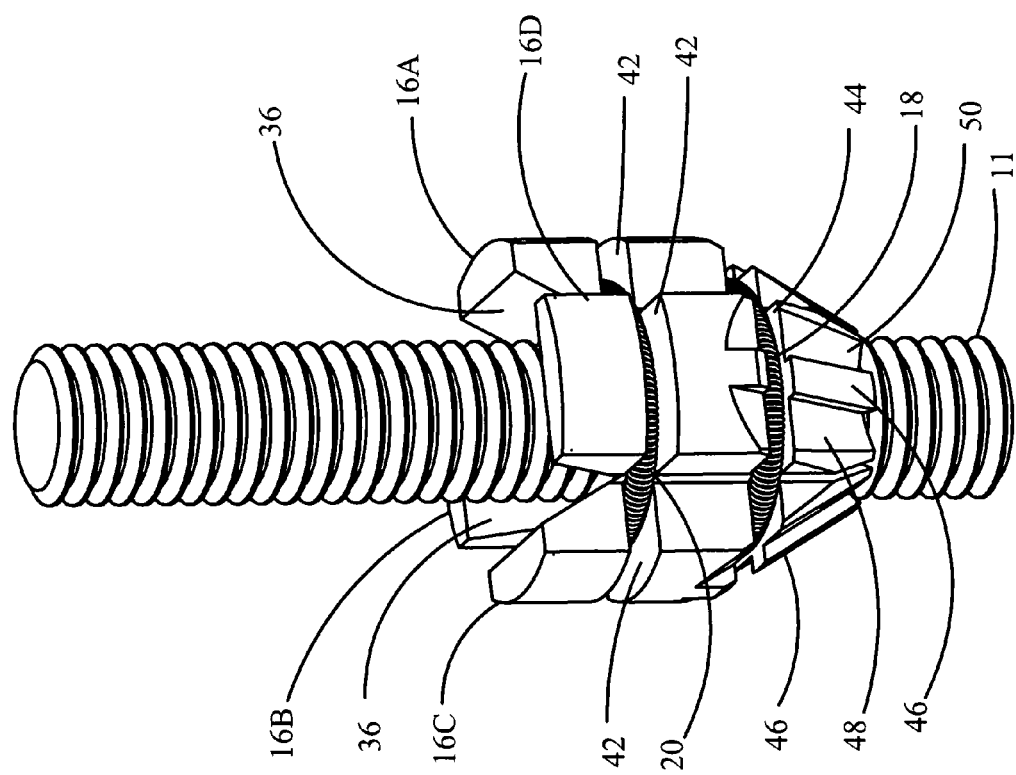

FIG. 15 is a three dimensional top perspective view of four nut segments, coil springs and a threaded rod.

Figure 16:
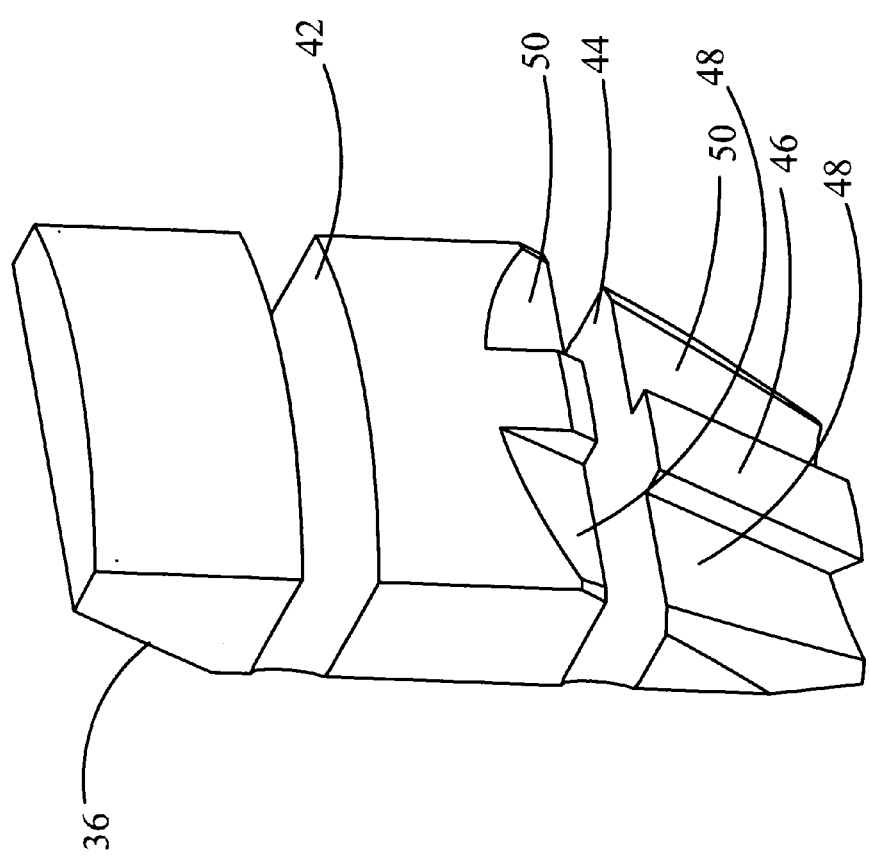

FIG. 16 is an expanded outer perspective view of a single nut segment.

Figure 17:
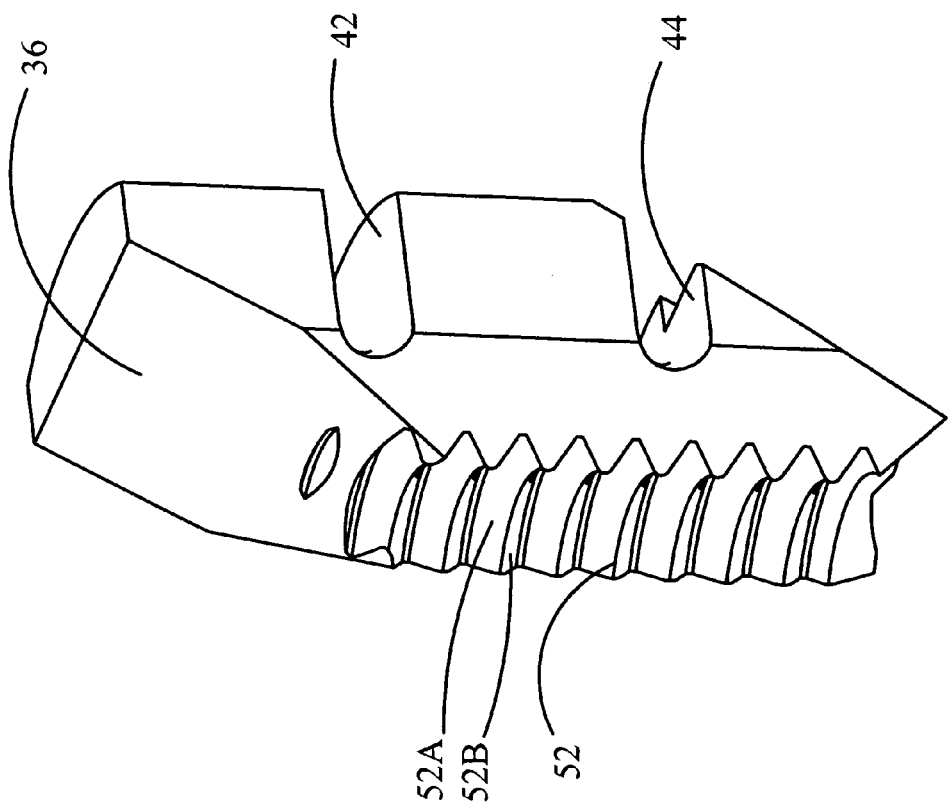

FIG. 17 is an expanded inner perspective view of a single nut segment.

Figure 18:
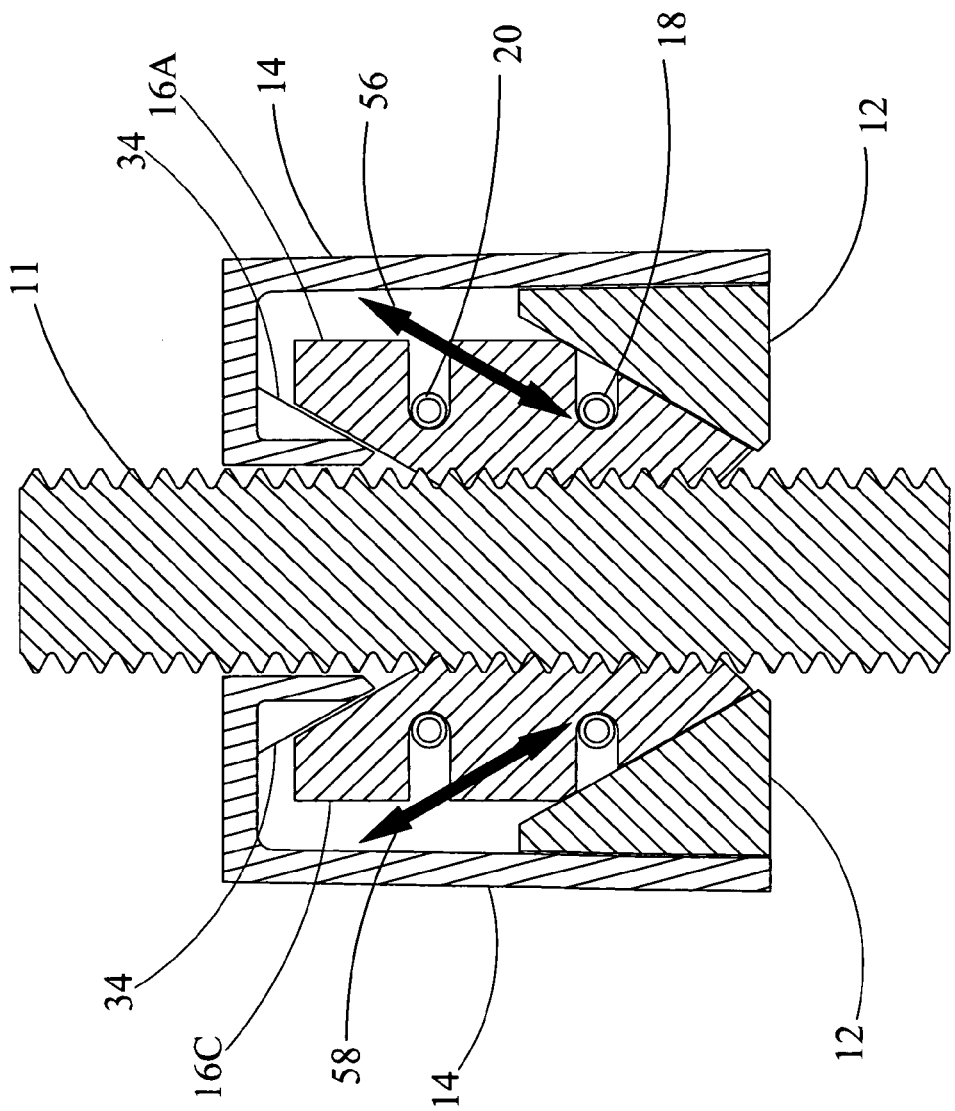

FIG. 18 is a cross sectional view of a typical TCD and threaded rod depicting motion direction.

Figure 19:
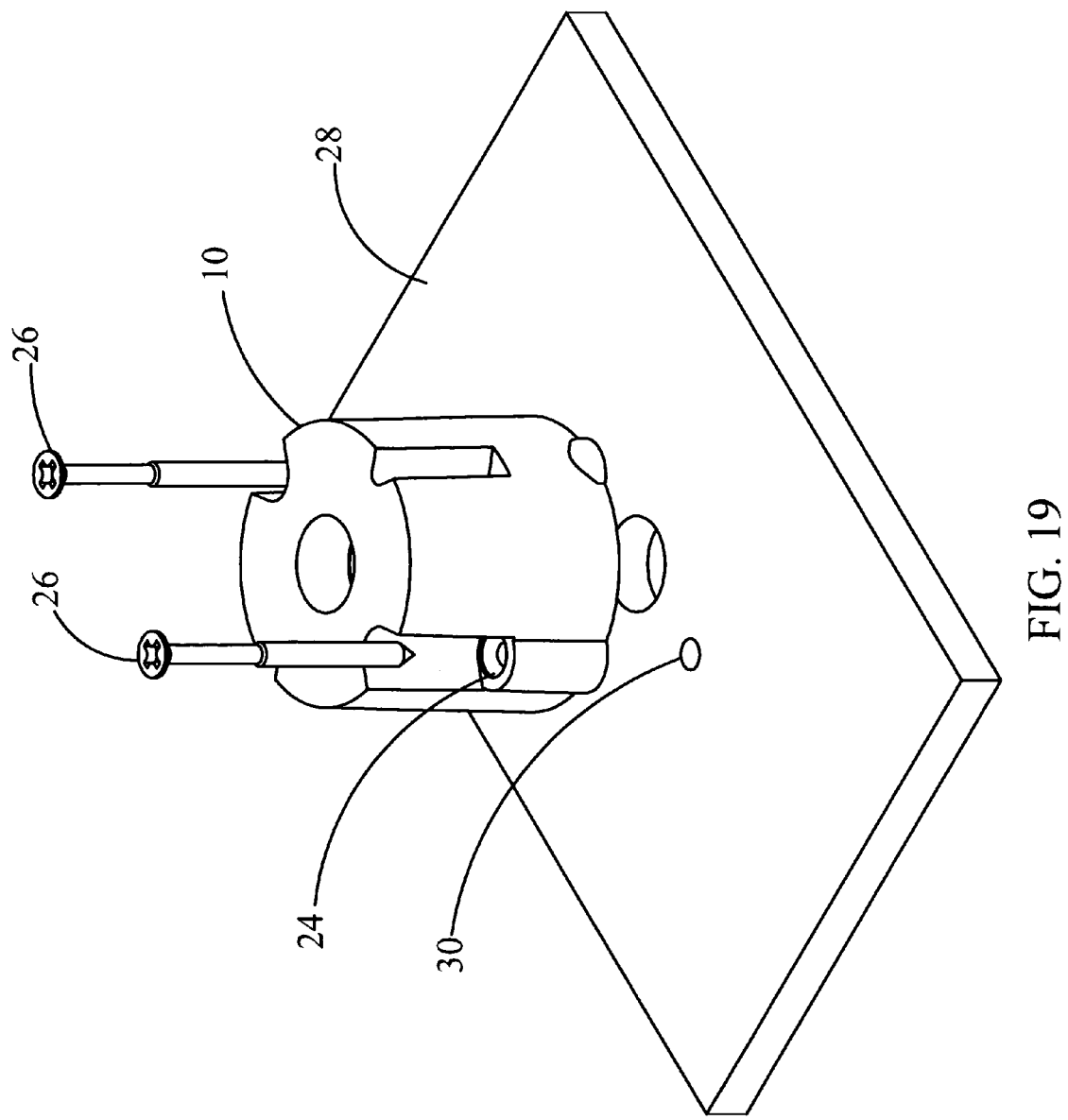

FIG. 19 is a perspective view of a typical assembly of TCD, screws and bearing plate.

Figure 20:
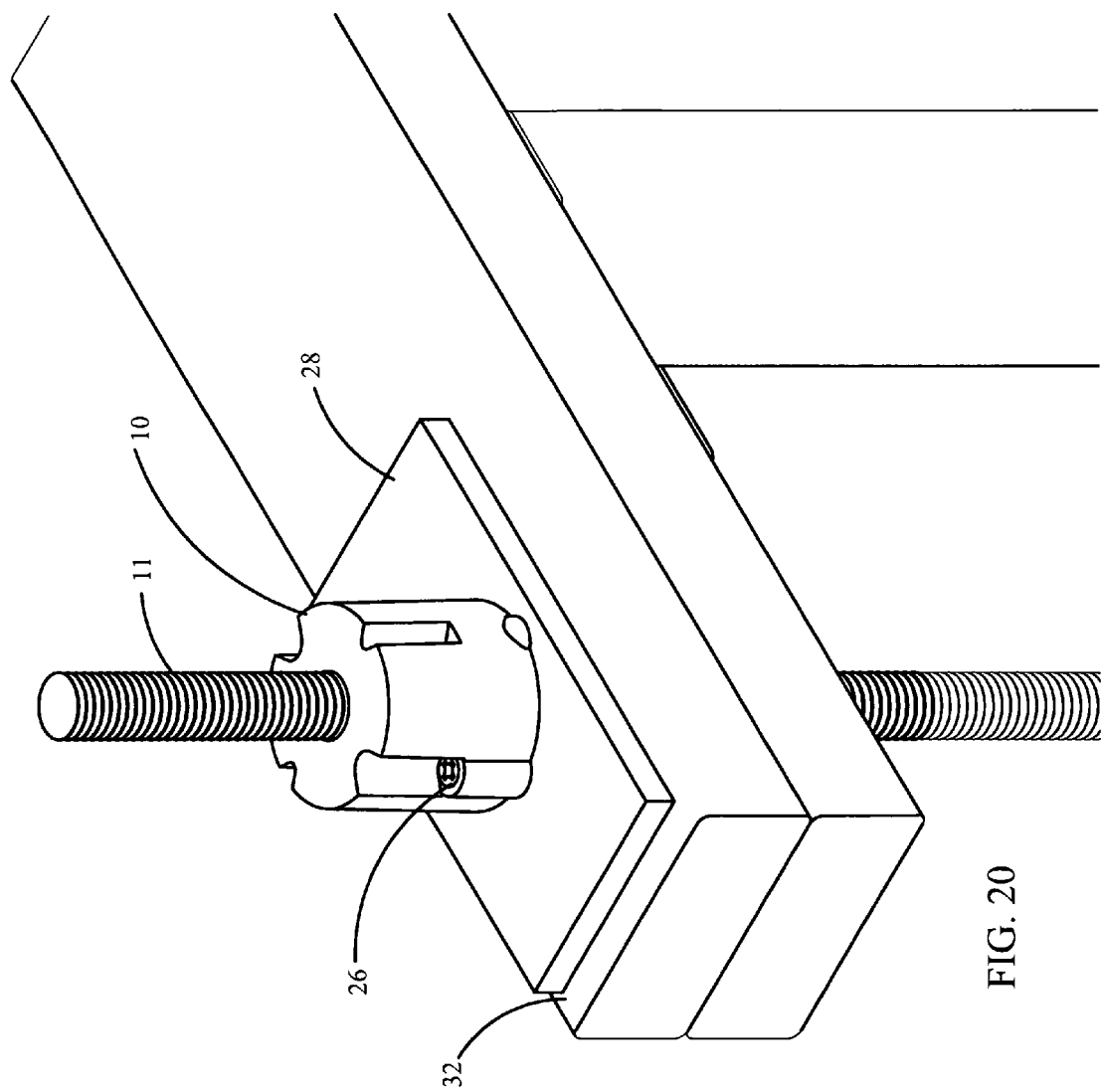

FIG. 20 is a top perspective view of a typical TCD and bearing plate installed on a structure.

Figure 21:
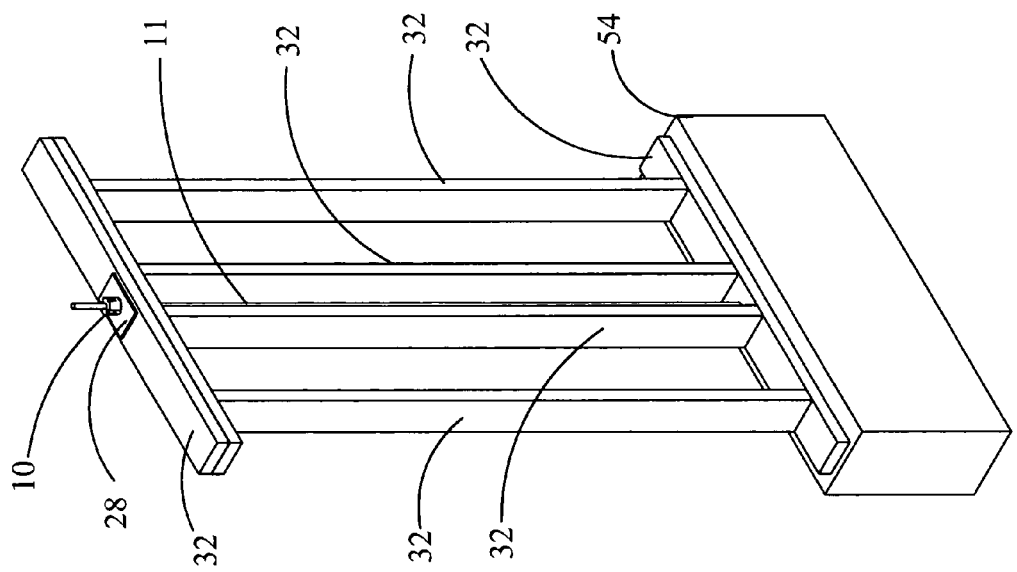

FIG. 21 depicts a partial stud structure and foundation with TCD, bearing plate installed onto a threaded rod.

Figure 22:
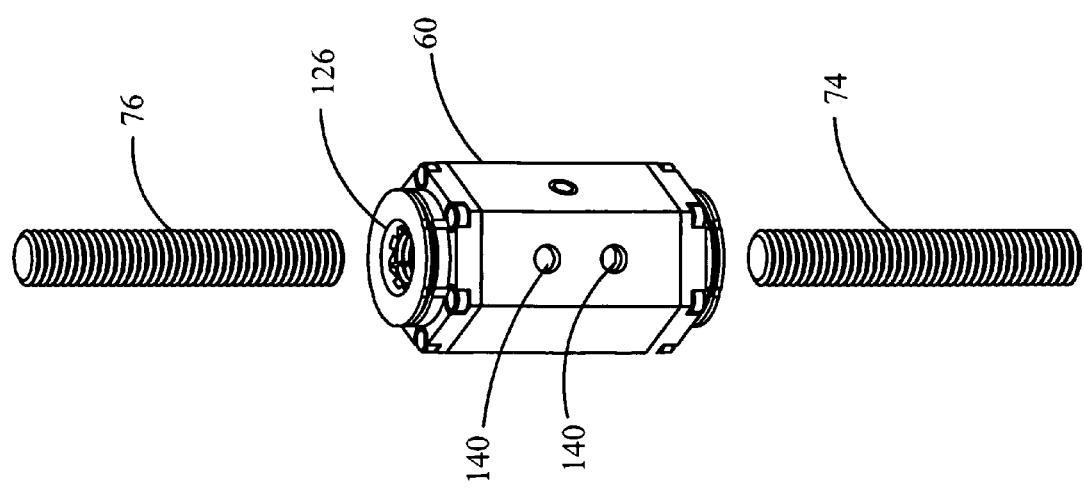

FIG. 22 is a top three dimensional perspective view of a coupler assembly and two threaded rods disengaged.

Figure 23:
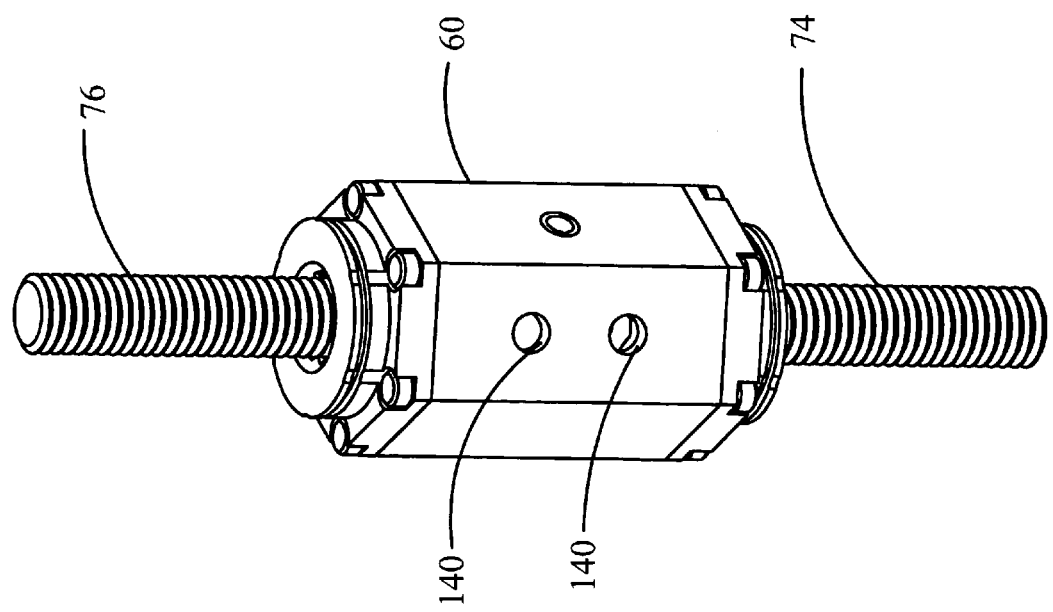

FIG. 23 is a top three dimensional perspective view of a coupler assembly engaged with two threaded rods in the installed position.

Figure 24:
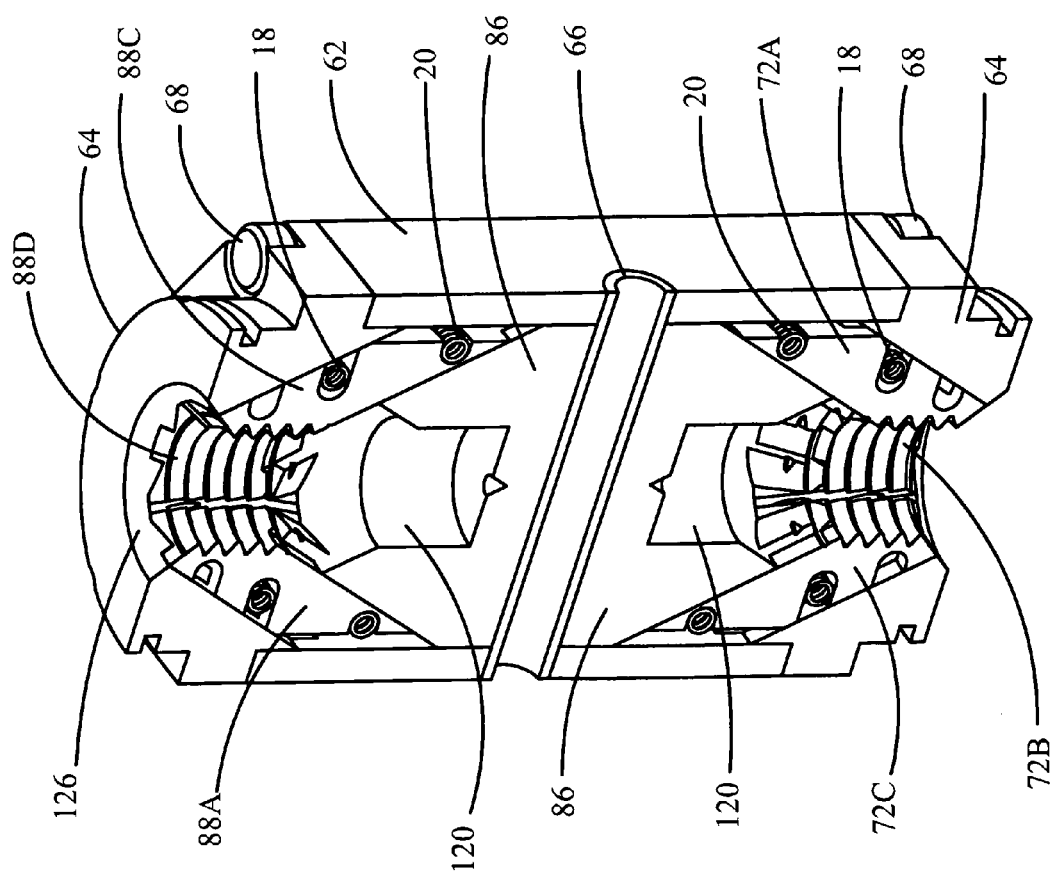

FIG. 24 is a cut-away cross sectional top perspective view of a coupler assembly and internal components.

Figure 25:
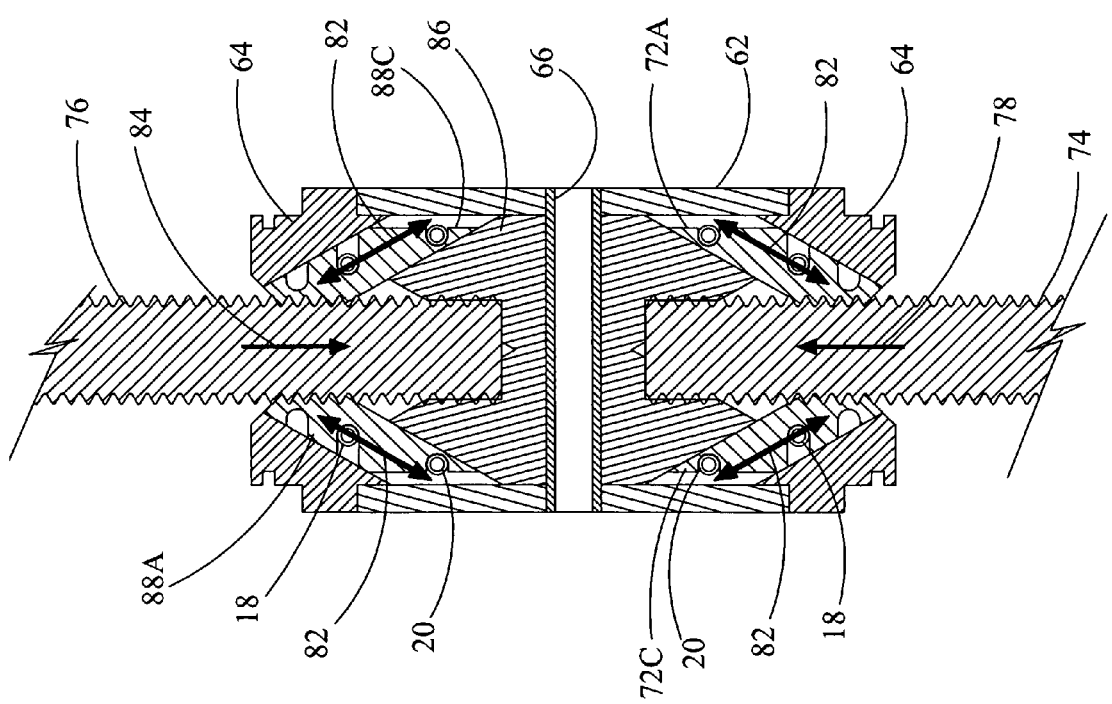

FIG. 25 is a cross sectional view of a coupler and engaged threaded rods. Also motion directions are shown.

Figure 26:
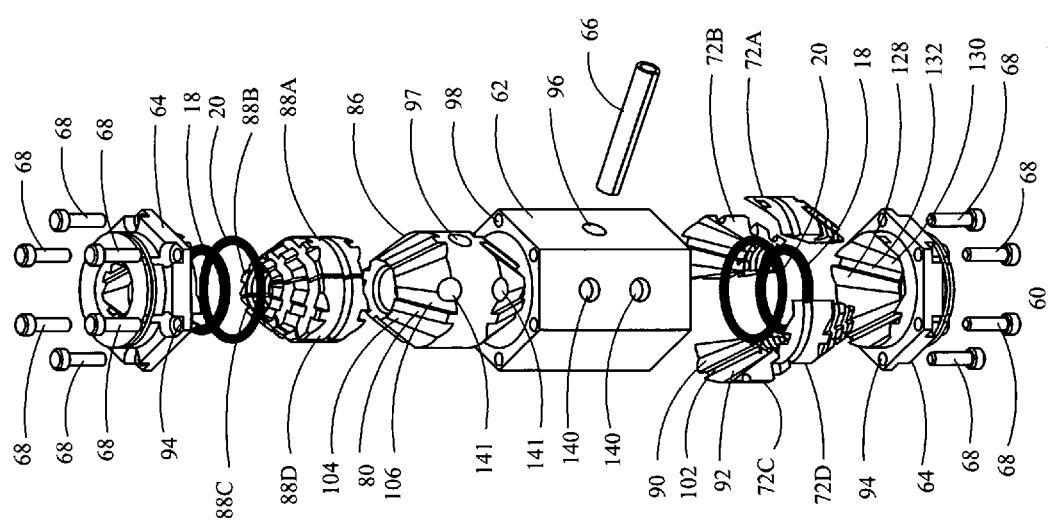

FIG. 26 is a three dimensional exploded top perspective view of a TCD and components.

Figure 27:
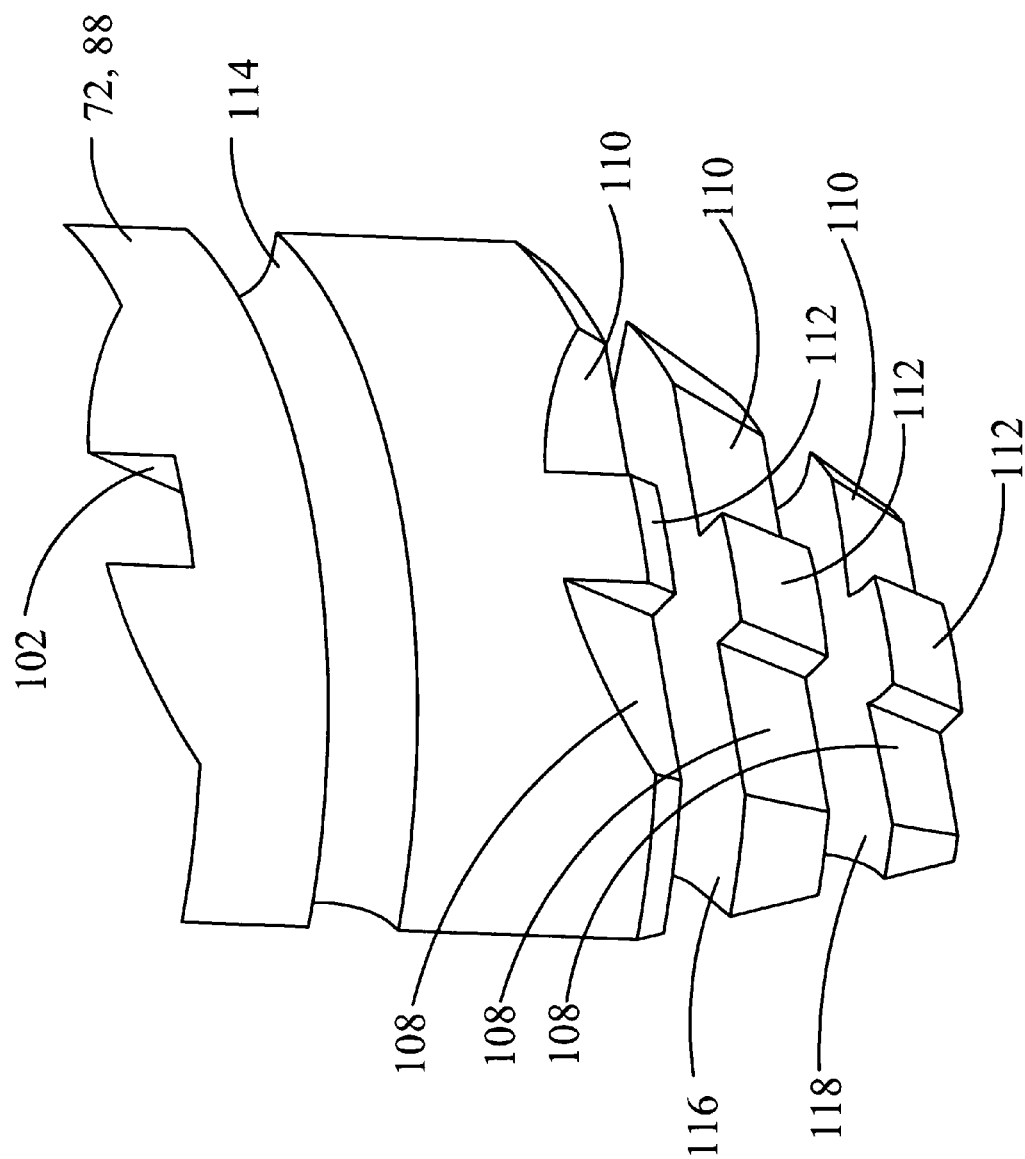

FIG. 27 is an outside perspective side view of a single nut segment.

Figure 28:
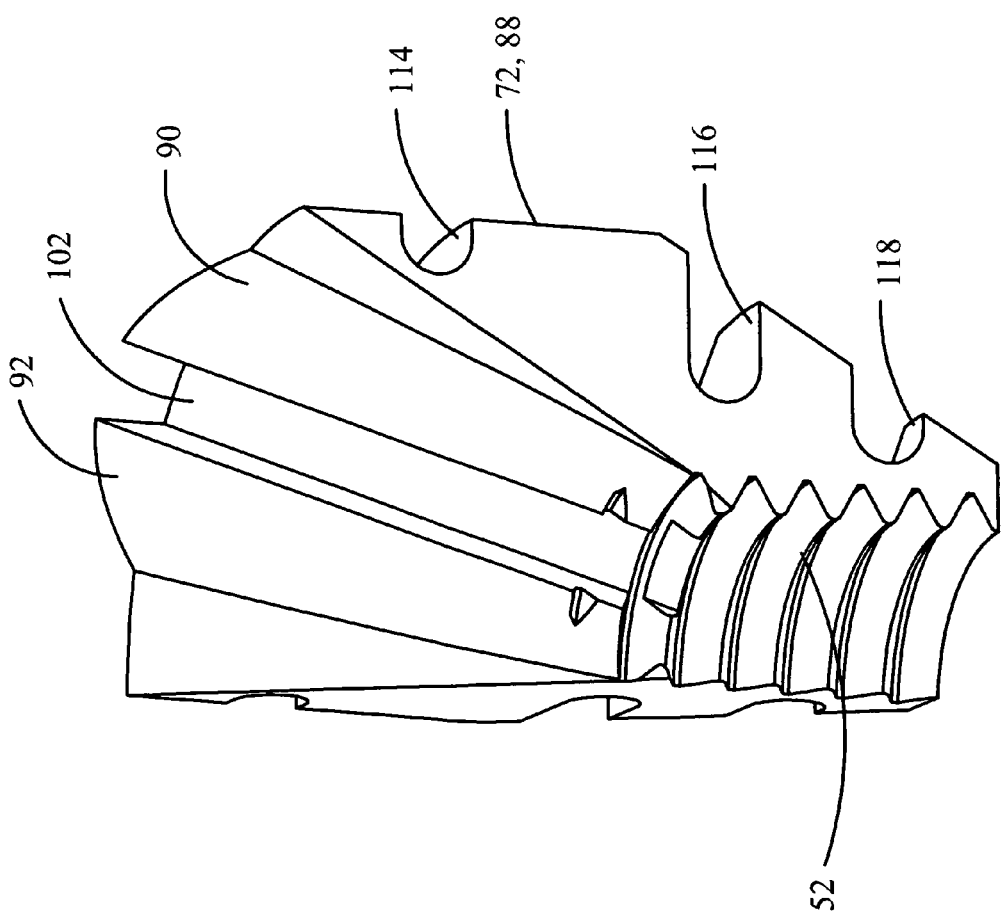

FIG. 28 is an inside perspective side view of a single nut segment.

Figure 29:
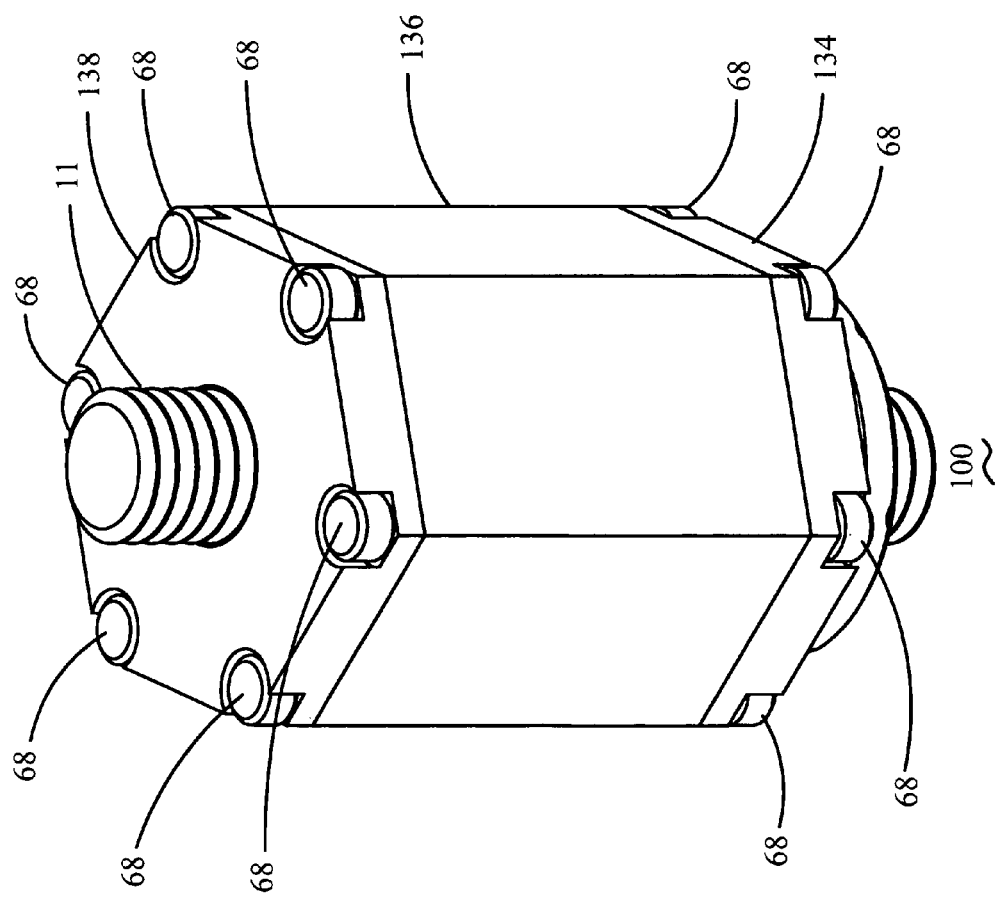

FIG. 29 is a three dimensional top perspective view of a typical multi-nut TCD.

Figure 30:
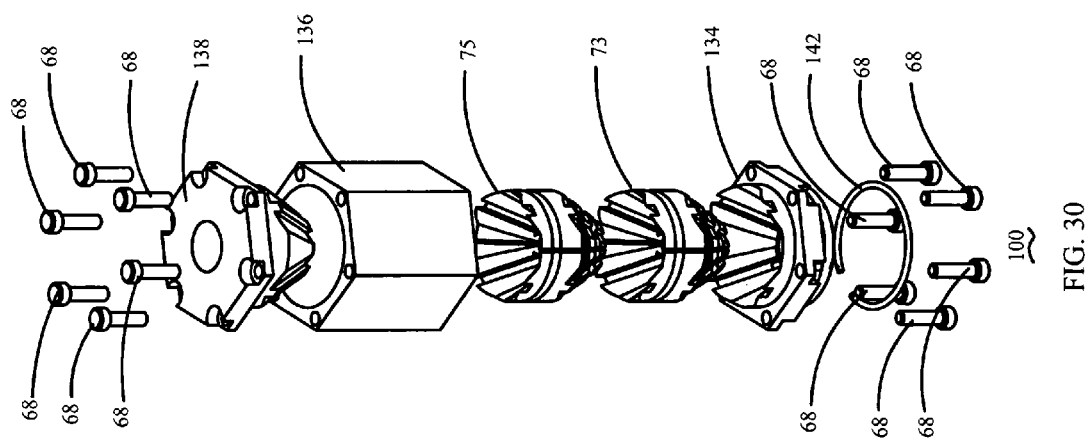

FIG. 30 is a three dimensional exploded top perspective view of a multi-nut TCD and components.

Figure 31:
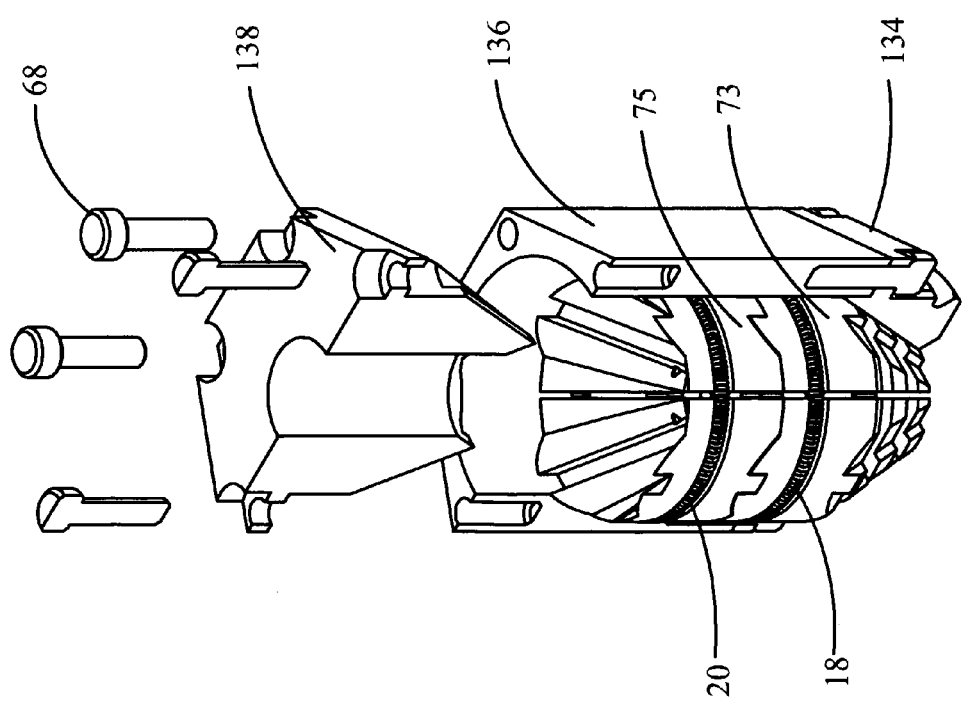

FIG. 31 is a three dimensional top perspective view of a multi-nut TCD with housing partially removed to reveal internal components.

Figure 32:
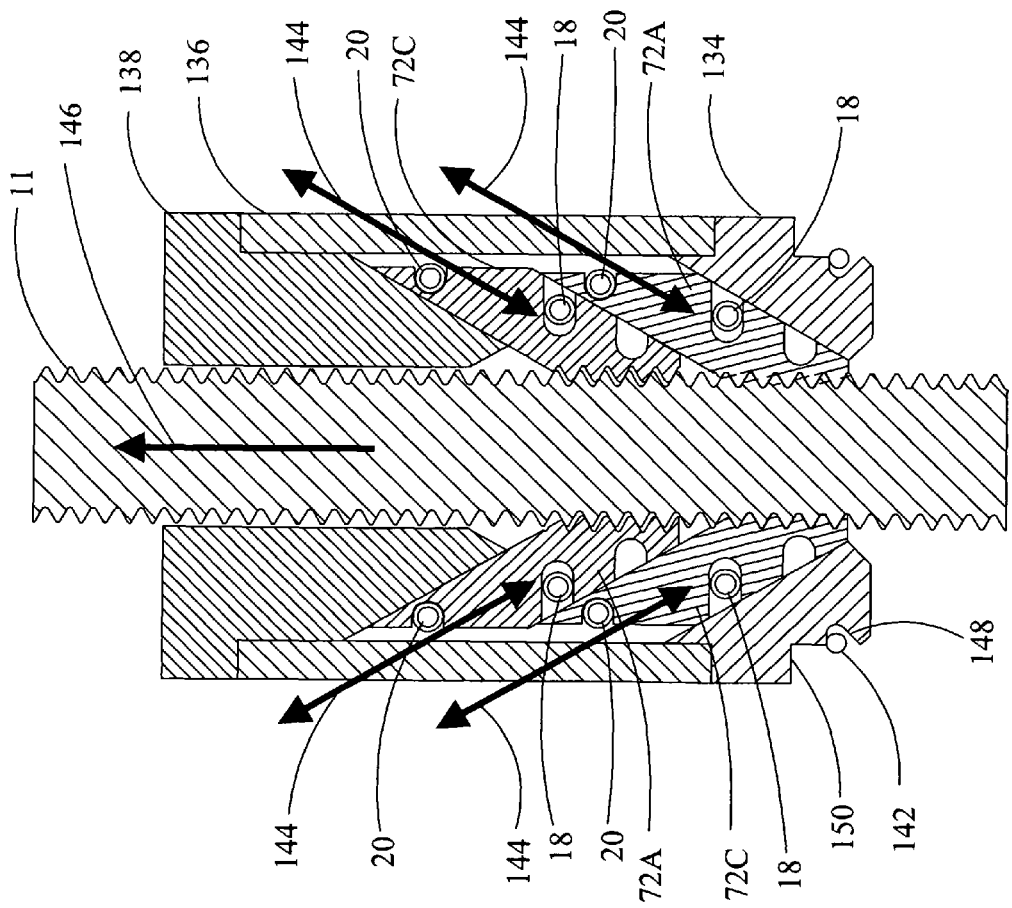

FIG. 32 is a cross sectional view of a typical multi-nut TCD also showing motion directions.

Figure 33:
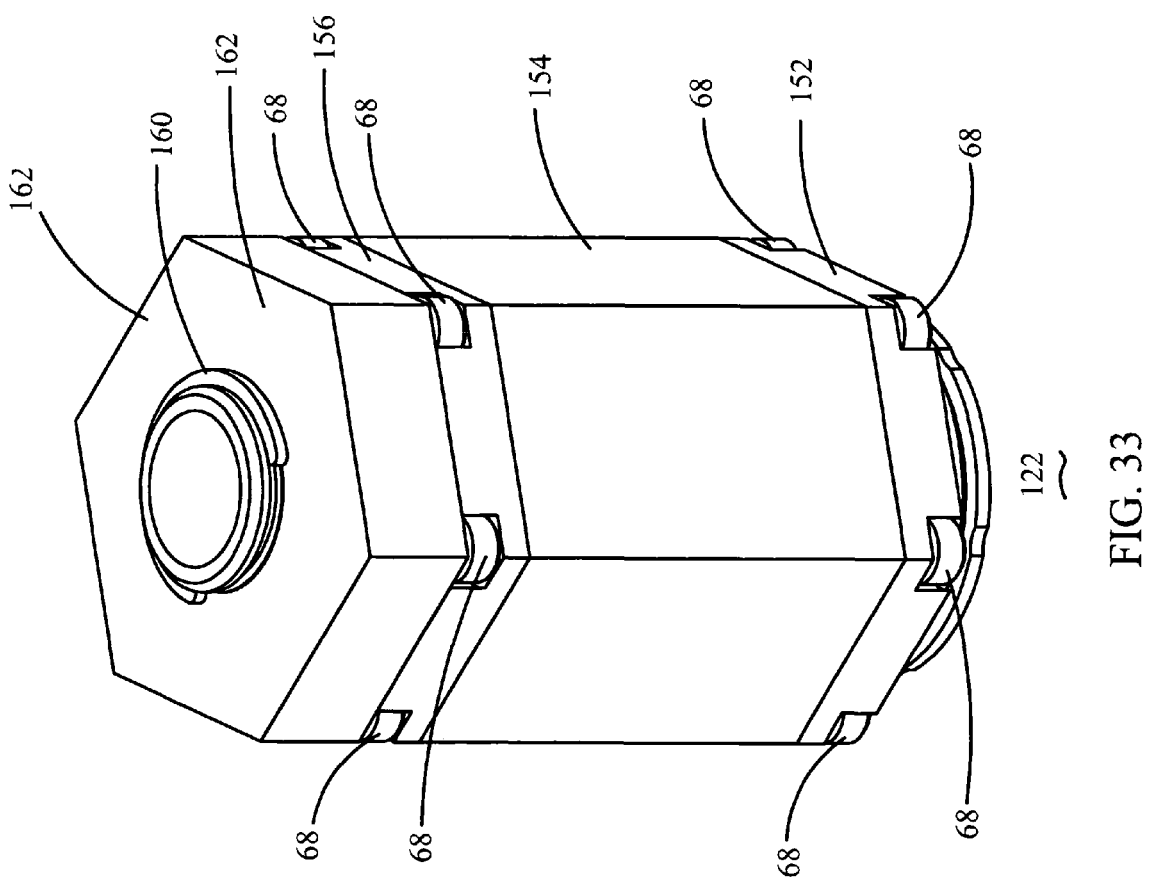

FIG. 33 is a three dimensional top perspective view of a typical TCD with quick release mechanism in the unreleased position.

Figure 34:
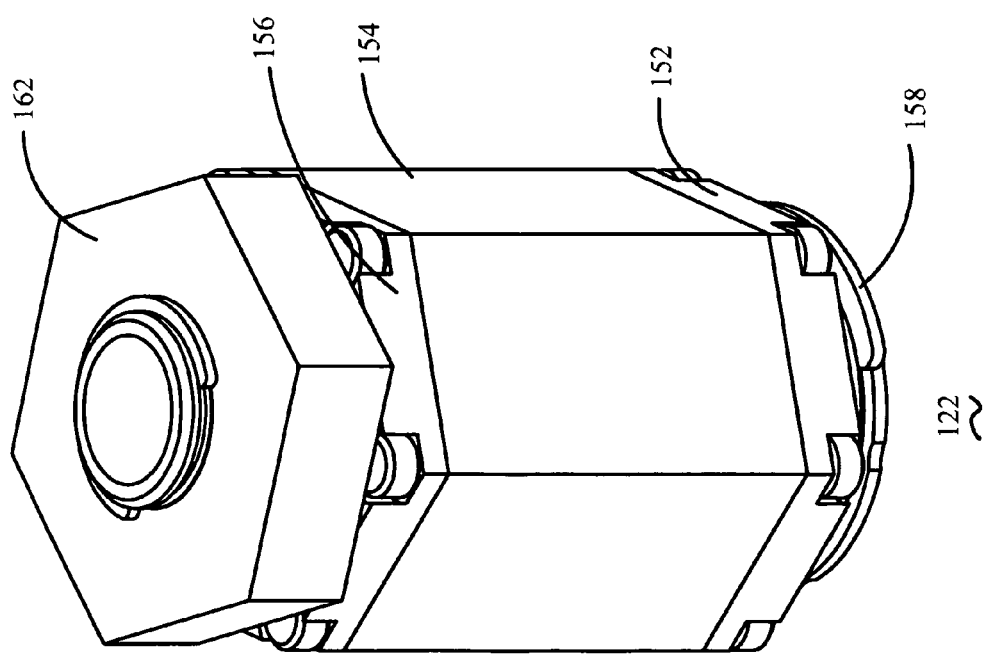

FIG. 34 is a three dimensional top perspective view of a typical TCD with quick release mechanism in the released position.

Figure 35:
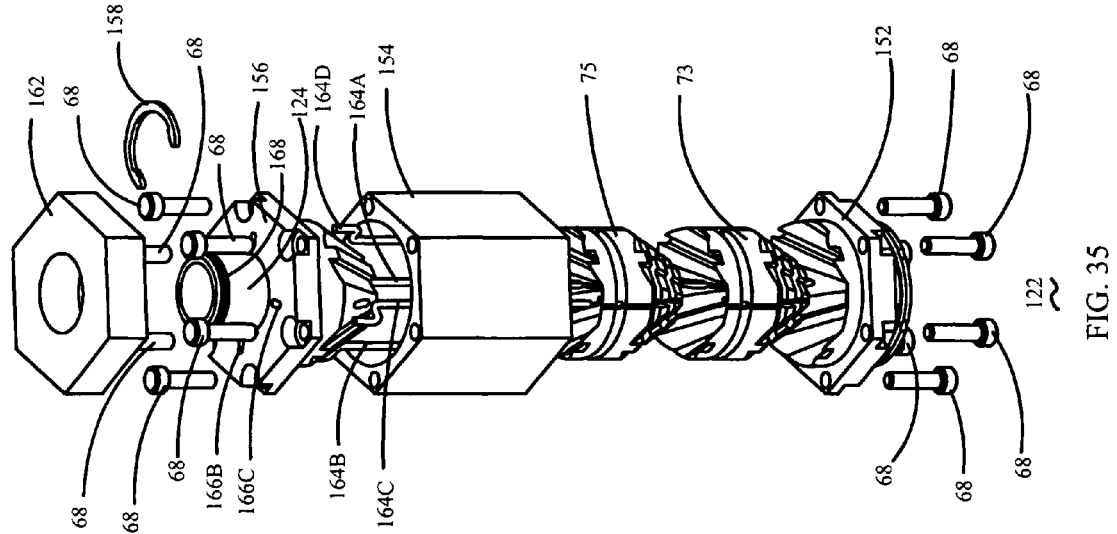

FIG. 35 is a three dimensional exploded perspective view of a typical TCD and internal components.

Figure 36:
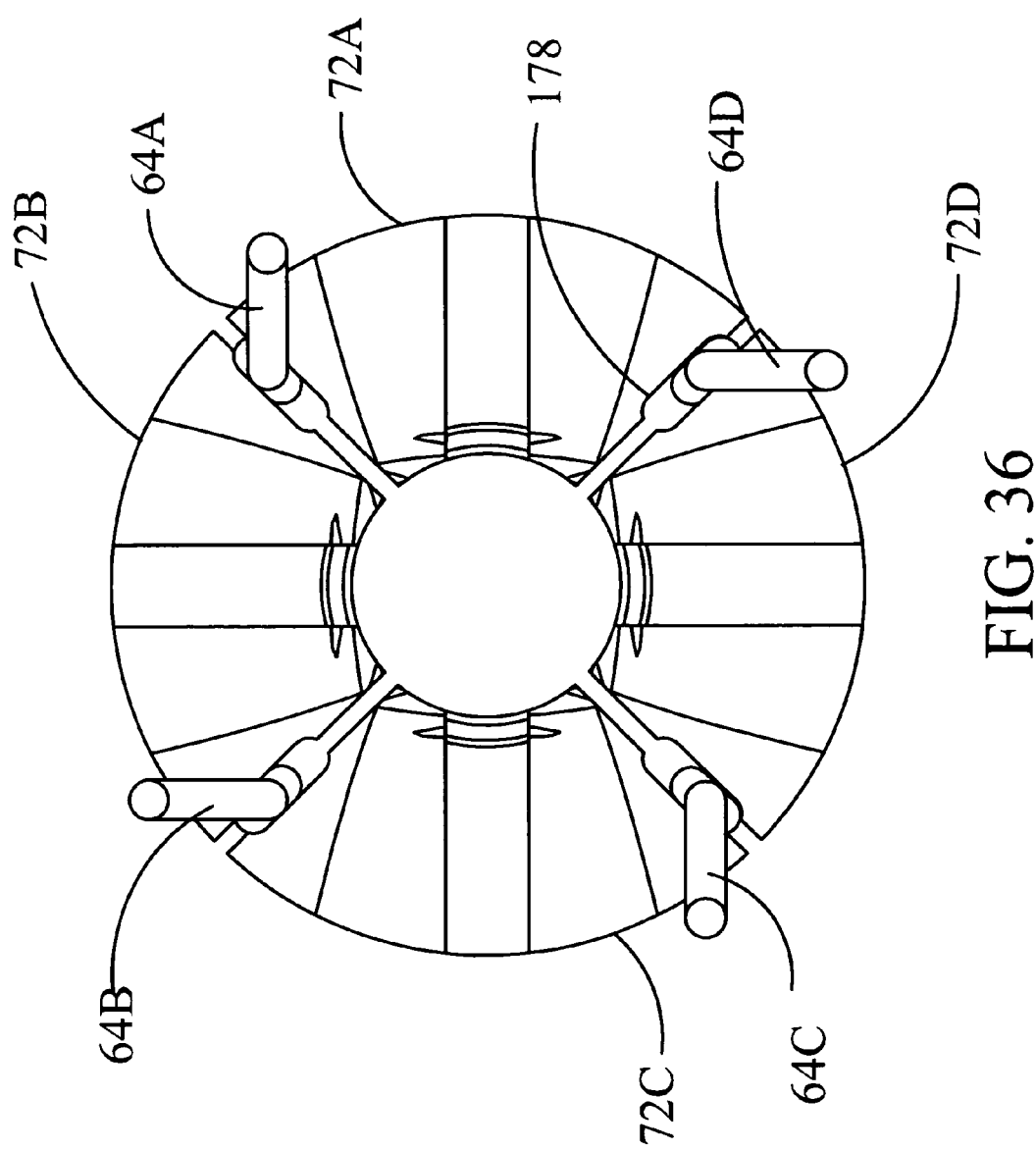

FIG. 36 is a top view of a TCD with release mechanism showing the wire posts in the unreleased position.

Figure 37:
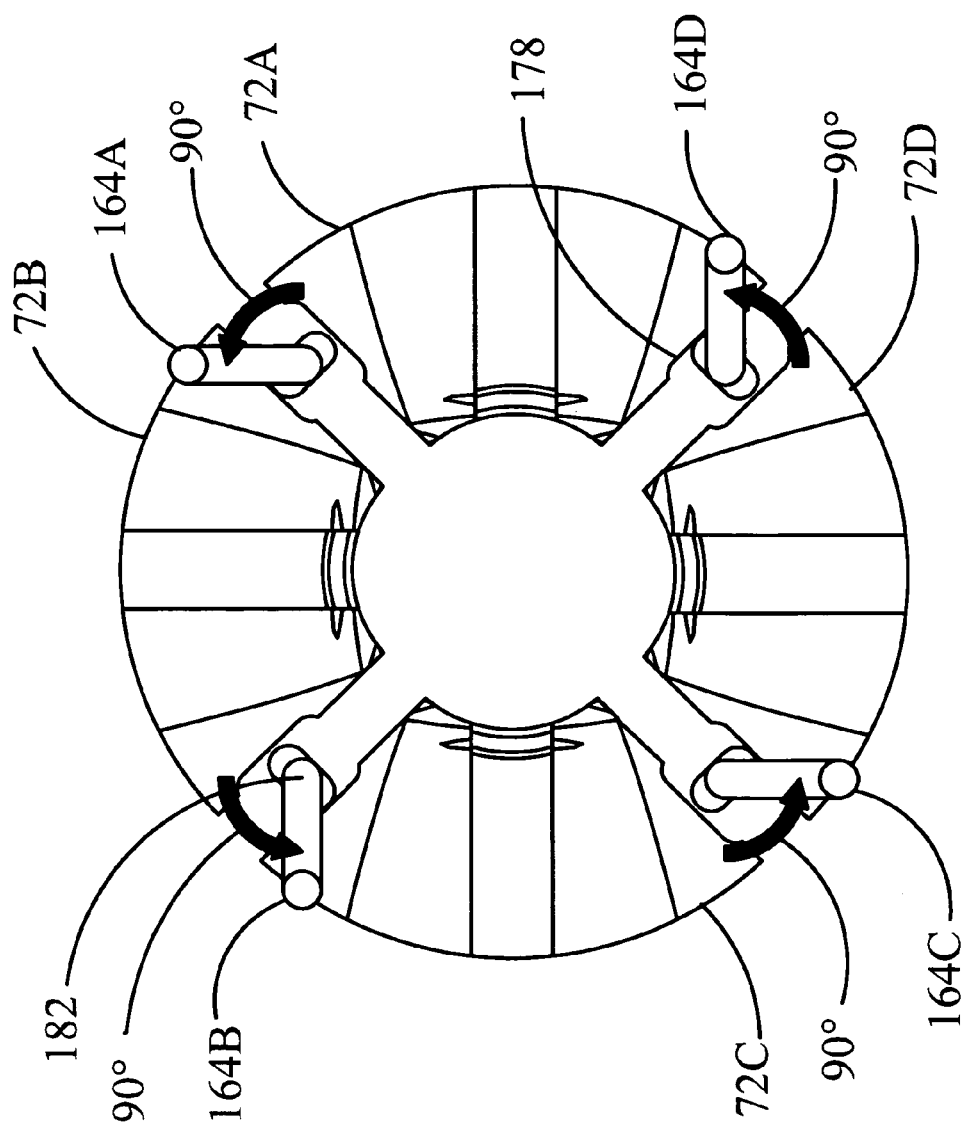

FIG. 37 is a top view of a TCD with release mechanism showing the wire posts in the released position.

Figure 38:
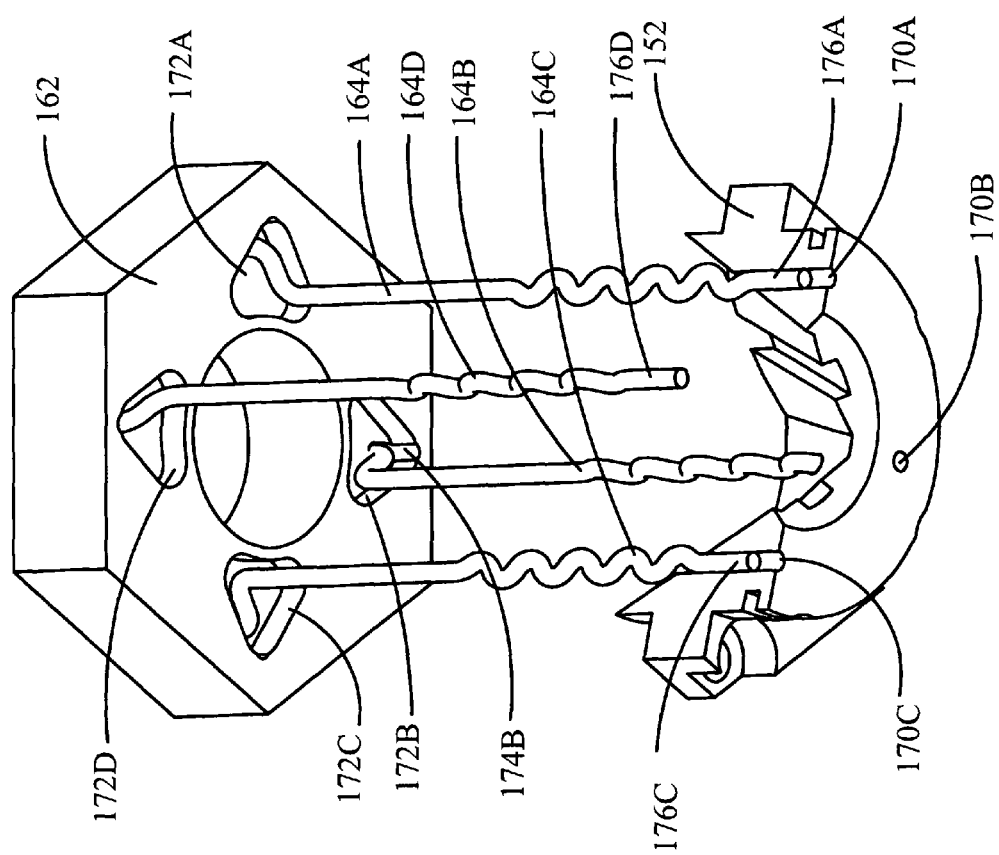

FIG. 38 is a bottom perspective view of TCD release mechanism where the housing and segments have been removed and the end housing is depicted in cross section.

Figure 39:
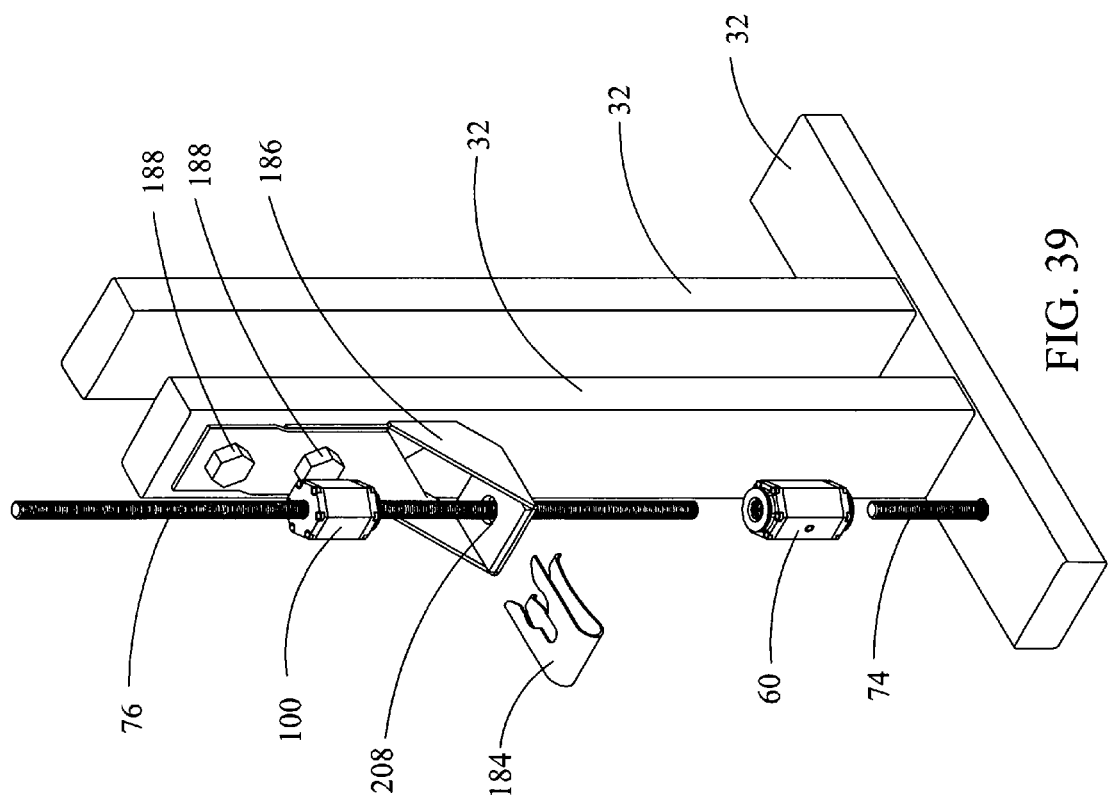

FIG. 39 is a top three dimensional perspective view of TCD, connector clip, coupler, threaded rod, sheet metal hold-down and the wood structure before assembly.

Figure 40:
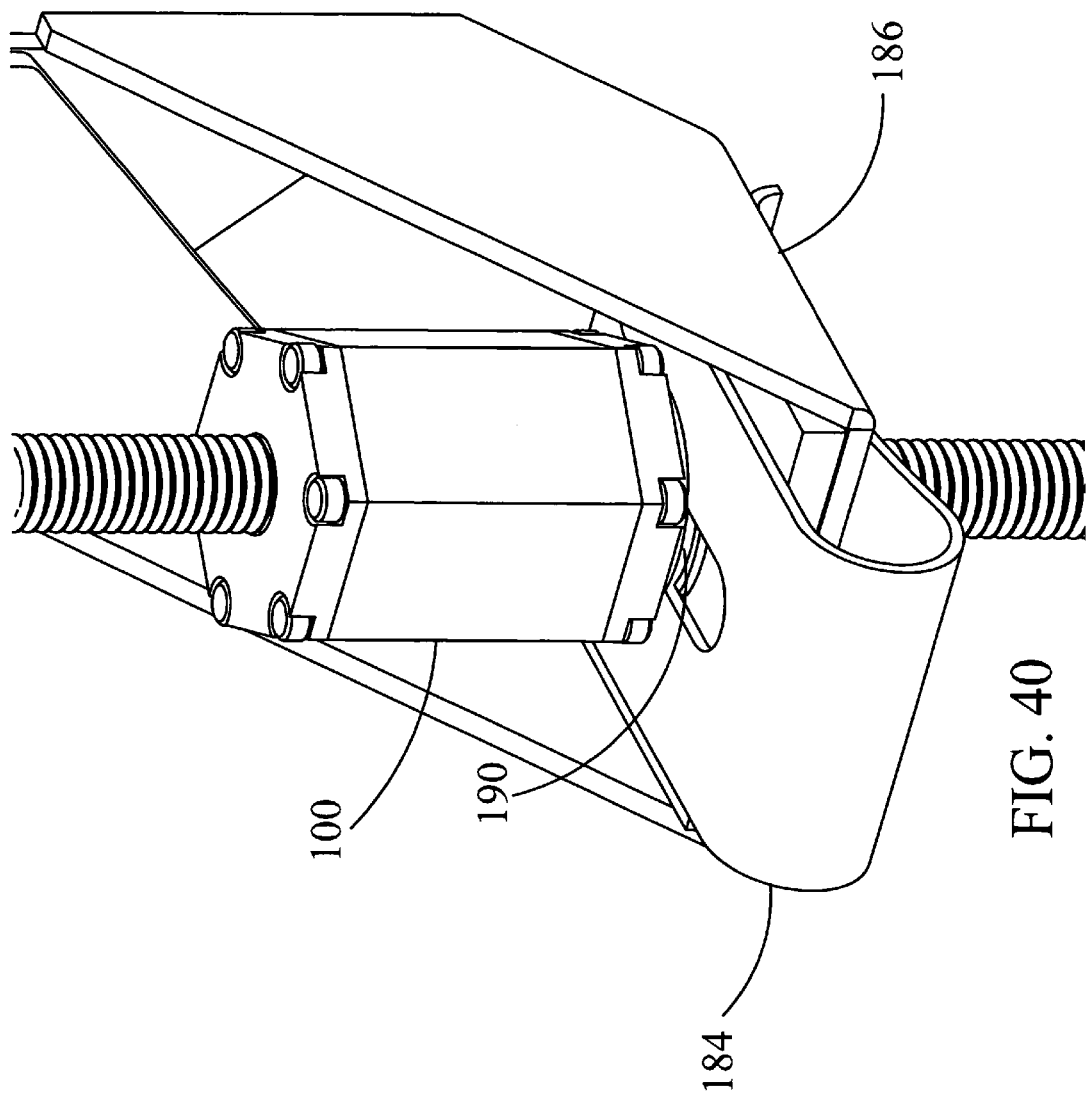

FIG. 40 is a top three dimensional expanded perspective view of a typical TCD attached to a sheet metal hold-down.

Figure 41:
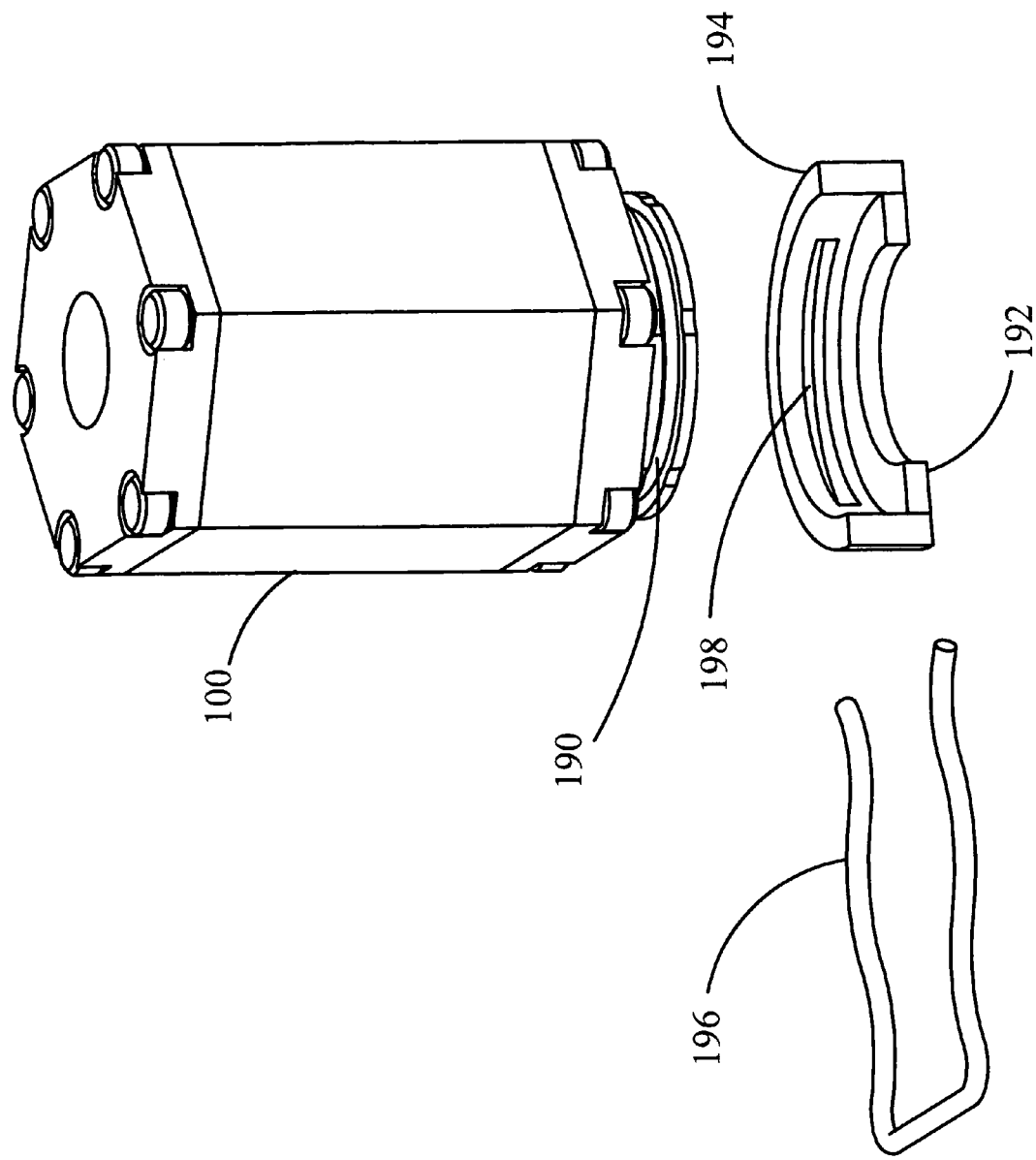

FIG. 41 is a top perspective view of a TCD, wire clip, and cross sectional depiction of a magnetic bracket assembly.

Figure 42:
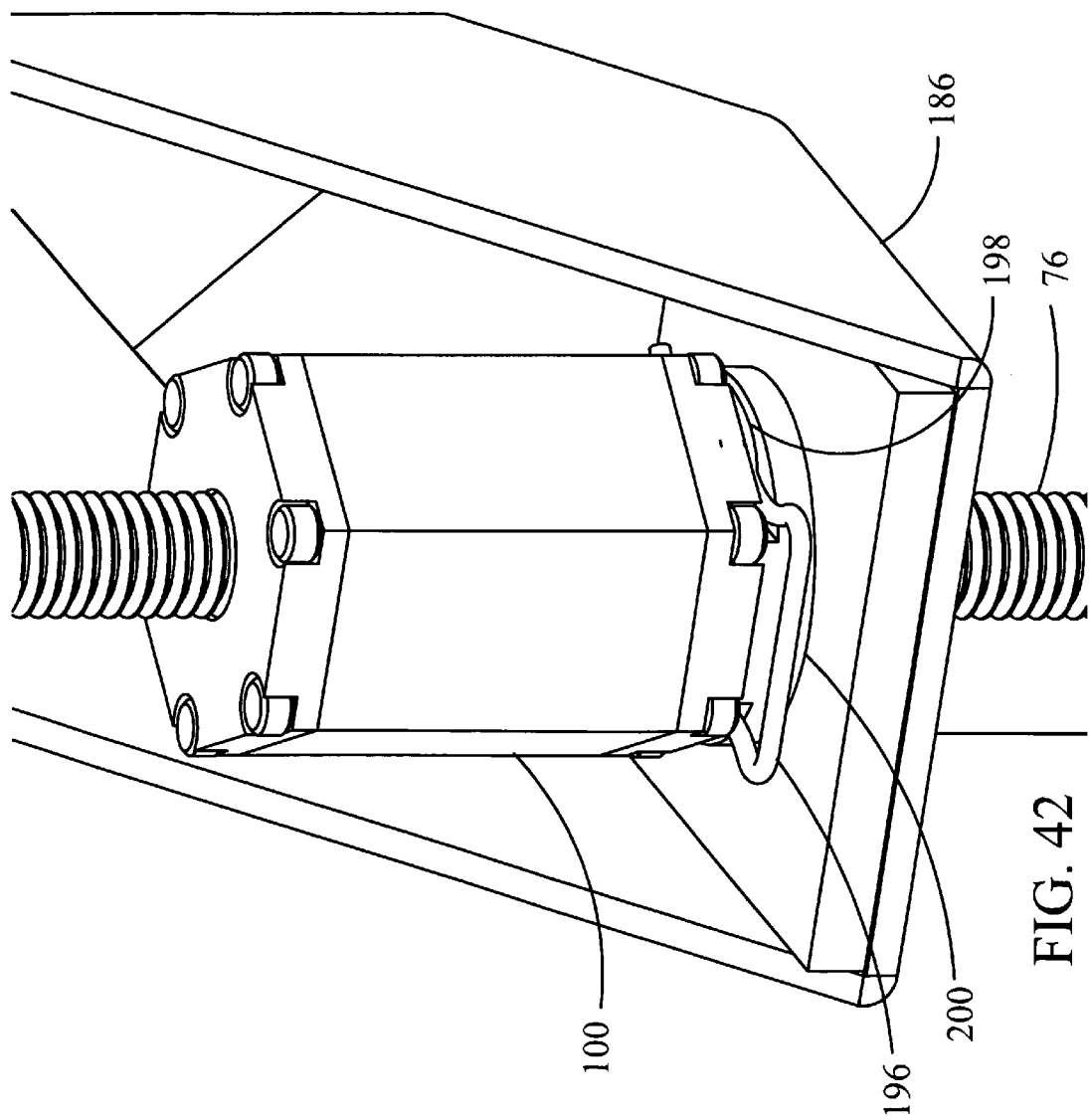

FIG. 42 is a top three dimensional expanded perspective view of a typical TCD, wire clip, and magnetic bracket attached to a sheet metal hold-down.

Figure 43:
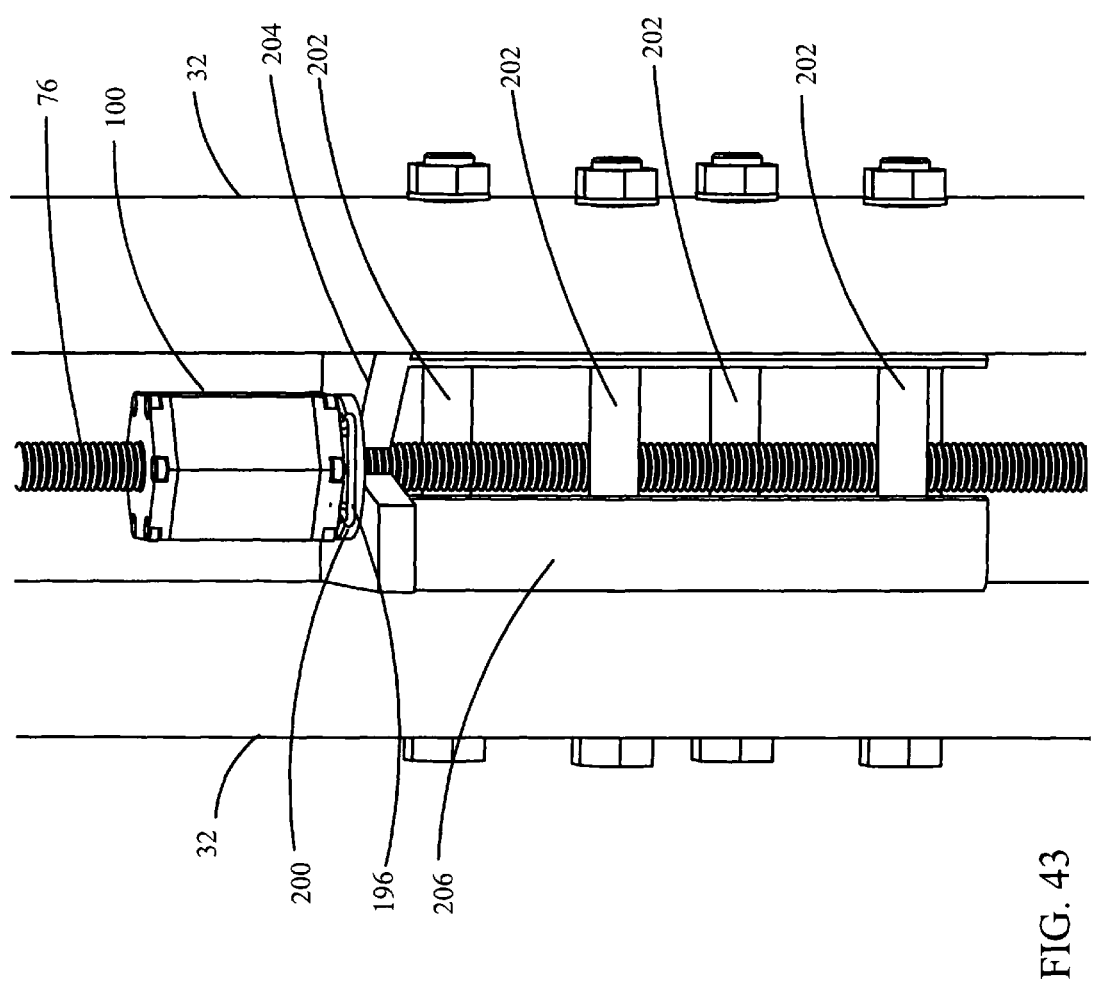

FIG. 43 is a top three dimensional perspective view of a typical TCD, wire clip, magnetic bracket, studs, and tube connector with a portion thereof removed to show cross bolts and threaded rod.

Figure 44:
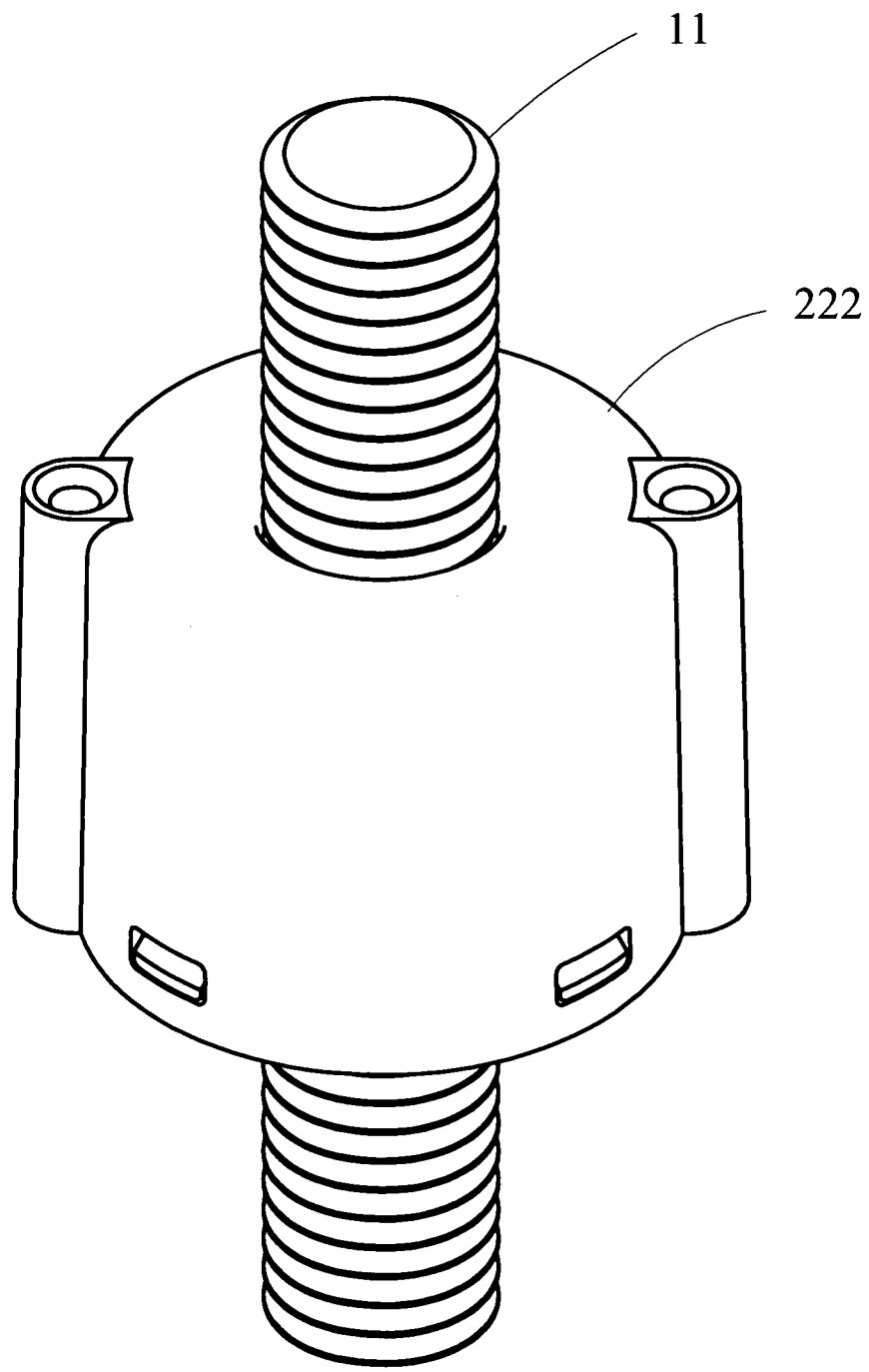

FIG. 44 is a perspective view of another TCD embodiment and threaded rod.

Figure 45:
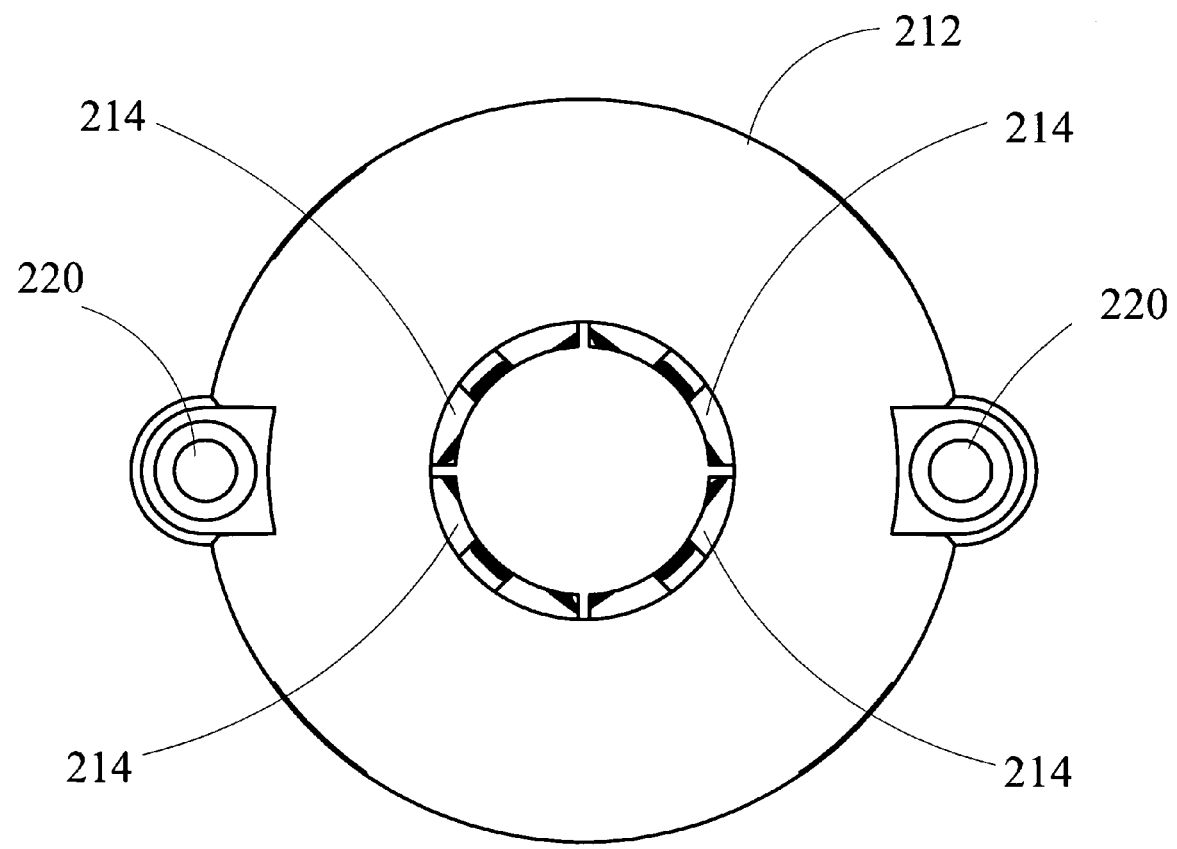

FIG. 45 is a top view of a typical TCD.

Figure 46:
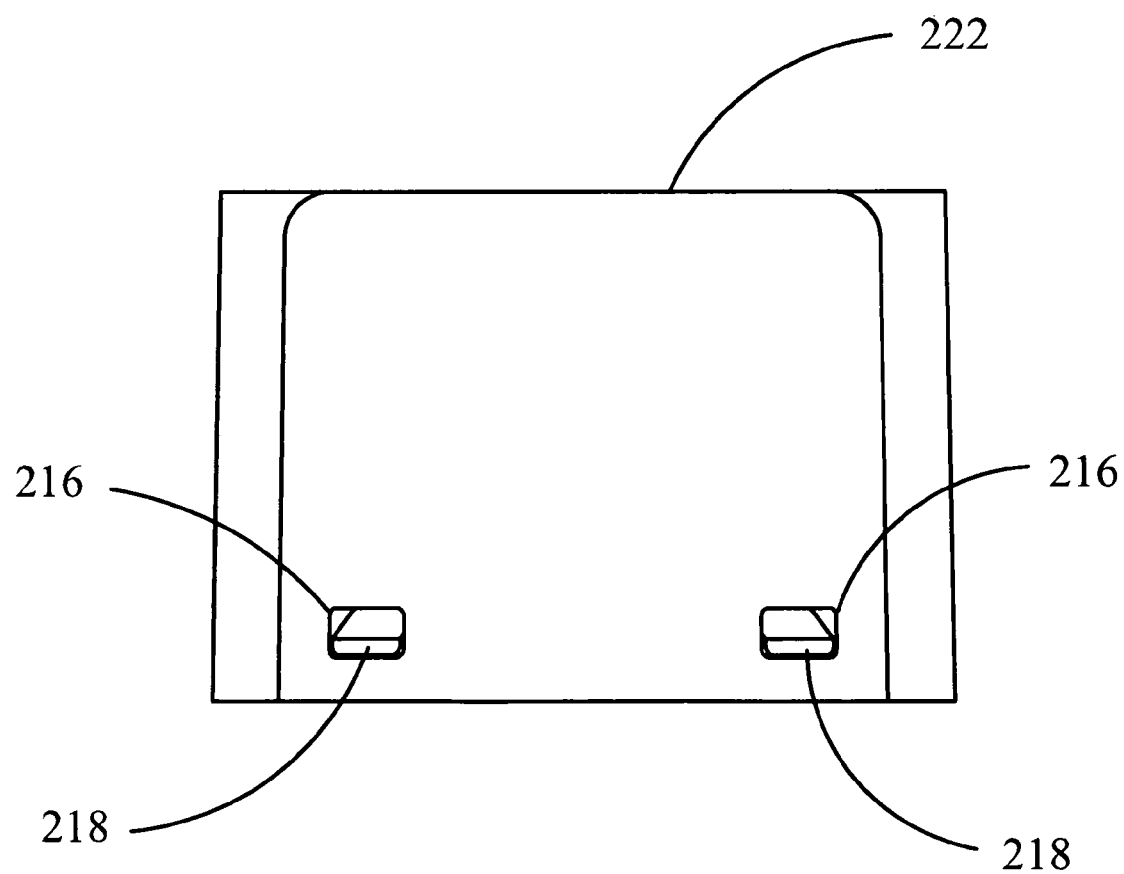

FIG. 46 is a first side view of a typical TCD.

Figure 47:
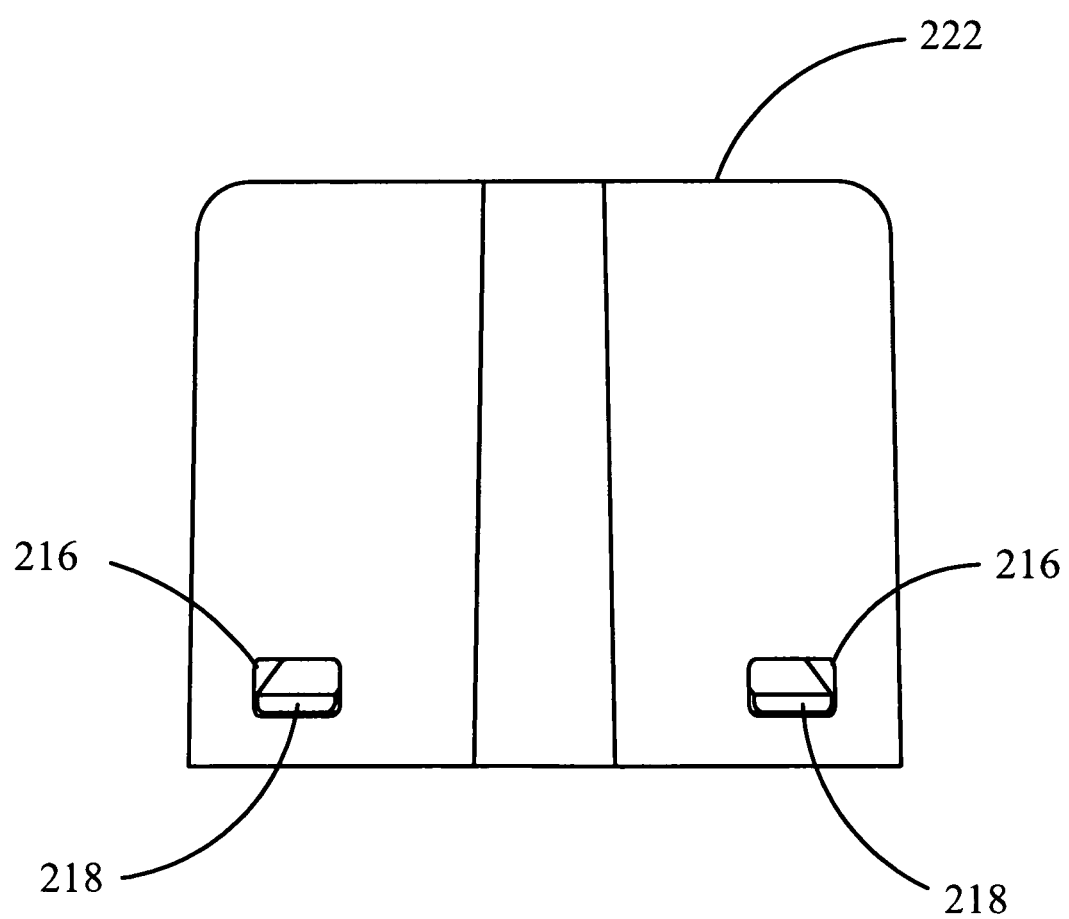

FIG. 47 is a second side view of a TCD.

Figure 48:
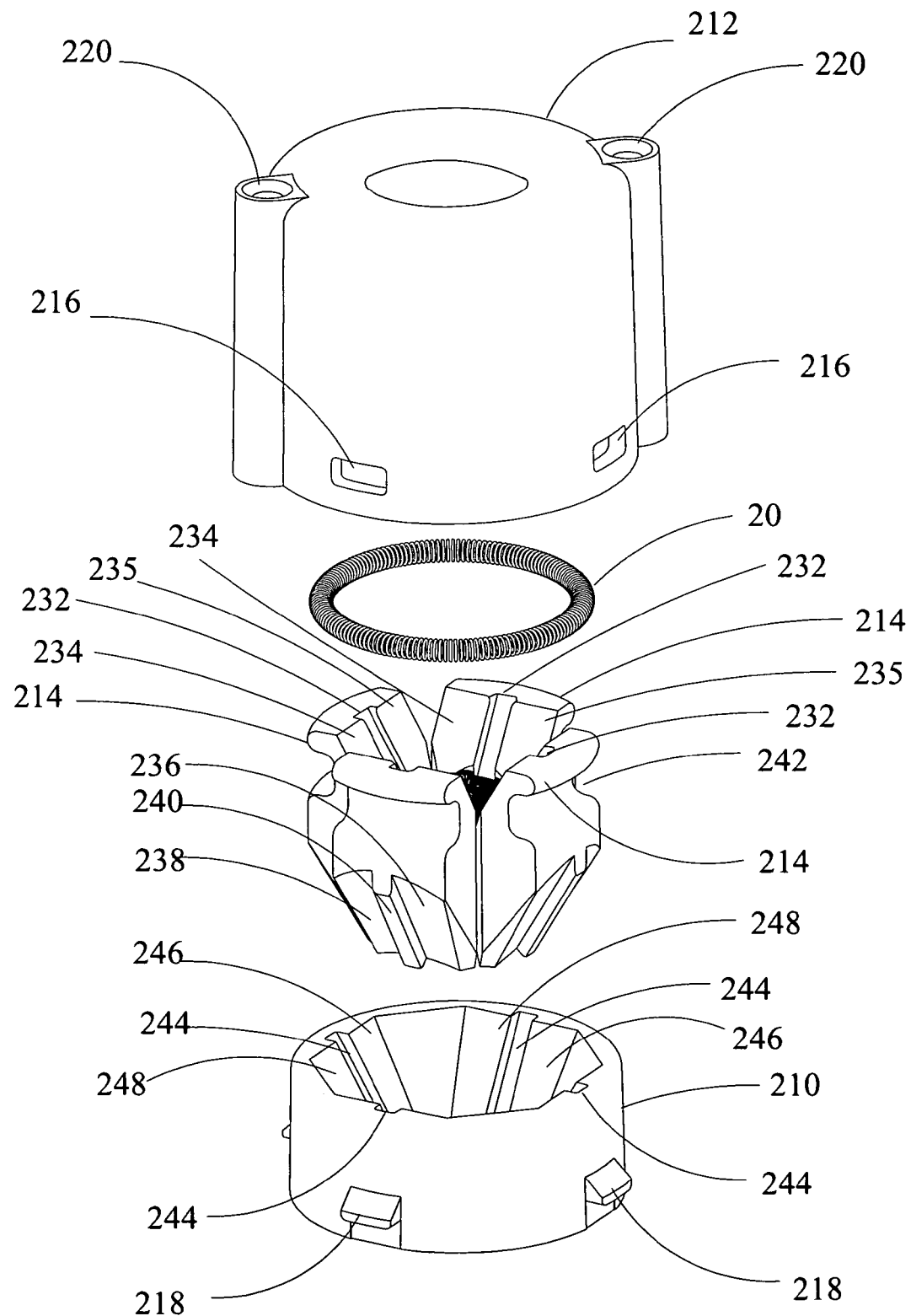

FIG. 48 is a top perspective three dimensional view of a TCD disassembled for the particular embodiment including ridges and slots.

Figure 49:
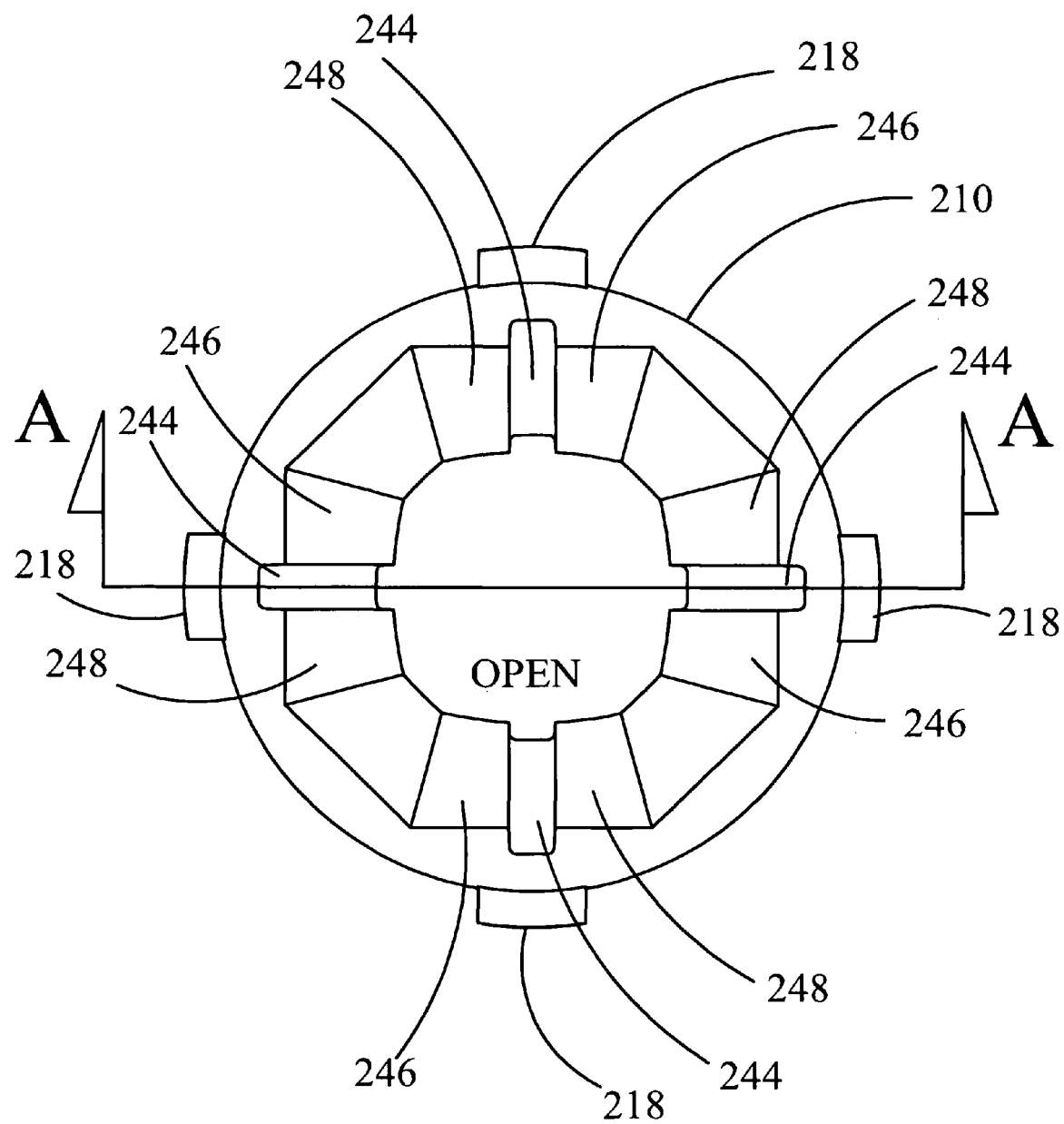

FIG. 49 is a top view of an end housing for the particular embodiment including ridges and slots.

Figure 50:
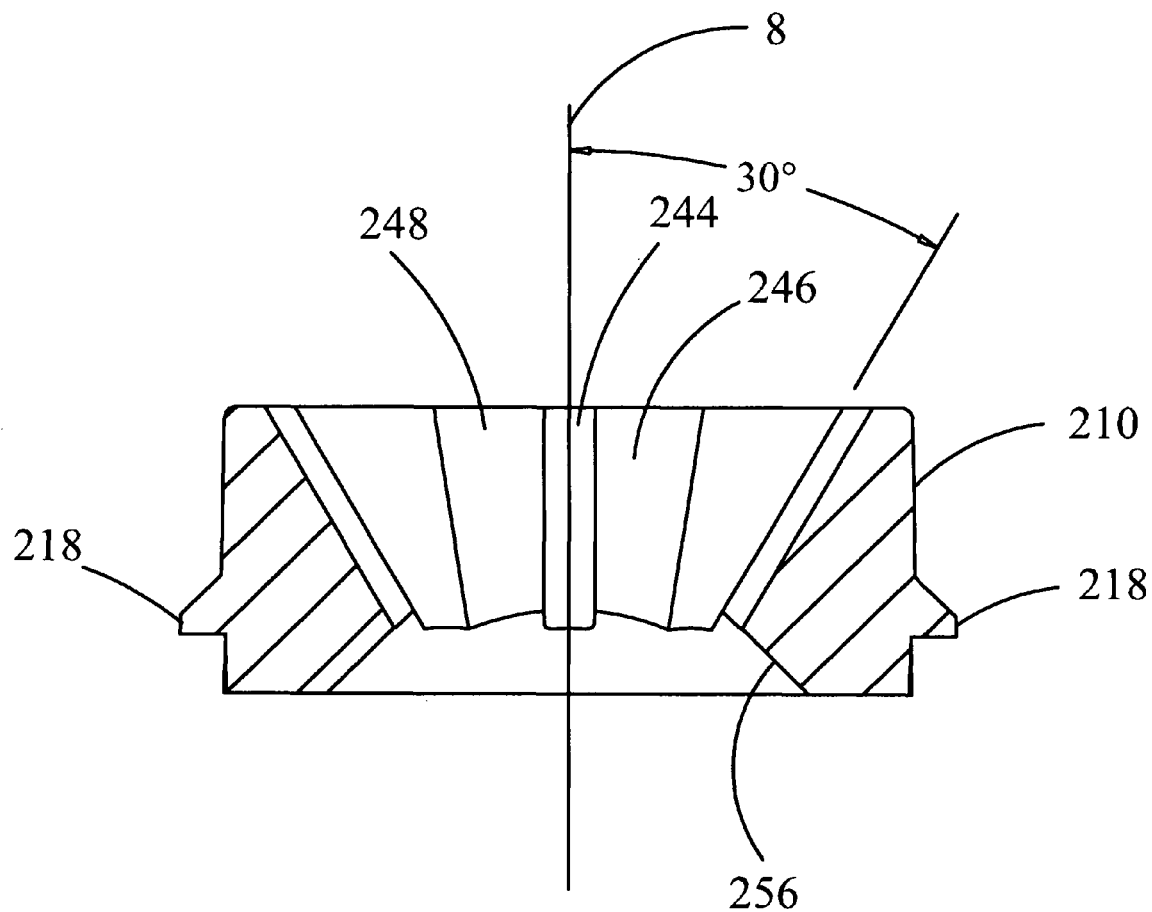

FIG. 50 is a sectioned end view of the end housing of FIG. 49 for the particular embodiment including ridges and slots.

Figure 51:
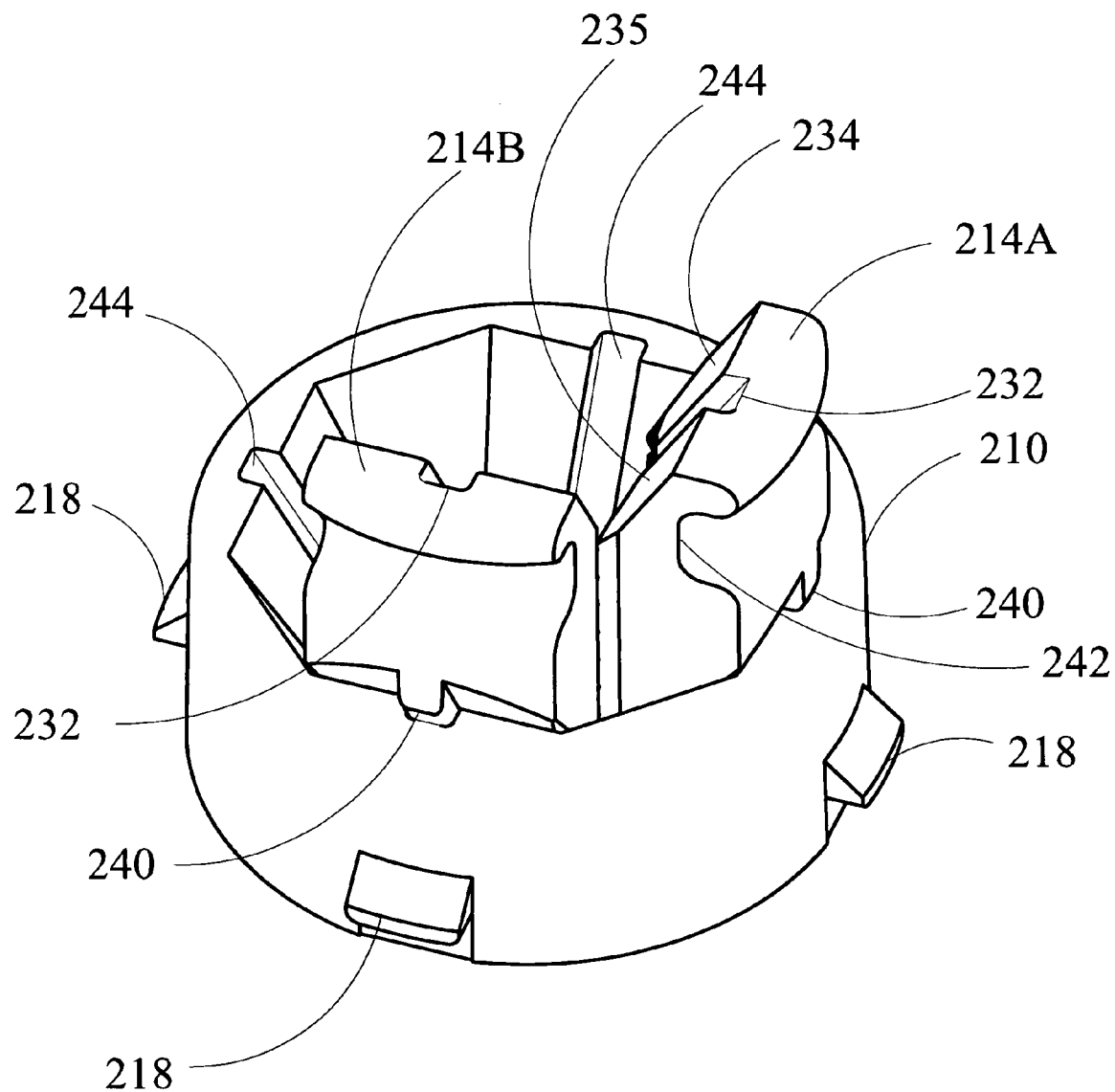

FIG. 51 is a three dimensional top perspective view of a typical end housing depicting segments in different positions for the particular embodiment including ridges and slots.

Figure 52:
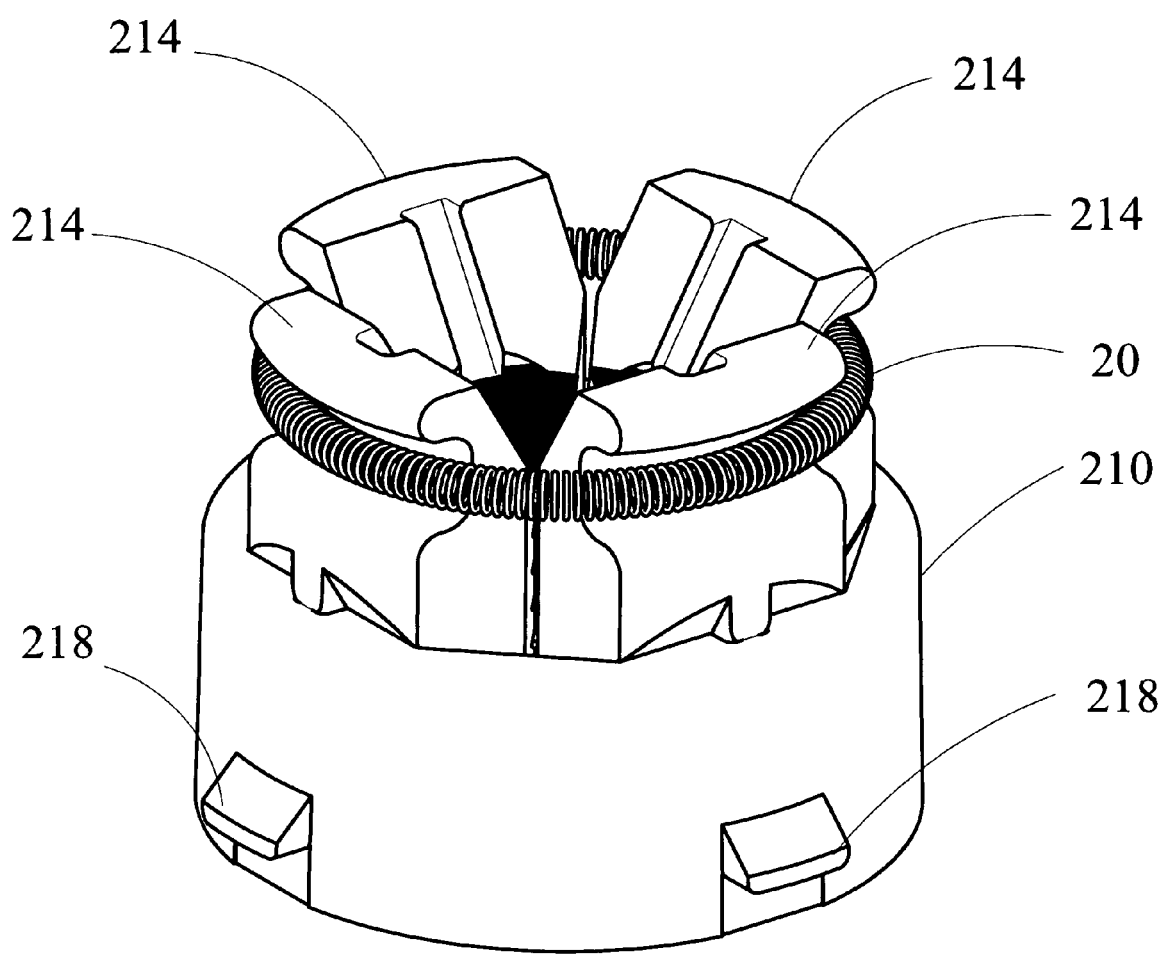

FIG. 52 is a three dimensional top perspective view of a typical end housing and four segments having identical threaded phase for the particular embodiment including ridges and slots.

Figure 53:
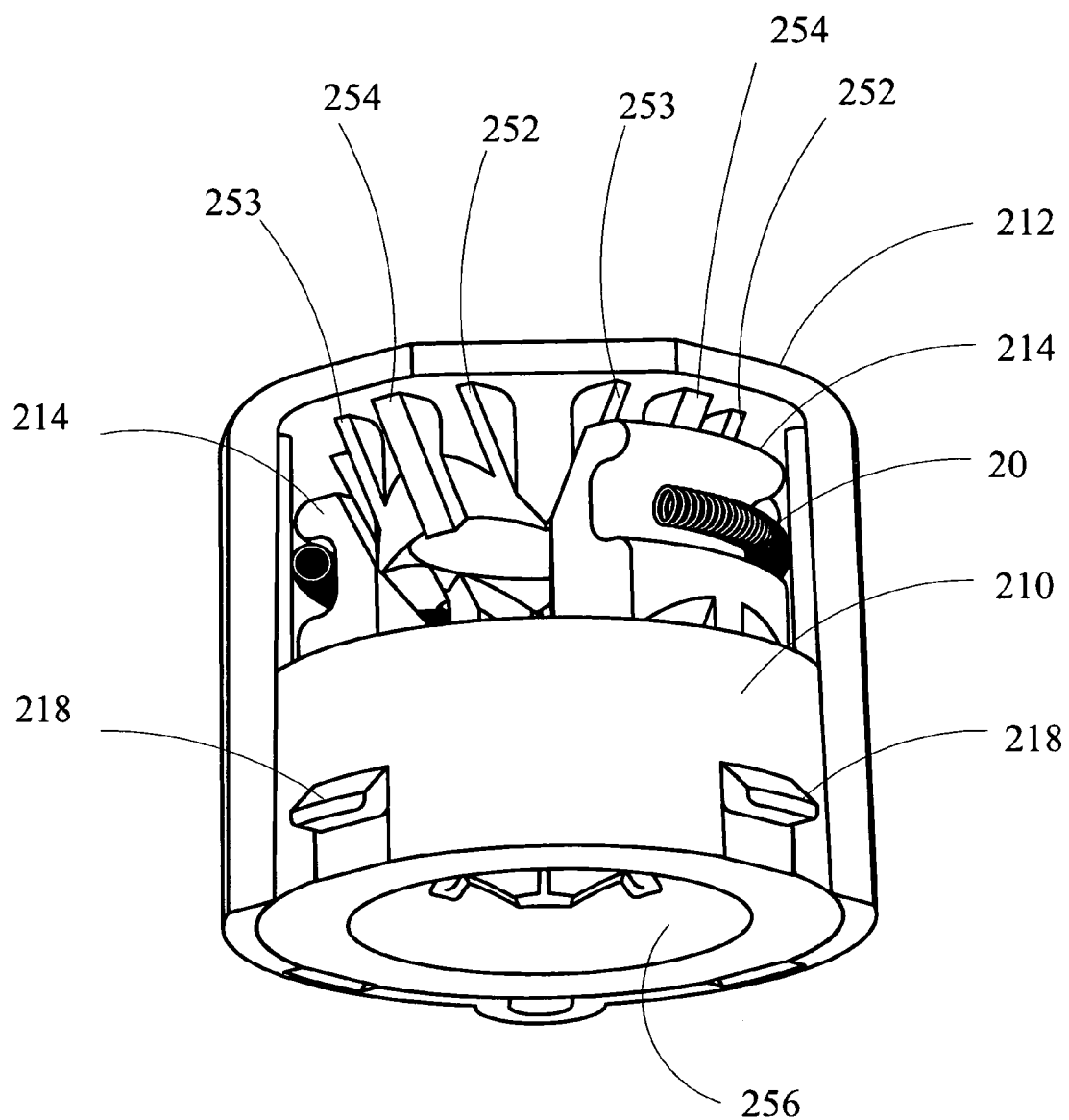

FIG. 53 is a bottom perspective view of a typical TCD with top housing partially removed to reveal internal components for the particular embodiment including ridges and slots.

Figure 54:
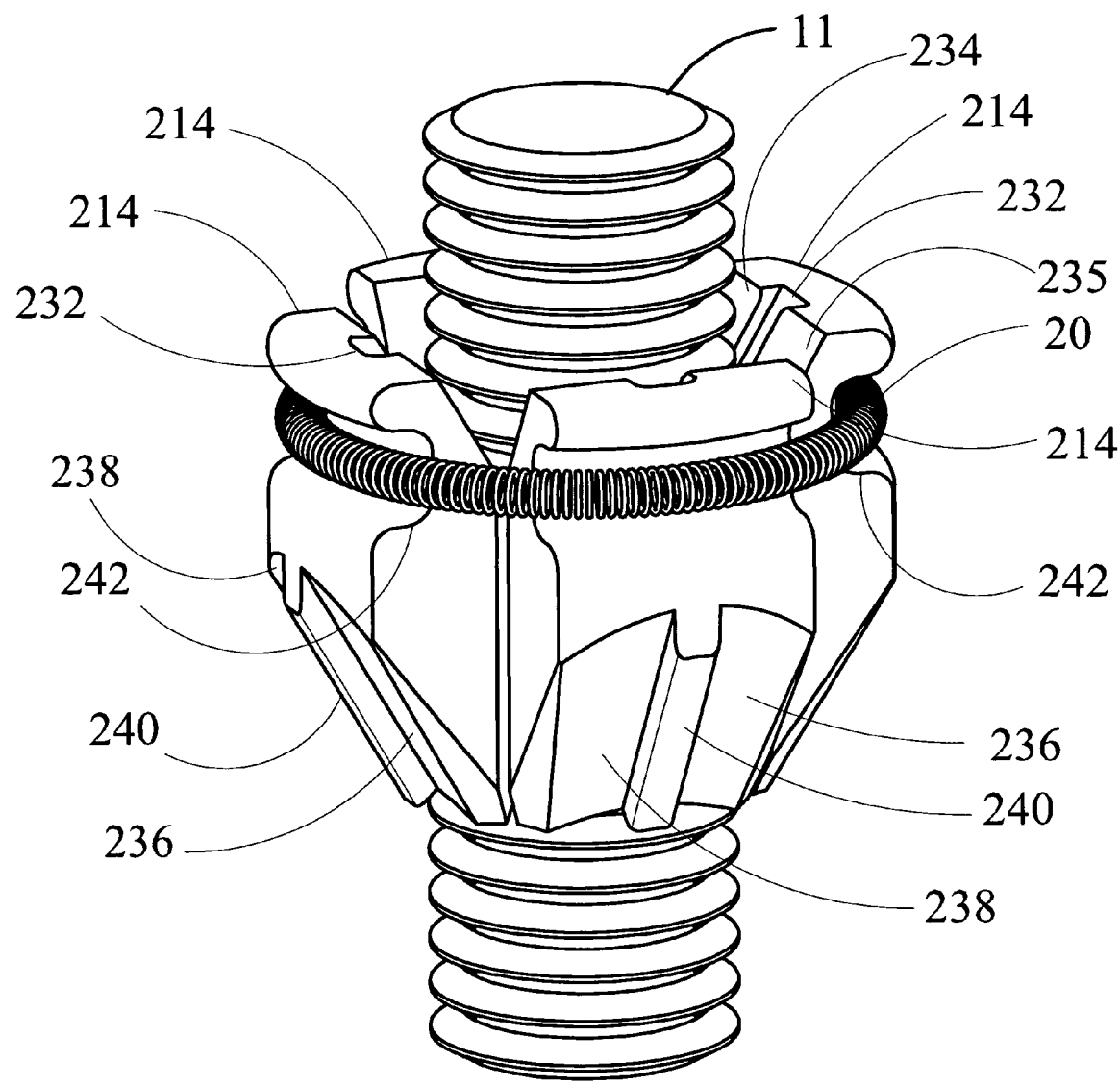

FIG. 54 is a top perspective view of four nut segments, coil springs and a threaded rod for the particular embodiment including ridges and slots.

Figure 55:
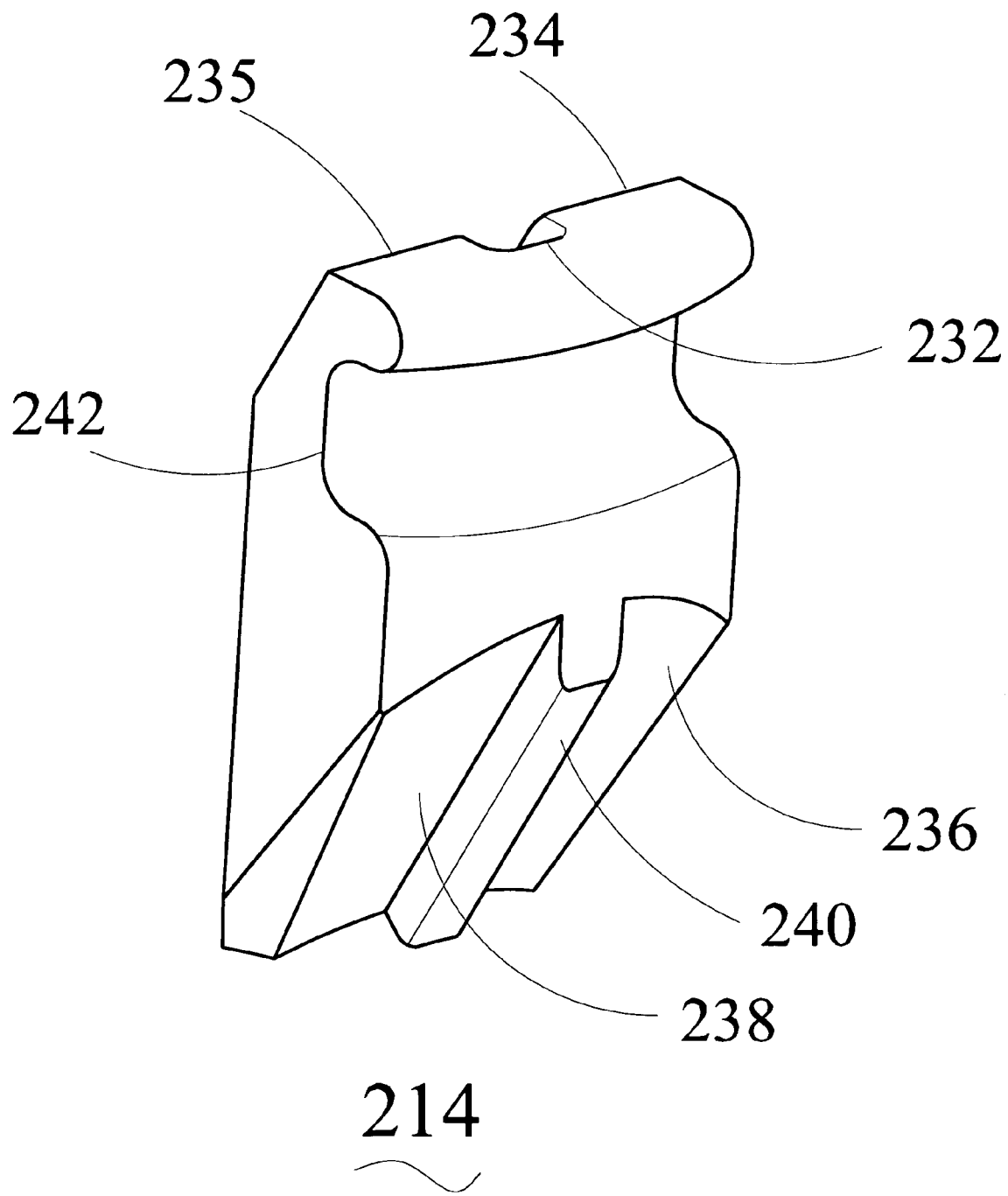

FIG. 55 is an expanded outer perspective view of a single nut segment for the particular embodiment including ridges and slots.

Figure 56:
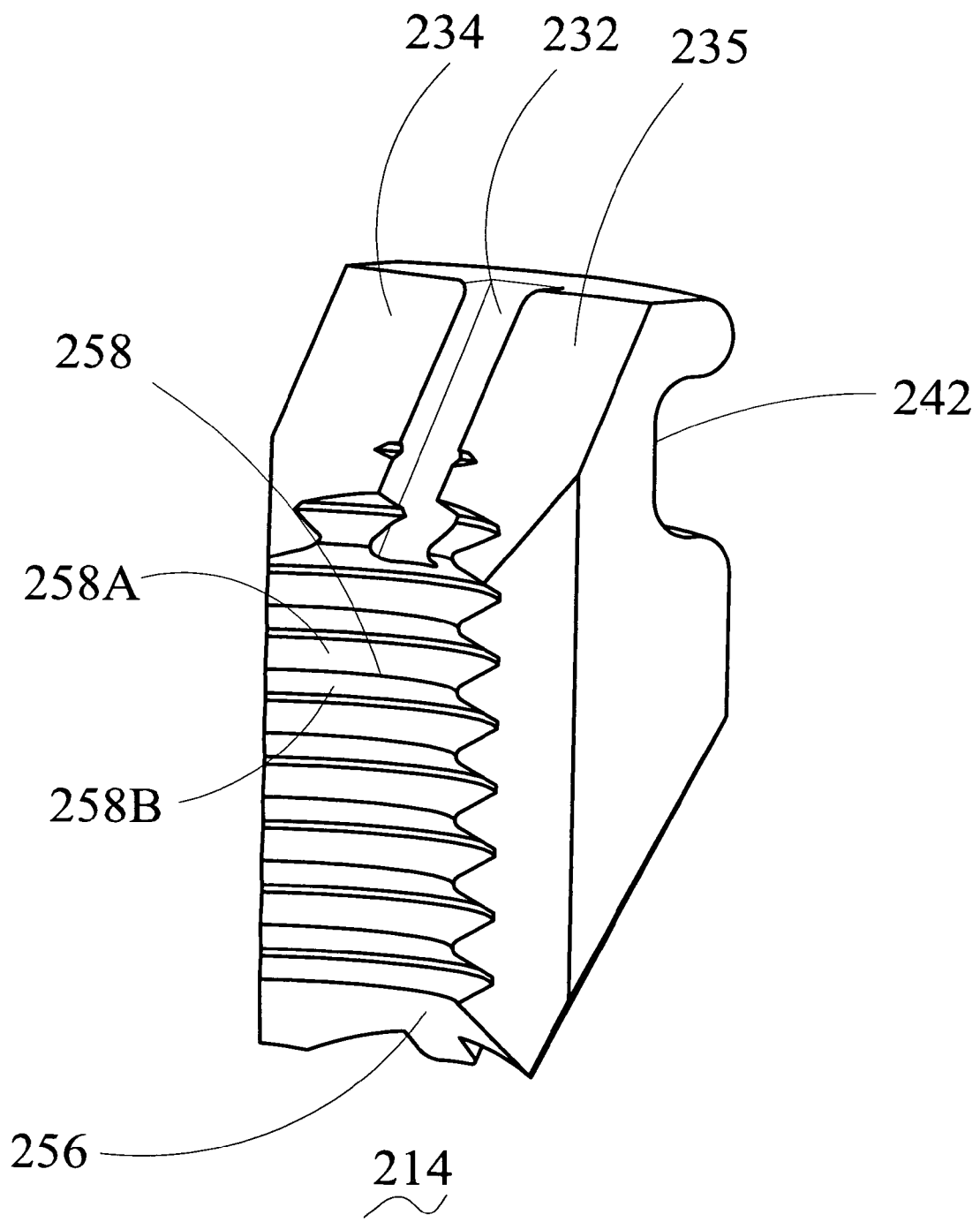

FIG. 56 is an expanded inner perspective view of a single nut segment for the particular embodiment including ridges and slots.

Figure 57:
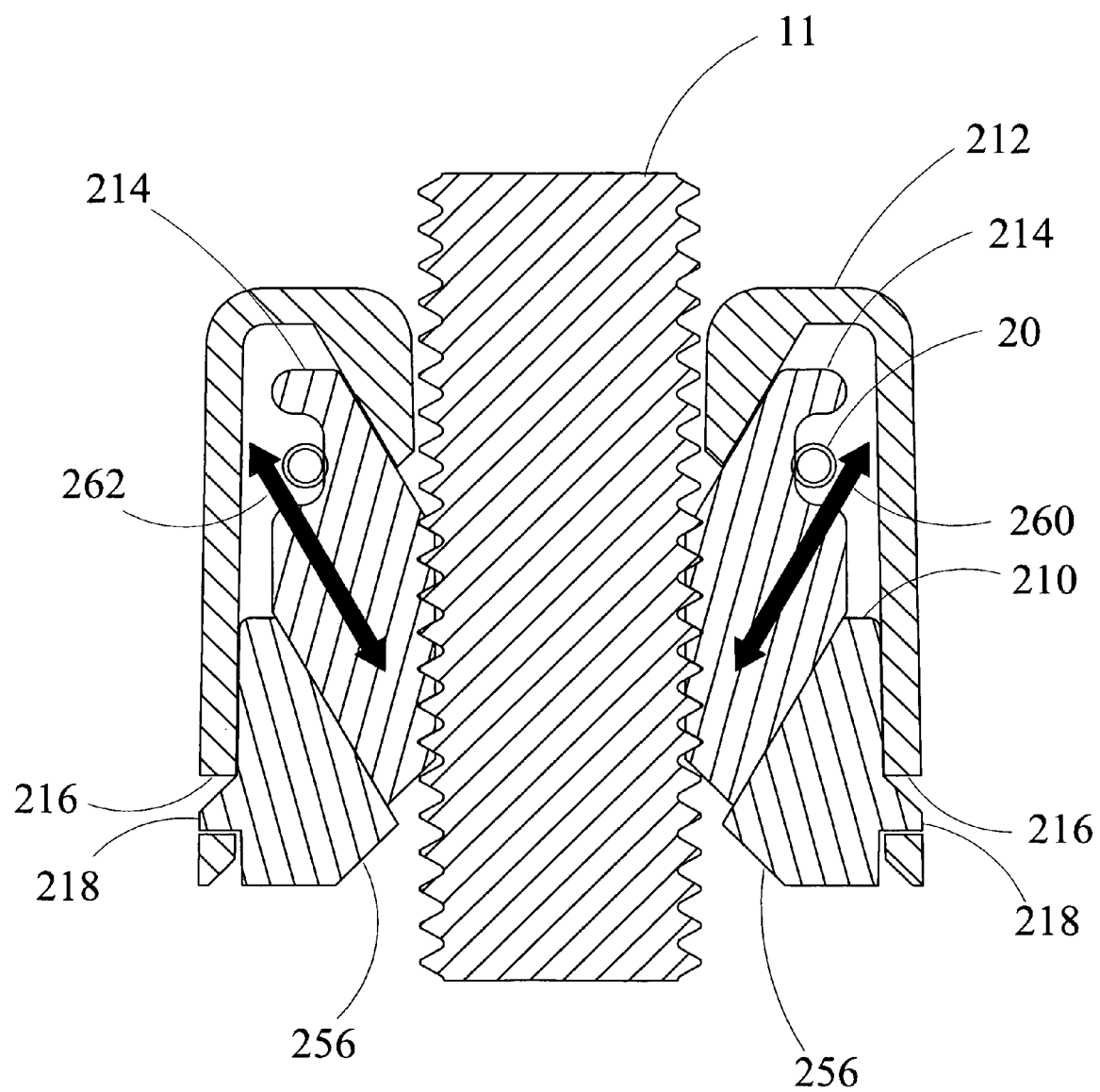

FIG. 57 is a cross sectional view of a typical TCD and threaded rod depicting motion direction.

Figure 58:
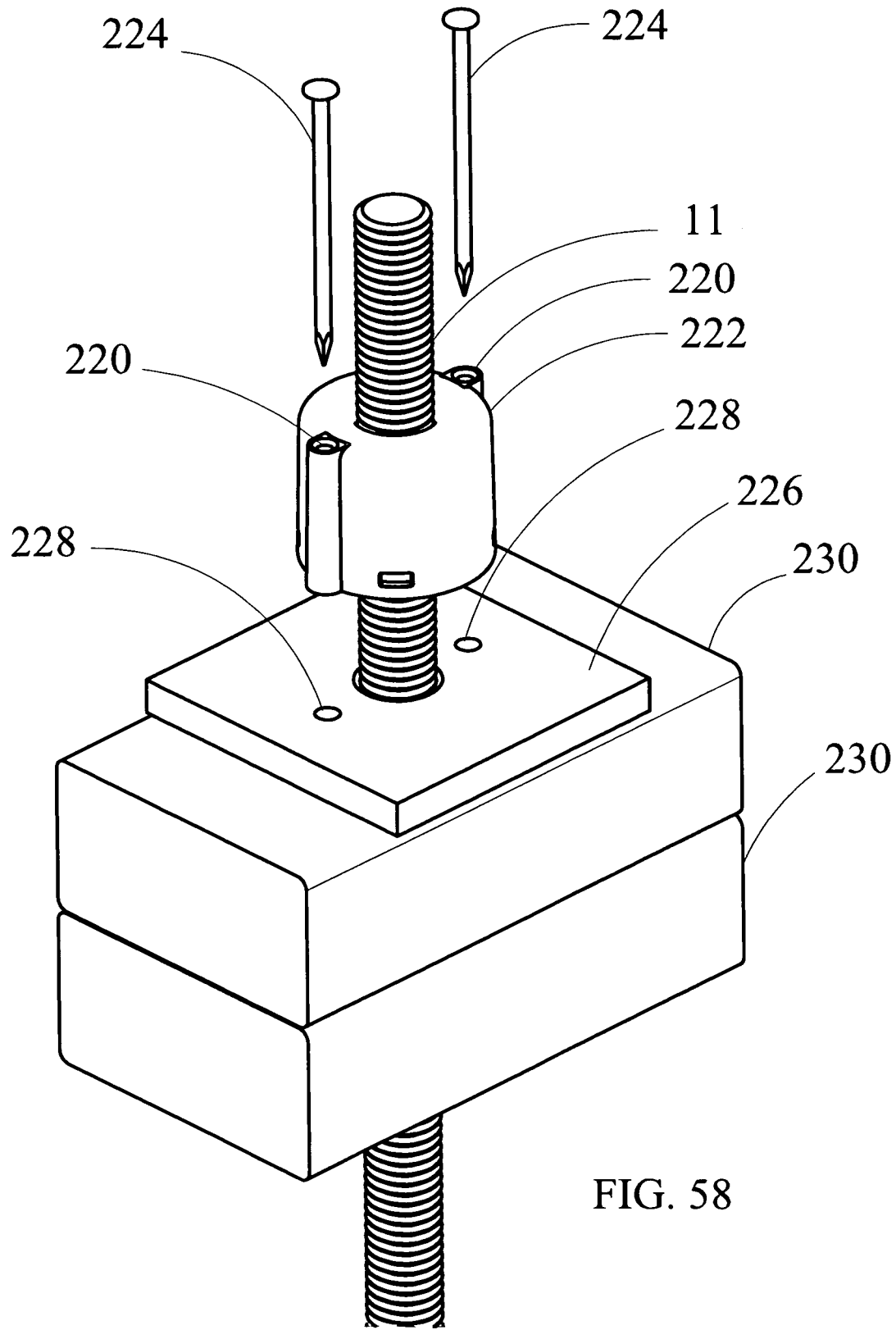

FIG. 58 is a perspective view of a typical assembly of TCD, fasteners and bearing plate.

Figure 59:
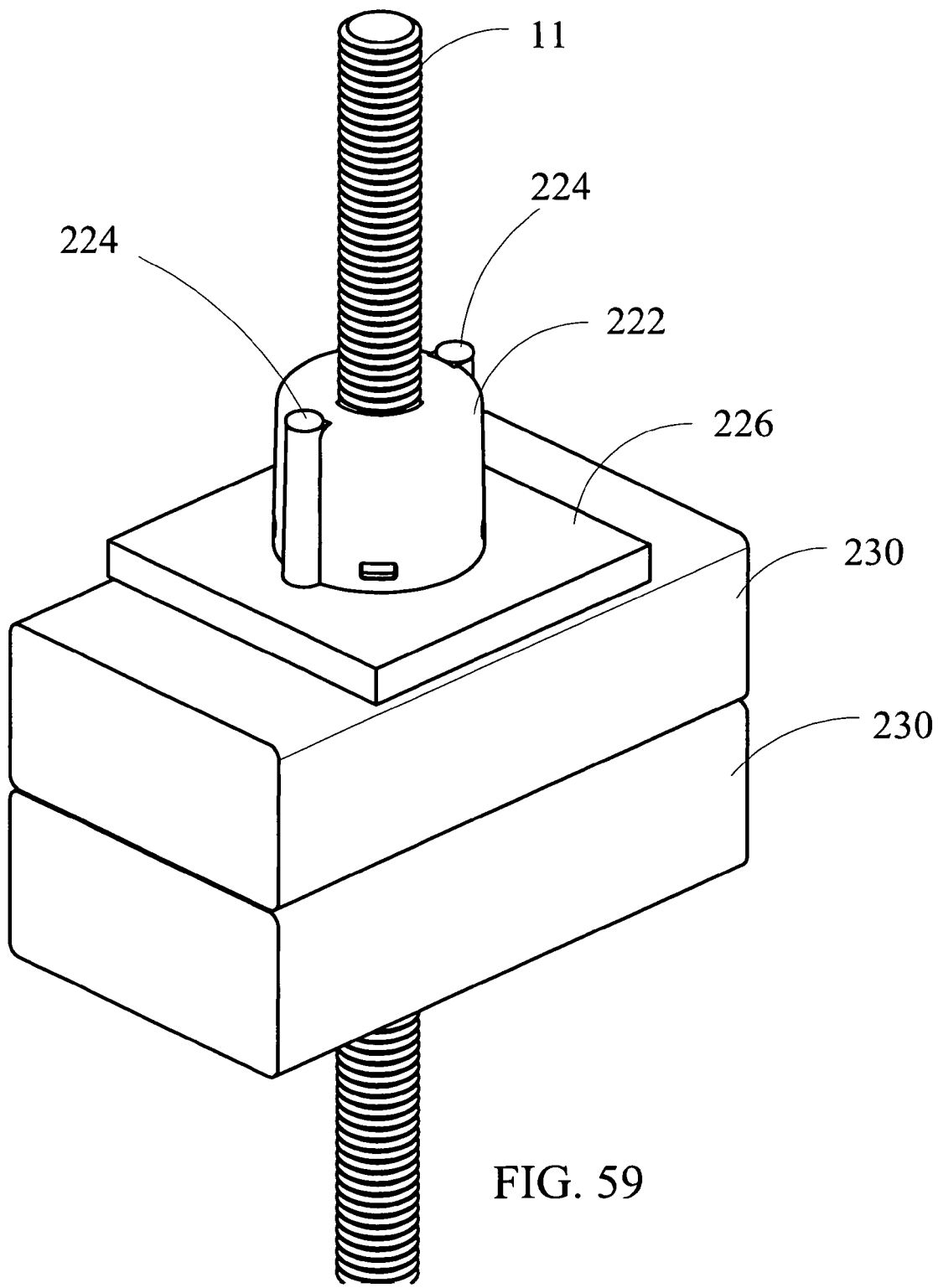

FIG. 59 is an expanded perspective view of a typical TCD and bearing plate installed on a structure.

Figure 60:
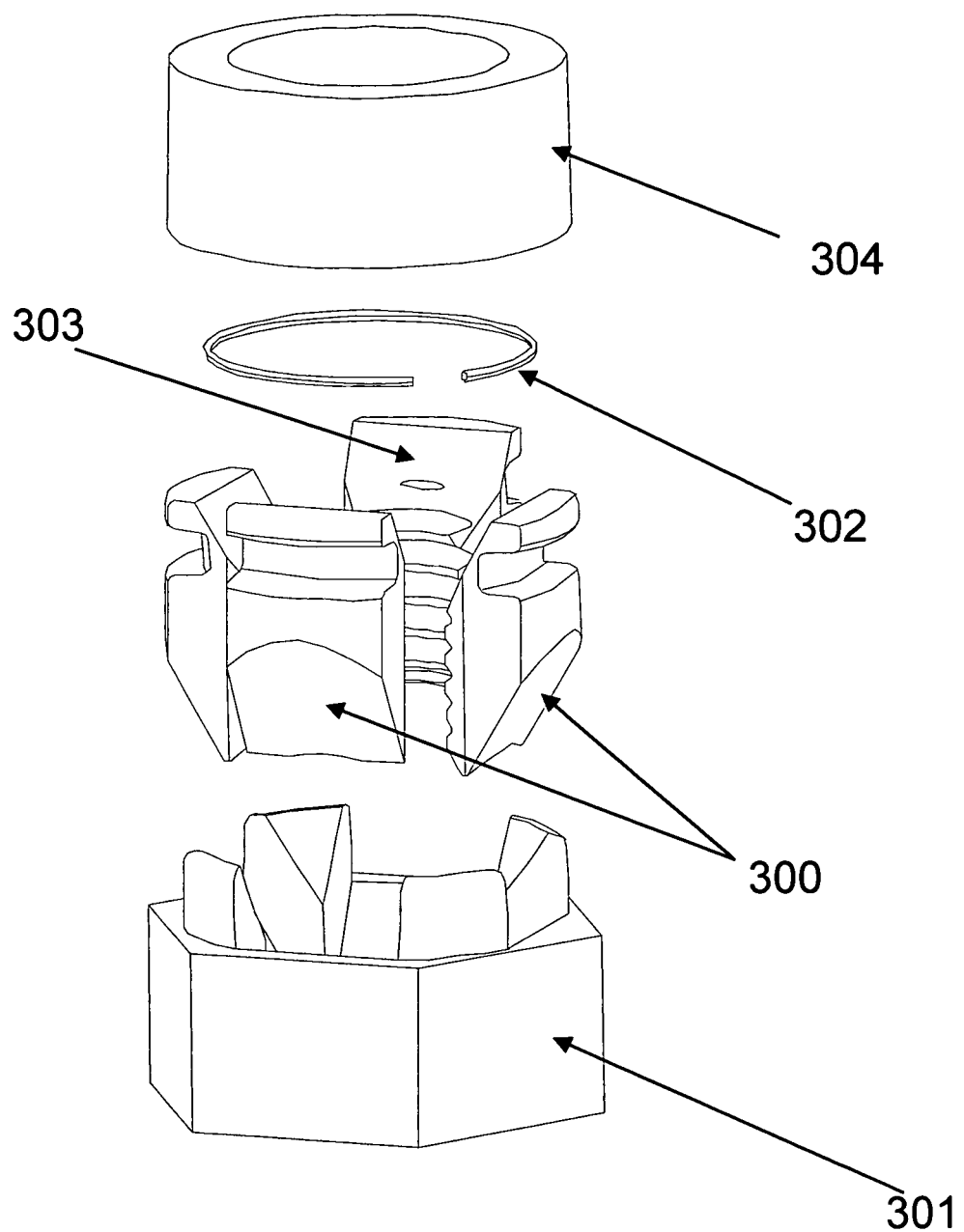

FIG. 60 is an exploded, perspective view of other TCD embodiments lacking slots and ribs.

DETAILED DESCRIPTION

After considering the following description, those skilled in the art will clearly realize that the teachings of the invention can be readily utilized in the construction of fasteners, thread clamping devices, self-adjusting shrinkage compensation devices, among other structures and devices.

FIG. 1 depicts, in perspective view, a typical thread clamping device ("TCD") 10 engaged with a threaded rod 11 in accordance with some embodiments of the present invention. FIGS. 2, 3 and 4 show top view, first side view and second side view respectively of TCD 10. FIG. 5 depicts a typical TCD 10 including a bottom end housing 12 (in short, "end housing"), nut segments 16A, 16B, 16C and 16D supported by end housing 12, and a top end housing 14 (in short, "top housing") engaging end housing 12 with one or more fasteners 22. For economy of language, "nut segments" are also referred to as "segments." Nut segments 16A, 16B, 16C and 16D are contained within top housing 14.

To be concrete in our descriptions, we describe herein the typical case in which four nut segments are used. However, this is not an essential limitation of the present invention as a different number of segments can be used. At least two segments are needed to enable the segments to move radially with respect to the threaded rod. An even number of segments is advantageous in that segments are thus positioned diametrically opposed across the threaded rod, loading the rod symmetrically with the opposing segments tending to be loaded equally. This is advantageous from the standpoint of stress distribution. But odd numbers of segments are not inherently excluded. Using a larger number of segments is disadvantageous in that the manufacturing cost of the TCD is likely to be increased, but also included within the scope of the present invention. Four segments are considered to be most advantageous from considerations of functionality, manufacturability and assembly.

Two coil springs 18 and 20 are shown surrounding nut segments 16A, 16B, 16C and 16D. At least one spring (or equivalent means) is needed for compressing the nut segments against the threaded rod. While one or two is an advantageous number pursuant to some embodiments of the present invention, it is not an essential limitation and more can be used.

To be concrete in our description, coil springs are depicted and discussed. However, other means of compression can also be used within the scope of the present invention, including a compressive loop as depicted as 302 in FIG. 60, a compressive loop without a gap, such as an O-ring. For economy of language, we refer to all such compressive devices as "springs."

In contrast to some prior art, the springs employed in the present TCD surround the segments circumferentially, in whole or in part. Thus, force exerted on the TDC along the direction of the rod (upward in FIG. 18), is directed outward by the inner planar sloping surfaces 36 (FIG. 5) of the segment engaging the top housing ramp 34 and provides the force to separate the segment from the threaded rod, allowing motion over the threads without rotation. The springs provide force (when needed) to maintain direct engagement between the inner planar segment surface 36 and the top housing ramp 34 ensuring separation of the segments from the threads of the rod. Thus, the overall structure of the TDC with its flat, parallel segment and housing surfaces has an additional advantage in requiring springs to exert forces only in the direction of the axis of the threaded rod, that is, radially. Thus, simple yet robust springs can be employed.

Fastener holes 24 are shown in the top view of FIG. 2. Mounting fasteners 26 are shown in FIG. 19. Mounting fastener 26 passing through fastener hole 24 and plate fastener hole 30 attaches TCD 10 to the shrinking medium 32 (typically wood) shown in FIG. 20. Upon installation of mounting fastener 26, bearing plate 28 is also attached in that bearing plate 28 is sandwiched between TCD 10 and the shrinking medium 32.

While the top housing 14 is typically shown with substantially cylindrical side surfaces, within the scope of the present invention, the top housing 14 of the TCD 10 also includes hexagonal, cubic, square or other substantially tubular configurations capable of accommodating threaded rod 11, and which is capable of including the components and features of the TCD 10 as described herein.

FIG. 5 illustrates a complete TCD 10 with various parts depicted in exploded view. While FIG. 5 shows two housing fasteners 22 (typically screws) to be mounted to end housing 12 so as to couple end housing 12 to top housing 14, a larger or smaller number of fasteners 22 can also be used (depending in part upon the shape of TCD 10), within the scope of the present invention. Above end housing 12 is shown the lower coil spring 18 and above spring 18 is upper coil spring 20.

Referring to FIG. 5, directly above spring 20 are shown nut segments 16A, 16B, 16C and 16D. Above segments 16A, 16B, 16C and 16D is shown top housing 14. The parts depicted in FIG. 5, when assembled, comprise a complete TCD 10 pursuant to some embodiments of the present invention.

Also shown in FIG. 5 are slots 38, right inner bearing surfaces 40 and left inner bearing surfaces 41 in end housing 12. There are, in this example, four slots 38, four right inner bearing surfaces 40 and four left inner bearing surfaces 41 arranged in a substantially equidistant polar array relative to central axis 8 (see FIG. 7). In TCD 10, central axis 8 is substantially coincident with the axis of threaded rod 11).

Inner bearing surfaces 40, 41 and slot 38 are defined as a "feature set". Also slot 38, right inner bearing surface 40 and left inner bearing surface 41 typically have an orientation of substantially 30 degrees relative to central axis 8. FIG. 5 also shows nut segment ribs (or "ridges") 46, segment upper spring groove 42, segment lower spring groove 44, left outer segment surface 48 and right outer segment surface 50. There is generally one nut segment rib 46, one segment upper spring groove 42, one segment lower spring groove 44, one inner sloping surface (or "inner sloping segment surface") 36, one left outer segment surface 48 and one right outer segment surface 50 for each segment 16A, 16B, 16C and 16D. In the following descriptions various configurations of nut segment assemblies will be described. For economy of language, we define segments 16A, 16B, 16C and 16D as shown in FIG. 5 as Nut Segment Assembly I or "NSA-I." Note: "rib" and "ridge," are used interchangeably herein and without distinction.

FIG. 6 is a top view of end housing 12. Shown in top view are right inner bearing surface 40, left inner bearing surface 41 and slot 38.

FIG. 7 shows slot 38 and surfaces 40 and 41 as substantially parallel and at substantially a 30 degree angle relative to central axis 8. In an assembled configuration (as depicted, for example, in FIG. 5), segment surfaces 48 and 50 bear against end housing surfaces 40 and end housing surface 41 respectively for each of the four segments 16A, 16B, 16C, 16D.

In an assembled configuration as depicted in FIG. 5 for example, left and right outer segment surfaces 48 and 50 respectively bear against right and left inner bearing surfaces 40 and 41 respectively for each of the four nut segments 16A, 16B, 16C and 16D.

For economy of language, we refer to nut segments 16A-16D as "segments," inner bearing surfaces 40 and 41 as "end housing surfaces," and left and right outer segment surfaces 48 and 50 as "segment surfaces."

The end housing surfaces 40 and 41 lie in a single plane separated into two (left and right) surfaces by slot 38. Similarly, segment surfaces 48 and 50 lie in a single plane separated by nut segment rib 46.

FIG. 8 is a three dimensional top perspective view of end housing 12 depicting only two nut segments 16B and 16C. Segment 16C is shown in an engaged position and segment 16B is shown in an extreme disengaged position. It can also be observed that nut segment rib 46 resides substantially within slot 38. All nut segment ribs 46 reside in their respective slots 38.

FIG. 9 is a three dimensional top perspective view of end housing 12 with all four nut segments 16A, 16B, 16C and 16D in the engaged position. In some embodiments of the present invention, nut segments 16A, 16B, 16C and 16D are comprised of four individual, substantially equal sized segments (defined as Nut Segment Assembly I, or NSA-I) held by one or more springs 20 and 18 such that each of the four individual segments engage to substantially the same axial position on threaded rod 11. In this embodiment, the segments are not geometrically identical. The segments in this assembly are physically different in that different segments have different thread phase. Since a thread advances axially one thread pitch for each revolution of the thread, (that is, the thread follows a spiral path), each segment must have its respective thread at a different axial position than any of the other three segments. Each of the four segments has its thread phase one quarter of a thread pitch in difference than an adjoining segment. In these embodiments, segments 16A, 16B, 16C and 16D ratchet approximately at the same moment each time the rod 11 moves one thread pitch in the ratcheting direction with respect to TCD 10. It should also be noted that by changing the sequence of the segments radially around threaded rod 11 the motion of the segments change relative to one another whereas the ratcheting of the segments will not occur at the same moment each time the rod 11 moves one thread pitch.

The effect of thread phase can most easily be understood by considering a standard hex nut cut along the central (thread) axis into 4 substantially equal pieces. Each piece contains a quarter of a full revolution and, hence, a quarter of a thread phase different from the adjoining pieces. If the pieces were to be rejoined, they would screw down a threaded rod just as they did before the hex nut was cut so long as they are rejoined in the same sequence as before separation. However if you exchange any two of the pieces before rejoining (that is, alter the circumferential sequence, "scrambling" the sequence) the resulting assembly will jam when an attempt is made to screw this scrambled assembly down a threaded rod because the scrambled pieces are out of correct thread phase position. If one examines the inside thread spiral it will not be a uniform continuous thread spiral but will have discontinuous jumps at the rejoined boundaries.

However, in contrast interchanging the position of nut segments in a TCD allows different ratcheting options and, because the TCD segments move independently, the TCD will successfully screw and unscrew correctly when engaging a threaded rod of matching pitch diameter and thread pitch.

FIG. 10 is a three dimensional top perspective view of end housing 12 with all four nut segments 16A, 16B, 16C and 16D in the disengaged position.

FIG. 11 is a three dimensional top perspective view of end housing 12 and all four nut segments 16A, 16B, 16C and 16D with the positions of segments 16B and 16D exchanged from that depicted in FIG. 10. When viewed from the top (see FIG. 2) and counting in a counter clockwise polar direction starting with segment 16A, the sequence of FIG. 11 is thus is 16A, 16D, 16C and 16B. This is identified as "Nut Segment Assembly II" or "NSA-II". Unless otherwise noted, when describing any nut segment assembly, the sequence is presumed to be viewed from the top and enumerated in a counter clockwise direction. NSA-II is distinct from that depicted in FIG. 9 (for example) which is 16A, 16B, 16C, 16D and denoted herein as "Nut Segment Assembly I" or "NSA-I."

FIG. 12 is a three dimensional top perspective view of end housing 12. Four nut segments are shown. In this configuration all segments are the same and denoted as 16A. When viewed from top and counting in a counter clockwise polar direction starting with segment 16A the sequence is 16A, 16A, 16A and 16A or NSA-III. This is different from nut segment assembly NSA-I where the sequence is 16A, 16B, 16C and 16D. NSA-III denotes an assembly of segments that are geometrically identical (16A for example, but any of the other segments suffice for NSA-III), and also have the same thread phase. In the NSA-III configuration, the segments do not move in and out (towards and away from threaded rod 11) in unison. Thus, while the segments of NSA-I move in and out in unison, those of NSA-III do not, but both function as a TCD within the scope of the present invention.

FIG. 13 is a three dimensional bottom perspective view of a TCD with a portion of end housing 12 removed and portions of top housing 14 removed. Also nut segments 16A and 16C are depicted as having been sliced in half and one half removed for clarity. Also nut segment 16D has been removed to reveal internal ramps 34 ("ramps"). Eight ramps are typically present in top housing 14 although not all are depicted in FIG. 13. However there could be more or less ramps depending on the size of the TCD among other factors. The ramps 34 are part of top housing 14 and are substantially parallel to end housing surfaces 40 and 41 respectively. The ramps 34 are advantageously configured in pairs. Each ramp pair engages the inner sloping surface 36 of a single nut segment. There are typically four slots 38 in end housing 12. Each ramp pair is typically arranged in a quadrature polar array about central axis 8 (that is, every 90 deg. about central axis 8).

FIG. 14 is a three dimensional top perspective view of a typical TCD with half of top housing 14 removed to reveal the internal components (except for segment 16D which has also been removed). As can be seen, nut segments 16A, 16B, 16C with upper coil spring 20 and lower coil spring 18 are located substantially within top housing 14 and end housing 12 of TCD 10. Also shown in FIG. 14 are inner sloping surfaces 36 bearing against ramps 34. The surfaces of ramps 34 are in edge view in FIG. 14.

FIG. 15 is a three dimensional perspective view of nut segments encircled by lower and upper coil springs 18 and 20 respectively (referred to collectively as "coil springs") and engaged to threaded rod 11. As shown, coil springs 18 and 20 reside in grooves 44 and 42 respectively in each segment 16A, 16B, 16C and 16D in the assembled configuration. The segments are shown in FIG. 9 in the same position with respect to threaded rod 11 as they are in FIG. 15.

FIG. 16 is an expanded three dimensional outer perspective view of one nut segment of TCD 10 in accordance with one embodiment of the present invention. FIG. 16 depicts segment upper spring groove 42, segment lower spring groove 44, left outer segment surface 48, right outer segment surface 50 and nut segment rib 46.

FIG. 17 is an expanded three dimensional inner perspective view of one segment, such as 16A, 16B, 16C or 16D, of nut assembly NSA-I of TCD 10. Also depicted in FIG. 17 are inner sloping surface 36, segment upper spring groove 42, segment lower spring groove 44 and segment thread 52.

FIG. 18 is a cross sectional view of a TCD engaged with threaded rod 11 in accordance with one embodiment of the present invention. Also shown in cross section in FIG. 18. are any two opposing nut segments (such as 16A and 16C), lower coil spring 18, upper coil spring 20, bottom end housing 12 and top end housing 14. Also shown are directions of motion 56 and 58.

FIGS. 5, 18 and 60 depict yet another important feature of some embodiments of the present invention. As the segments move in the direction indicated by arrows 56, 58 in FIG. 18, the planar inner sloping segment surfaces 36 (in FIG. 5, 303 in FIG. 60) slide along top housing ramp 34 of the top end housing 14 (304 in FIG. 60). When the segment is moving upward, only the planar inner sloping segment surface 36 or 303 need to contact ramp 34 of top end housing 14 for proper segment guidance. When the segment is moving in the opposite direction, only the planar outer segment surfaces 48, 50 in FIG. 5 or 300 in FIG. 60 need to contact the corresponding planar inner bearing (or end housing) surfaces 40, 41 in FIG. 5 but largely hidden by bottom end housing 301 in FIG. 60. For the embodiment depicted in FIG. 60 lacking segment ribs, slots in the bottom end housing are superfluous and may be omitted. For this segment motion to be smooth yet robust, it is important that the surfaces be substantially planar and substantially parallel or the segment may jam if there is insufficient clearance between the segment inner sloping surface 36 or 303 and top housing ramp 34 in FIG. 18 (but not separately depicted in FIG. 60).

Thus, each nut segment has both an inner and an outer planar surface in a substantially parallel configuration, as an uninterrupted planar surface (FIG. 60) or in some embodiments separated by a segment rib (FIG. 18). The planar inner segment surface is depicted by 36 in FIG. 5 and 303 in FIG. 60. The planar outer segment surface is depicted by 300 in FIG. 60 and surfaces 48 and 50 in FIG. 5. In those embodiments having a slot and ridge, the ridge divides a single plane into two coplanar parts such as 48, 50 in FIG. 5. This single plane (divided by the ridge) is parallel to the plane of the ramp, 34 in FIG. 18. This use of planar surfaces, not curved, and in a parallel configuration as depicted herein, leads to a particularly robust TCD less prone to jamming or other malfunction in actual service in the field whether or not divided by a segment rib.

While the planar configurations for the segment inner sloping surface 36 or 303 and ramp 34 are expected to be the most useful structures in practice, other structures can be used within the scope of the present invention. We note firstly that planar interactions between these surfaces can have many variations such as plateaus, slots, among others, and still provide the essential guiding functions that ramp 34 and inner segment surface 36 or 303 are called upon to carry out in some embodiments of the present invention. In addition, ramp 34 and segment inner sloping surface 36 or 303 many have numerous non-planar geometric configurations so long as they form at least one line of contact upon contact between the inner segment surface 36 or 303 and ramp 34. For example, two cylinders of different radii, a cone and a plane, among others are suitable candidates. The line (or lines or plane) of contact between the inner segment surface 36 or 303 and ramp 34 must be substantially parallel to planar inner bearing surface 40, 41 of bottom end housing 12 in FIG. 5 or the corresponding inner bearing surface of bottom end housing 301 in FIG. 60. This parallelism must remain in effect over the total range of motion of the segment shown by arrows 56, 58 in FIG. 18 such that planar outer segment surfaces 48, 50 or 300 remain substantially parallel to planar inner bearing surfaces 40, 41 of end housing 12 in FIG. 5 and the corresponding surfaces in bottom end housing 301 of FIG. 60.

FIG. 19 is a top perspective exploded view of a typical assembly of TCD 10, mounting fasteners 26, fastener holes 24 and bearing plate 28. Also shown is plate fastener hole 30 in bearing plate 28.

FIG. 20 is a top perspective view of TCD 10, mounting fasteners 26 and bearing plate 28 shown installed to the shrinking medium 32 and engaged to threaded rod 11. This combination of TCD 10, mounting fasteners 26 and bearing plate 28 comprise one embodiment of a self-adjusting shrinkage compensation device.

FIG. 21 depicts a partial stud structure including TCD 10 in the installed configuration. FIG. 21 depicts a typical configuration of foundation 54, threaded rod 11, TCD 10 and bearing plate 28 shown installed to the shrinking medium 32 with screws or other mounting fasteners (not visible in FIG. 21) and engaged to threaded rod 11.

FIG. 44 is a perspective view of another embodiment of TCD 222 engaged to a threaded rod 11 in accordance with other embodiments of the present invention. FIGS. 45, 46 and 47 show top view, first side view and second side view respectively of TCD 222. FIG. 48 depicts a disassembled view including TCD 222 including an end housing 210, nut segments 214 supported by end housing 210, and a top housing 212 engaging end housing 210 with one or more tabs 218. Nut segments 214 are contained within top housing 212. Surrounding nut segments 214 is a coil spring 20. For embodiments only having a single coil spring such as that depicted in FIG. 48, we omit the distinction of upper coil spring and lower coil spring. TCD 22 is depicted as having four identical nut segments 24 and therefore has the ratcheting properties described above for NSA-III.

FIG. 45 also shows fastener holes 220. FIG. 58 shows mounting fasteners 224. Mounting fastener 224 passing through fastener holes 220 and plate fastener holes 228 attaches TCD 222 to the shrinking medium 230 (typically wood) as shown in a typical configuration in FIG. 59.

Upon installation of mounting fastener 224, bearing plate 226 is also attached in that bearing plate 226 is sandwiched between TCD 222 and the shrinking medium 230.

To be concrete in our depictions, top housing 212 is shown with substantially cylindrical side surfaces, but this is not an essential limitation of the present invention. Within the scope of the present invention, top housing 212 of the TCD 222 can include hexagonal, cubic, square or any other substantially tubular configuration capable of accommodating threaded rod 11, and which is capable of including the components and features of the TCD 222 or other embodiments.

FIG. 48 depicts TCD 222 with all parts shown in exploded view. To be concrete in our depiction, but not restrictive, four tabs 218 are shown on end housing 210 and four tab holes 216 are shown in top housing 212 that are used to couple top housing 212 to end housing 210. There is generally one tab hole 216 for each tab 218. However, within the scope of the present invention, depending upon the shape of TCD 222, less or more tabs 218 and tab hole 216 pairs may be used.

Above end housing 210 is shown a coil spring 20. FIG. 48 shows nut segments 214 directly above coil spring 20. Top housing 212 is shown above segments 214. The parts depicted in FIG. 48, when assembled, comprise a complete TCD 222.

Also shown in FIG. 48 are slots 244, right inner bearing surfaces 246 and left inner bearing surfaces 248 in end housing 210. There are, in this example, four slots 244, four right inner bearing surfaces 246 and four left inner bearing surfaces 248 arranged in an equidistant polar array relative to central axis 8 (see FIG. 50) in TCD 222 in end housing 210. TCD 222 has central axis 8 substantially coincident with the axis of threaded rod 11. Inner bearing surfaces 246, 248 and slots 244 are defined as a feature set. Also slot 244, right inner bearing surface 246 and left inner bearing surface 248 have an orientation of substantially 30 degrees relative to central axis 8.

FIG. 48 also shows nut segment ribs 240, segment spring groove 242, left outer segment surface 238 and right outer segment surface 236. There is one nut segment rib 240, one segment spring groove 242, one left outer segment surface 238 and one right outer segment surface 236 for each nut segment 214. Various configurations of nut segment assemblies can be used within the scope of various embodiments of the present invention. The four nut segments 214 as shown in FIG. 48 are denoted as "Nut Segment Assembly IV" or "NSA-IV."

FIG. 49 is a top view of end housing 210. Shown in top view are right and left inner bearing surfaces 246 and 248 and slot 244.

FIG. 50 shows slot 244 and inner bearing surfaces 246 and 248 as substantially parallel and at substantially a 30 degree angle to central axis 8. As depicted in FIG. 48, right and left outer segment surfaces 236 and 238 bear against right inner bearing surface 246 and left inner bearing surface 248 respectively for each of the four nut segments 214. Inner bearing surfaces 246 and 248 lie in a single plane separated into two surfaces by slot 244. Similarly, outer segment surfaces 236 and 238 lie in a single plane separated by nut segment rib 240.

FIG. 51 is an upper perspective view of end housing 210 in which only two nut segments are shown, 214A and 241B. Segment 214A is shown in an engaged position and segment 214B is shown in an extreme disengaged position. It can also be observed that nut segment rib 240 resides substantially within slot 244. All nut segment ribs 240 reside in their respective slots 244.

FIG. 53 is a three dimensional bottom perspective view of a TCD with a portion of end housing 210 removed and portions of top housing 212 removed. Also one nut segment 214 has been removed for clarity revealing internal ramps 252 (right ramp), 253 (left ramp), and center rib 254. Four right ramps 252, four left ramps 253 and four center ribs 254 are depicted. However, this number is not an essential limitation of the present invention and there could be more or less depending on the size of the TCD and other factors.

The ramps 252 and 253 and center ribs 254 are part of top housing 212 and are parallel to respective end housing 210, inner bearing surfaces 246 and 248. The ramps 252 and 253 are typically configured in pairs. Each ramp pair engages a single nut segment top surface 234 (left top surface) and 235 (right top surface). Each ramp pair is arranged in a quadrature polar array about axis 8. Also shown are four tabs 218 extending outwardly from end housing 210.

FIG. 54 is a three dimensional perspective view of four nut segments 214 encircled by coil spring 20 comprising NSA-IV and engaged to threaded rod 11. It is shown that spring 20 resides in groove 242 in each segment 214 respectively in the assembled configuration. The segments are shown in FIG. 52 in the same position with respect to threaded rod 11 as in FIG. 54.

FIG. 55 is a three dimensional outer perspective view of one nut segment 214 in accordance with some embodiments of the present invention. FIG. 55 depicts spring groove 242, left outer segment surface 238, right outer segment surface 236 and rib 240. FIG. 56 is a three dimensional inner perspective view of segment 214 of NSA-IV of TCD 222. Also shown are nut segment top surfaces 234 and 235, groove 242, segment slot (or slot) 232 and segment thread 258.

FIG. 57 is a cross sectional view of TCD 222 engaged with threaded rod 11 in accordance with some embodiments of the present invention. Also shown in cross section are any two opposing nut segments 214, coil spring 20, end housing 210 and top housing 212. Also shown are motion directions 260 and 262. Other features shown are tabs 218 and tab holes 216.

FIG. 58 is a top perspective exploded view of TCD 222, mounting fasteners 224 and bearing plate 226. Also shown is plate fastener hole 228 in bearing plate 226 above shrinking medium 230.

FIG. 59 is a top perspective view of TCD 222, mounting fasteners 224 and bearing plate 226 shown installed to the shrinking medium 230 and engaged to threaded rod 11. This combination of TCD 222, fasteners 224 and bearing plate 226 comprise a self-adjusting shrinkage compensation device.

Referring to FIG. 44 TCD 222 may be configured to move along threaded rod 11 in one direction without rotation of TCD 222, and to not move in the opposite direction without rotation. The direction of motion whereby the TCD moves along threaded rod 11 without rotation shall be defined as the "ratcheting direction" and the opposite direction of motion as the "non-ratcheting direction". In particular, in accordance with some embodiments of the present invention, the TCD may be configured to be engaged to threaded rod 11 such that a single downward hand movement of the TCD down the length of threaded rod 11 will correspondingly move TCD 222 in the ratcheting direction to a predetermined position on threaded rod 11. Once in place, an upward hand movement of the TCD along the length of threaded rod 11 will be met with an opposing force such that the TCD will not move in the non-ratcheting direction. Rather, in order to move the TCD in the non-ratcheting direction of threaded rod 11 (typically the upward direction when used in wooden structures), the TCD is rotated along the threads of threaded rod 11. The most common configuration with respect to a TCD engaged to a vertical threaded rod 11 is where (when viewed from above) a clockwise rotation of the TCD will advance the TCD downward with respect to threaded rod 11 and a counter-clockwise rotation of the TCD will advance the TCD upward with respect to threaded rod 11.

It should be noted that while the above description is discussed with respect to upward and downward movements of the TCD along the length of threaded rod 11, the direction of the movements of the TCD may be arbitrary depending upon, for example, the position of threaded rod 11 to which the TCD is engaged. However, if the TCD is only to be used in a vertical position, the weight of the segments, as directed along the surfaces of the housing, is typically sufficient to maintain adequate contact with the threaded rod. That is, for vertical operation the springs holding the nut segments against the threaded rod can become optional and can be omitted in some embodiments of the present invention.

In one embodiment, the TCD will ratchet whenever the TCD is moved along threaded rod 11 a minimum of one quarter (¼) of a thread pitch in the ratcheting direction. That is, when the TCD moves one quarter of a thread pitch one of the segment pairs will ratchet such that if forces try to move the nut assembly in the opposite non-ratcheting direction, a minimum of one nut segment will lock up and prevent motion in the opposite direction with respect to threaded rod 11. To implement ¼ thread ratcheting four identical nut segments are arranged in all four positions (for example, nut segments 214 in NSA-III shown in FIG. 52).

We describe detailed functioning of a TCD by reference to FIG. 53, FIG. 54, FIG. 55, FIG. 56 and FIG. 57. However, this is by way of illustration and not limitation as other TCD embodiments function in a similar manner. Differences in mode of operation for different TCD embodiments will be noted when present.

Referring to FIGS. 52-57, each of the four nut segments are driven upwards and outward at a 30 degree angle relative to central axis 8 as a result of nut segment top right and left surfaces 234 and 235 contacting ramps 252 and 253 as threaded rod 11 is pushed upward, for example, by seismic movement or wind that cause building overturning moments. Overturning moments typically cause a structure to move up and down with respect to its foundation. In this case with enough linear segment movement in directions 260 and/or movement 262 (FIG. 57) nut segments 214 will completely disengage threaded rod 11 threads, and re-engage when the next rod thread moves into position to allow the four segments 214 to move toward rod 11 center and re-engage the threads of threaded rod 11.

On the other hand, if the forces reverse in direction and threaded rod 11 is driven down (or TCD 222 driven up), nut segments 214 will be driven toward threaded rod 11, and the threads will stay engaged as long as the downward force exists because of the inward radial force pushing segments 214 toward threaded rod 11. The inward radial force is generated by (see FIGS. 48, 49 and 50) the inner bearing surfaces 246 and 248 of end housing 210 contacting outer segment surfaces 238 and 236 respectively of a segment. Also to be considered is the outward radial force caused by the interaction of thread flanks of rod 11 against the flanks of segment thread 258, the upper thread flank 258A and lower thread flank 258B, as depicted in FIG. 56 for example. The inward radial force relative to axis 8 on segments 214 overcomes the outward radial force on segments 214 as long as the thread flanks 258A and 258B included angle remains 60 degrees (the standard flank angle for American Standard and Metric threads) and the angle of surfaces 246, 248, 238 and 236 remain substantially 30 degrees relative to axis 8 and the forces pulling rod 11 downward relative to TCD 222 ("reversing forces") are in effect. The resultant inward forward force keeps the segments 214 engaged with threaded rod 11.

Moreover, in one embodiment of the present invention, the material for nut segments 214 is advantageously chosen so as to have a yield point greater than or equal to that of the material of threaded rod 11. Even when the yield points are similar for the materials of threaded rod 11 and segments 214, and one segment 214 begins plastic deformation, as soon as threaded rod 11 moves, other segments 214 engage threaded rod 11 to overcome the strength of threaded rod 11.

Alternatively, the material for nut segments 214, may have a yield point substantially lower than that for threaded rod 11, in which case threaded rod 11 will still fail (i.e., give way or break) before TCD 222 is compromised if there is sufficient length of thread engagement.

Moreover, coil spring 20 in some embodiments is chosen so as to have sufficient tension to cause nut segments 214 to close around threaded rod 11 even in the case where the gravitational force is pulling nut segments 214 away from threaded rod 11 (for example, in the case where TCD 222 is inverted).

Referring to FIG. 57, the directional arrows 260 and 262 illustrate the manner in which nut segments 214 are configured to move when the TCD moves in the ratcheting direction with respect to threaded rod 11.

Referring to FIG. 48, FIG. 49, and FIG. 51, segments 214, the engagement of ribs 240 and slots 244 provide linear guidance and transfer torque to nut segments 214. The ribs 240 and slots 244 are advantageously configured to engage one another. Ribs 240 are on segments 214. The matching slots 244 are on end housing 210. When torque is applied to end housing 210 this torque is transmitted to segments 214 through slot 244 engaging rib 240. Additionally, the ribs and slots also guide the radial motion engagement of TCD 222 to threaded rod 11. Torque may be applied to end housing 210 through top housing 212.

Referring to FIGS. 46-53 and FIG. 57 torque is transmitted from the top housing 212 to end housing 210 through tab holes 216 on top housing 212 engaging tabs 218 on end housing 210. Torque is also transmitted directly from top housing to segments by center rib 254 (FIG. 53) engaging segment slot 232. The tab holes 216 and tabs 218 also perform a fastening function and facilitate automatic assembly of the top housing 212 to the end housing 210. During final assembly the top housing tab holes 216 are aligned over the end housing tabs 218 and then the top housing 212 is pushed down over the end housing 210. The tabs 218 force the top housing 210 wall outward over the tabs 218 until the downward motion of the top housing 210 allows the tabs 218 to snap into the tab holes 216. The top housing 212 now cannot be removed from the end housing 210 without damage to the top housing 212. This accomplishes the final assembly of the TCD 222 without the use of other fasteners.

Referring to FIGS. 50 and 53 a conical lead-in 256 is advantageously used to guide the TCD 222 over the threaded rod 11 upon initial engagement of TCD 222 to the end of threaded rod 11. The conical lead-in 256 causes the installation of TCD 222 to be quick and easy as the conical lead-in 256 guides the end of threaded rod 11 to the center of TCD 222 and to the bottom of nut segments 214. The nut segments 214 then move as depicted FIG. 57 as previously described.

With respect to top housing 212, it should be noted that some embodiments of this invention call for torque to be applied to housing 212 to tighten or loosen TCD 222 with respect to threaded rod 11. Application of torque is typically applied with a wrench engaging exterior surfaces of a housing equivalent to top housing 212, optionally with the addition of exterior "flats" to facilitate gripping by a wrench or other device. The use of exterior flats is included within the scope of some embodiments of the present invention.

While the previous description related chiefly to TCD 222, a similar description applies to TCD 10.

Referring to FIG. 1 TCD 10 may be configured to move along threaded rod 11 in one direction without rotation of TCD 10 (the ratcheting direction), and to not move in the opposite direction without rotation (the non-ratcheting direction). In particular, in accordance with some embodiments of the present invention, TCD 10 is configured to be engaged to threaded rod 11 such that a single downward hand movement of TCD 10 down the length of threaded rod 11 will correspondingly move TCD 10 in the ratcheting direction, to a predetermined position on threaded rod 11. Once in place, an upward hand movement of TCD 10 along the length of threaded rod 11 will be met with an equal and opposite force such that TCD 10 will not move in the non-ratcheting direction. Rather, in order to move TCD 10 in the upward direction of threaded rod 11, TCD 10 is rotated along the threads of threaded rod 11. The most common configuration with respect to TCD 10 engaged to a vertical threaded rod 11 is where a clockwise rotation of TCD 10 will advance TCD 10 downward with respect to threaded rod 11 and a counter-clock wise rotation of TCD will advance TCD upward with respect to threaded rod 11.

It should be noted that while the above description is discussed with respect to upward and downward hand movements of TCD 10 along the length of threaded rod 11, the direction of the movements of TCD 10 may be arbitrary depending upon, for example, the position of threaded rod 11 to which TCD is engaged.

In one embodiment, TCD 10 will ratchet whenever TCD 10 is moved along threaded rod 11 a minimum of one half (½) of a thread pitch in the ratcheting direction. That is, when TCD 10 moves one half of a thread pitch one of the segment pairs will ratchet such that if forces try to move the nut assembly in the opposite non-ratcheting direction, one nut segment pair will lock up and prevent motion in the opposite direction with respect to threaded rod 11. To implement ½ thread ratcheting, segments 16A, 16B, 16C and 16D are arranged so that two opposing nut segments have threads that are 180 degrees out of thread phase from the remaining two opposing nut segments (NSA-II shown in FIG. 11). Referring to FIG. 11, it is shown this is accomplished by exchanging the position in nut segment assembly of any two non-adjoining nut segments, but two and only two can be exchanged in any one 4 segment assembly. (Thus 16A and 16C could be exchanged or 16B and 16D could be exchanged). In this configuration one or the other of the nut segment pairs 16A and 16C or 16B and 16D will ratchet each time the rod 11 moves one half a thread pitch in the ratcheting direction with respect to TCD 10.

In particular, with respect to FIG. 13 through FIG. 18, each of the four segments 16A, 16B, 16C and 16D are driven upwards and outward at a 30 degree angle relative to central axis 8 as a result of surface 36 (FIGS. 13 and 14 show the edge of ramp 34) contacting ramp 34 as threaded rod 11 is pushed upward (for example, by seismic movement or wind that cause building overturning moments. Overturning moments cause a structure to move up and down with respect to its foundation). In this case with enough linear segment movement 56 and/or movement 58 (FIG. 18) segments 16A, 16B, 16C and 16D will completely disengage threaded rod 11 threads, and re-engage when the next rod thread moves into position to allow the four segments 16A, 16B, 16C and 16D to move toward rod 11 center and re-engage the threads of threaded rod 11.

On the other hand, if the forces reverse in direction and threaded rod 11 is driven down (or TCD 10 driven up), nut segments 16A, 16B, 16C and 16D will be driven toward threaded rod 11, and the threads will stay engaged as long as the downward force exists because of the inward radial force pushing segment 16A, 16B, 16C and 16D toward threaded rod 11. The inward radial force is generated by (see FIGS. 5, 6 and 7) surfaces 40 and 41 contacting surfaces 48 and 50 of end housing 12. Also to be considered is the outward radial force caused by the interaction of thread flanks of rod 11 against segment thread 52 flank. The inward radial force relative to axis 8 on segments 16A, 16B, 16C and 16D overcomes the outward radial force on segments 16A, 16B, 16C and 16D as long as the thread flank included angle remains 60 degrees (the standard flank angle for American Standard and Metric threads) and the angle of surfaces 40, 41, 48 and 50 remain substantially 30 degrees relative to axis 8 and the reversing forces are in effect. The resultant inward forward force keeps the segments 16A, 16B, 16C and 16D engaged with threaded rod 11.

Moreover, in some embodiments of the present invention, the material for nut segments 16A, 16B, 16C and 16D is chosen so as to have a yield point greater than or equal to the material for threaded rod 11. Even when the yield points are similar between the materials for threaded rod 11 and segments 16A, 16B, 16C and 16D, and one of segment 16A, 16B, 16C and 16D start plastic deformation, as soon as threaded rod 11 moves, other segments 16A, 16B, 16C and 16D will start to engage to overcome the strength of threaded rod 11.

Alternatively, the material for nut segments 16A, 16B, 16C and 16D, may have a yield point substantially lower than that for threaded rod 11, in which case threaded rod 11 will still fail (i.e., give way or break off) before TCD 10 is compromised if there is sufficient length of thread engagement.

Moreover, coil springs 20 and 18 in one embodiment are configured to have sufficient tension to cause nut segments 16A, 16B, 16C and 16D to close around threaded rod 11 even in the case where the gravitational force is pulling nut segments 16A, 16B, 16C and 16D away from threaded rod 11 (for example, in the case where TCD 10 is inverted). Indeed, if nut segments 16A, 16B, 16C and 16D are not driven to threaded rod 11 center by coil springs 20 and 18 force, nut segments 16A, 16B, 16C and 16D, may move to the outside top housing 14 wall and remain in that position resulting in TCD 10 not engaging with threaded rod 11.

The example shown in FIG. 9 depicts that nut segments 16A, 16B, 16C and 16D are comprised of four individual, substantially equal sized segments (defined as nut segment assembly NSA-I) held together by coil spring 20 and 18 such that each of the four individual segments engage to substantially the same axial position on threaded rod 11. In this embodiment each segment is not geometrically equal to the other. All four segments in this assembly are physically different in thread phase. Since a thread advances axially one thread pitch for each revolution of the thread, each segment must have its respective thread at a different axial position than any of the other three segments. Each segment has its thread phase one quarter of a thread pitch in difference than an adjoining segment. In this embodiment segments 16A, 16B, 16C and 16D will ratchet approximately at the same moment each time the rod 11 moves one thread pitch in the ratcheting direction with respect to TCD 10.

Referring to the FIG. 11, the directional arrows 56 and 58 shown in FIG. 18 illustrate the manner in which nut segments 16A, 16B, 16C and 16D are configured to move when TCD 10 moves in the ratcheting direction with respect to threaded rod 11.

Referring to FIG. 5 through FIG. 10, FIG. 15 and FIG. 16 segments 16A, 16B, 16C and 16D, the engagement of ribs 46 and slots 38 provide linear guidance and torque to nut segments 16A, 16B, 16C and 16D. The ribs 46 and slots 38 are configured to engage each other. Ribs 46 are on segments 16A, 16B, 16C and 16D. The matching slots 38 are on end housing 12. When torque is applied to end housing 12, this torque is transmitted to segments 16A, 16B, 16C and 16D through slot 38 engaging rib 46. Additionally, the ribs and slots also guide the radial motion engagement of TCD 10 to threaded rod 11. Torque may be applied to end housing 12 through top housing 14 and fasteners 22.

With respect to top housing 14, it should be noted that some embodiments of this invention call for torque to be applied to housing 14 to tighten or loosen TCD 10 with respect to threaded rod 11. Application of torque is typically applied with a wrench or other tool engaging exterior surfaces of a housing equivalent to top housing 14, optionally with the addition of exterior flats.

It is found that the nut segment ribs and slots described herein (for example, 46, 38 respectively in FIG. 5) can be useful in some applications for guiding the motion of the segments, but are not inherently necessary in all embodiments of the present invention. The flat surfaces adjacent to the ribs and slots are in contact, and remain in contact throughout the motion of the segments towards or away from the threaded rod, that is, the directions indicated by arrows 56, 58 in FIG. 18, 82 in FIG. 25 or 144 in FIG. 32. In some embodiments, it is found that special guidance as provided by ribs and slots is not necessary for adequate performance of the TCD and can be omitted. An example of such a device is depicted in FIG. 60 in which segment surfaces 300 are shown to lack ribs.

The inner bearing surfaces of the bottom end housing (or "base") 301 (corresponding to bottom end housing 12) advantageously are flat planar surfaces lacking slots, making intimate planar contact with the corresponding flat surfaces of the segment, 300. It is anticipated that the fabrication of bottom end housing units with flat inner bearing surfaces will the easiest, least expensive and, therefore, the most advantageous bottom end housing geometry. However, bottom end housing units with inner bearing surfaces having slots therein are expected to slide readily over the flat segment surfaces 300, permitting one to use flat segment surfaces 300 in conjunction with slotted inner bearing surfaces. This feature may prove useful for using up an inventory of slotted base units when flat segments are employed, or for retrofitting TCDs having slots and ridges with segments lacking ridges, thereby avoiding the need to retrofit the bottom end housing units as well.

It is convenient, but not inherently necessary, that all segments of a TCD have ridges fitting into slots or flat segment surfaces sliding over flat (or slotted) inner base surfaces. So long as segments having ridges match slots, segments having ridges can be combined with segments lacking ridges in a single TCD.

TCDs using either ridges and slots (FIGS. 1-59), or the embodiment having only flat surfaces in contact FIG. 60) can both be used in numerous ways and in numerous devices. We provide herein several examples of applications making use of TCDs recognizing that either embodiments with slots and ridges, or embodiments lacking slots and ridges can be employed. However, to be definite in our discussion, we discuss, depict and describe the embodiments having slots and ridges, recognizing that use of embodiments lacking slots and ridges is straight-forward and apparent to one having ordinary skills in the art.

The TCDs pursuant to some embodiments of the present invention can be used as the basis for a coupler, multi nut TCD, quick release TCD, TCD with mechanical clip attachment, TCD with magnetic attachment as described in the following. To be concrete in our description, we describe these structures and uses in connection chiefly with TCD 10. But this is by way of illustration and not limitation as other embodiments of TCDs as described herein can also be used in connection with such devices.

Coupler

FIGS. 22-28 depict embodiments of the present invention including an optional coupler or coupler assembly.

FIG. 22 is a top perspective view of coupler 60 with top threaded rod 76 and bottom threaded rod 74 depicted without the rods inserted into coupler 60.

FIG. 23 is a top perspective view of coupler 60 with top threaded rod 76 and bottom threaded rod 74 depicted with rods 76 and 74 inserted into coupler 60.

FIG. 24 is a sliced cross section view of the coupler assembly in accordance with some embodiments of the present invention. A housing body (or housing) 62 is engaged at each end portion to a respective end housing 64. Each of the two end housings 64 are engaged to the respective ends of the housing body 62 by attachment fasteners 68 such as those described above. Additionally, also shown in FIG. 24 is pin 66 mounted through the housing body 62 and center plug 86 of the coupler 60. Also shown are segments 72A, 72B and 72C resting against the surfaces of end housing 64 and under surfaces of center plug 86. A full complement of nut segments 72A, 72B, 72C and 72D plus springs 18 and 20 are defined as segment assembly NSA-V. Coil springs 18 and 20 are shown residing in segments 72A, 72B and 73C. The coupler assembly is symmetrical about a plane that is perpendicular to the axis of threaded rods 74 and 76 (FIG. 23) and bisects pin 66. That is, if the rod axis is the y-axis of a normal right-handed coordinate system, the symmetry plane is the (x,z) plane. Segments 88A, 88B, 88C and 88D plus springs 18 and 20 are defined as assembly NSA-VI and are mirror images of segment assembly NSA-V in the coupler assembly 60. Segments 88 are physically the same as segments 72. All features described above in the lower half of coupler 60 appear in the upper half as mirror images in coupler 60. Also shown in FIG. 24 is a center plug 86 which is configured to receive threaded rod 74 and rod 76 into hole 120. Holes 120 in center plug 86 are advantageously slightly smaller in diameter than the outer diameter of the threaded rods.

FIG. 25 is a cross sectional view of the coupler assembly engaged with two threaded rods depicting movements of segments 72A, 72B, 72C and 72D and segments 88A, 88B, 88C and 88D and threaded rod movements pursuant to some embodiments of the present invention. Referring to the figure, the directional arrows as shown illustrate the directional movements of the various components of the coupler 60.

FIG. 26 is a three dimensional perspective view of the components of the coupler assembly and pin 66 exploded or disassembled. This illustration shows that the coupler is comprised of two sets of nut segments 72A, 72B, 72C and 72D and segments 88A, 88B, 88C and 88D, assembled back to back in housing 62. Nut segments 72A, 72B, 72C and 72D comprise Nut Segment Assembly V (NSA-V) and are shown also exploded radially. Nut segments 88A, 88B, 88C and 88D comprise Nut Segment Assembly VI (NSA-VI) and are shown in their operating configuration. Nut segment assemblies V and VI are separated by center plug 86. Center plug 86 is retained in housing body 62 by pin 66 which passes through hole 96 and hole 97. At each end of plug 86 are bearing surfaces 104 and 106 separated by rib 80. Surfaces 104, 106 and rib 80 comprise a feature set. There are eight sets of surfaces 104 and 106 and rib 80. Four sets are at one end and four sets at the opposite end of plug 86. The feature sets are geometrically arranged similarly as slot 38, surface 40 and 41 shown in FIG. 6 if viewed from the end of plug 86. At each end of housing 62 end housings 64 are shown attachment fasteners 68, clearance holes 94 and threaded hole 98 in housing 62.

FIG. 27 is a three dimensional outer perspective view of one segment of segments 72A, 72B, 72C and 72D (NSA-V) and segments 88A, 88B, 88C and 88D (NSA-VI) shown in coupler 60, quick release TCD 122 and multi nut TCD 100. The "quick release" TCD and the "multi nut" TCD are described in detail elsewhere herein. Shown in this illustration are upper spring groove 114, lower spring groove 116, left bearing surface 108, right bearing surface 110, rib 112 and slot 102.

FIG. 28 is a three dimensional inner perspective view of one of the segments 72A, 72B, 72C or 72D or segments 88A, 88B, 88C or 88D as in coupler 60, quick release TCD 122 or multi nut TCD 100. Also shown are surface 90, surface 92, slot 102, upper spring groove 114, lower spring groove 116, optional spring groove 118 and segment thread 52.

Referring to FIG. 23 and FIG. 24, coupler 60 can have a configuration so as to engage one or two threaded rods 74 and/or 76. As with TCD 10, coupler 60 may move along threaded rod 74 and/or 76 in one direction without rotation of coupler 60, and not move in the opposite direction without rotation. For the purposes of describing coupler 60 and other embodiments the direction of motion whereby coupler moves along threaded rods 74 and/or 76 without rotation shall be defined as the ratcheting direction and the opposite direction of motion as the non-ratcheting direction. Threaded rod 74 and/or 76 may be inserted into opening 126 at either end of coupler 60. The insertion may continue until rod 74 and/or 76 fills hole 120 in center plug 86. Verification of sufficient insertion of rod 74 and/or 76 may be observed through inspection holes 140 and 141 (see FIGS. 22, 23, 24, and 26). Inspection holes 140 and 141 are aligned to allow viewing through housing body 62 and center plug 86. Now referring to FIG. 24. hole 120 is advantageously taken to be slightly smaller than rod 74 and/or 76 in outside diameter to provide locking friction between center plug 86 and rods 74 and/or 76. The housing body (or body) 62 is typically constructed of steel as is rod 74 and/or 76. The center plug 86 is typically constructed of a polymer such as nylon so as to deform under the force of rod insertion and provide a locking friction to rod 74 and/or 76.

In these embodiments, coupler 60 will typically ratchet whenever rod 74 and/or 76 is moved along a minimum of one (1) thread pitch in the ratcheting direction until rod 74 and/or 76 bottoms in hole 120. More specifically referring to FIG. 25, the vertical arrows 78 and 84 illustrate the movement of threaded rod 74 and rod 76, while the angled arrows 82 illustrate the movement of nut segments 72A, 72B, 72C and 72D and segments 88A, 88B, 88C and 88D inward and outward, respectively relative to the movement of the threaded rod 74 and rod 76.

Comparing FIG. 27 and FIG. 16, the similarities between segments 72A, 72B, 72C, 72D, segments 88A, 88B, 88C and 88D and segments 16A, 16B, 16C and 16D are shown as follows: In FIG. 16 left outer segment surface 48, right outer segment surface 50, nut segment rib 46, segment lower spring groove 44 and segment upper spring groove 42 are equivalent and identical in function to (now refer to FIG. 27) surface 108, surface 110, rib 112, lower spring groove 116 and upper spring groove 114.

Comparing FIG. 28 and to FIG. 17, the similarities between segments 72A, 72B, 72C, 72D, segments 88A, 88B, 88C and 88D and segments 16A, 16B, 16C and 16D are shown as follows: In FIG. 17 inner sloping surface 36 is equivalent and identical in function to (now refer to FIG. 28). Surfaces 90 and surface 92. Surface 90 and 92 are in the same plane separated by slot 102.

The difference between segments 16A, 16B, 16C and 16D and segments 72A, 72B, 72C, 72D, segments 88A, 88B, 88C, 88D is that there is no slot 102 on surface 36 (see FIG. 15).

Segments 16A, 16B, 16C and 16D are not stackable (stackable means one can nest on top of the other), segments 72A, 72B, 72C, 72D, segments 88A, 88B, 88C, 88D are stackable.

In particular with respect to FIGS. 24, 25 and 26, each of the segments 72A, 72B, 72C, 72D, segments 88A, 88B, 88C, 88D are driven towards coupler 60 midpoint and outward at a 30 degree angle relative to central axis 8 as a result of surface 90 and 92 (FIGS. 26 and 28) contacting surface 106 and 104 (FIG. 26) as threaded rod 74 and/or 76 is pushed inward as shown in FIG. 25 by arrows 78 and 84. In this case with enough linear segment movement 82 (FIG. 25) segments 72A, 72B, 72C, 72D, segments 88A, 88B, 88C, 88D will completely disengage threaded rod 74 and/or 76 threads, and re-engage when the next rod thread moves into position to allow segments 72A, 72B, 72C, 72D, segments 88A, 88B, 88C, 88D to move toward rod 74 and/or 76 center and re-engage the threads of threaded rod 74 and/or 76.

On the other hand, if the forces reverse in direction and threaded rod 74 and/or 76 is axially pulled outward with respect to coupler 60, segments 72A, 72B, 72C, 72D, segments 88A, 88B, 88C, 88D will be driven toward threaded rod 74 and/or 76 axis 8, and the threads will stay engaged as long as the axial outward force exists because of the inward radial force pushing segments 72A, 72B, 72C, 72D, segments 88A, 88B, 88C, 88D toward threaded rod 74 and/or 76. The inward radial force is generated by (see FIGS. 26 and 27) surfaces 108 and 110 contacting surfaces 130 and 128 of end housing 64. Also present is the outward radial force caused by the interaction of thread flanks of rod 74 and/or 76 against segment thread flank 52 (FIG. 28). The inward radial force relative to axis 8 segments 72A, 72B, 72C, 72D, segments 88A, 88B, 88C, 88D overcomes the outward radial force on segments 72A, 72B, 72C, 72D, segments 88A, 88B, 88C, 88D as long as the thread-included flank angle remains approximately 60 degrees (the standard flank angle for American Standard and Metric threads) and the angle of surfaces 90, 92, 104, 106, 108, 110, 128 and 130 remain substantially 30 degrees relative to axis 8 and the reversing forces are in effect. The resultant inward forward force keeps segments 72A, 72B, 72C, 72D, segments 88A, 88B, 88C, 88D engaged against threaded rod 74 and/or 76. Referring to FIG. 26 when torque is applied to end housing 64 this torque is transmitted to segments 72A, 72B, 72C, 72D and 88A, 88B, 88C, 88D through slot 132 engaging rib 112 (FIG. 28) Additionally, the ribs and slots also guide the radial motion engagement of segments contained within coupler 60 to threaded rod 74 and/or 76.

Multi Nut TCD

FIG. 29 illustrates a perspective view of a multi-nut TCD 100 engaged to threaded rod 11 in accordance with some embodiments of the present invention. There is a housing body 136, engaged at the upper end to top housing 138 and at the lower end to an end housing 134. Each of the two housings 134 and 136 are attached to the respective ends of the housing body 136 by attachment fasteners 68 typically of the type as previously described.

FIG. 30 is a three dimensional perspective view of the components of TCD 100 assembly exploded or disassembled. This illustration shows TCD 100 comprised of two sets of nut segments 72A, 72B, 72C and 72D one on top (nested) of the other in housing 136. The bottom nut segment assembly is defined as assembly 73 and the upper nut segment assembly is defined as assembly 75. (Also referred to herein as "segment assemblies," "nut assemblies," or "assemblies.) Both nut segment assemblies 73 and 75 are supported at the bottom by end housing 134. Each nut segment assembly 73 and 75 is encircled by springs 18 and 20 (not shown in FIG. 30). Also a retaining ring 142 resides in a groove 148 (see FIG. 32) in end housing 134.

FIG. 31 is a sliced cross section view of TCD 100 in accordance with some embodiments of the present invention. Housing body 136 (depicted as sliced in half) is engaged at each end portion to end housing 134 (depicted as sliced in half) and at the other end a top housing 138 (depicted as sliced in half). End housing 134 and top housing 138 are attached to housing body 136 by attachment fasteners 68 such as those described above. Also shown are segment assemblies 73 and 75. The segment assemblies are nested one on top of the other. The lower segment assembly 73 is supported by end housing 134 and the upper segment assembly 75 is supported by the upper surfaces of assembly 73. Coil spring 20 is shown residing in segments 72A, 72B and 73C. Coil spring 18 is also present as shown in FIG. 15, but cannot be seen in this FIG. 31.

FIG. 32 is a cross sectional view of TCD 100 engaged with threaded rod 11 illustrating movements of segments 72A, 72B, 72C and 72D, upper assembly 75 and lower assembly 73, and threaded rod movements, in accordance with some embodiments of the present invention. Directional arrows 144 and 146 illustrate the directional movements of the various segments of TCD 100. More specifically, the vertical arrow 146 illustrates the movement of the threaded rod 11, while the angled arrows illustrate the movement of nut segments 72A, 72B, 72C and 72D and segments 88A, 88B, 88C and 88D inward and outward, respectively relative to the movement of the threaded rod 11.

TCD 100 typically has a configuration so as to move along threaded rod 11 in one direction without rotation of TCD 100, and to not move in the opposite direction without rotation. For the purposes of describing TCD 100 and related embodiments, the direction of motion whereby TCD moves along threaded rod 11 without rotation shall be defined as the ratcheting direction and the opposite direction of motion as the non-ratcheting direction. In particular, in accordance with some embodiments of the present invention, TCD 100 may be configured to be engaged to threaded rod 11 such that a single downward hand movement of TCD 100 down the length of threaded rod 11 will correspondingly move TCD 100 in the ratcheting direction to a predetermined position on threaded rod 11. Once in place, an upward hand movement of TCD 100 along the length of threaded rod 11 will be met with an equal and opposite force such that TCD 100 will not move in the non-ratcheting direction. Rather, in order to move TCD 100 in the upward direction of threaded rod 11, TCD 100 is rotated along the threads of threaded rod 11. The most common configuration with respect to TCD 100 engaged to a vertical threaded rod 11 is that in which a clockwise rotation of TCD 100 will advance TCD 100 downward with respect to threaded rod 11 and a counter-clockwise rotation of TCD will advance TCD upward with respect to threaded rod 11.

The segment assemblies 73 and 75 within TCD 100 operate with rod 11 in the same manner as NSA-II in TCD 10 described previously. TCD 10 is a single nut segment assembly NSA-II (FIG. 15) where TCD 100 has two segment assemblies 73 and 75 (FIG. 30) stacked or nested one on top of the other. Because assemblies 73 and 75 are stacked the top surfaces of each segment has a slot 102 (FIGS. 27 and 28) in the top surfaces 90 and 92 to interface with rib 112. Assemblies 18 and 19 do not have slot 112. The ability to stack the segment assemblies offers the ability to strengthen thread engagement and to offer more thread phasing options with respect to rod 11 engagement. By altering the thread phasing within a segment assembly and between segment assemblies in a stack one can cause the TCD to ratchet with less motion along the rod 11. Although only two nut segment assemblies are shown stacked (FIGS. 30 and 31), this is by way of illustration and not limitation as several such assemblies can be stacked within the scope of the present invention.

Quick Release TCD

FIGS. 33-35 depict a typical TCD with quick release mechanism in accordance with some embodiments of the present invention. A TCD with release mechanism, denoted by 122, includes a top cap (or "cap") 162 mounted to the modified top housing (or "top housing") 156 and secured by a crescent ring 160. The top housing 156 is attached to housing body (or "housing") 154 with fasteners 68. Also shown is end housing 152 attached to the opposite end of housing body 154 with fasteners 68. TCD 122 is similar to TCD 100 with the following modifications. Wire posts 164A, 164B, 164C, 164D have been added. The top cap 162 has been added above the top housing 156 and top housing 156 has been modified with a post (or "top housing post") 124 such that cap 162 can rotate about the top housing post 124 and cause the wire posts 164A, 164B, 164C, 164D to rotate 90 degrees upon a rotation of the cap 162 by approximately 25 degrees.

FIG. 34 is a three dimensional perspective view of TCD 122 with release mechanism in the released position. FIG. 35 is a three dimensional perspective view of the components of TCD 122 assembly exploded or disassembled. This illustration shows that TCD 122 is typically comprised of two nut segment assemblies 73 and 75, one on top (nested) of the other in housing 154. Both nut segment assemblies 73 and 75 are supported at the bottom by end housing 152. Each nut segment assembly 73 and 75 is typically encircled by springs. Also a retaining ring 158 resides in groove 168 in top housing 156. More specifically, in the unreleased (i.e., normal) position, the wavy portion of the wire posts 164A, 164B, 164C, 164D reside between nut segments 72A, 72B, 72C and 72D as shown in FIG. 36. FIG. 36 is a top view of TCD with release mechanism in normal (unreleased) position. FIG. 37 is a top view of TCD 122 with release mechanism in the release position. Referring to FIGS. 36 and 37, the four wire posts 164 A-D are positioned relatively equidistant around upper nut segment assembly 75

In the manner described above, in accordance with some embodiments of the present invention, by incorporating wire posts between upper and lower nut segment assemblies 73 and 75 of TCD 122, TCD 122 may be configured for quick release from its engaged position. More specifically, pursuant to some embodiments, upper and lower nut segment assemblies 73, 75 of TCD 122 are configured so that the space between nut segments is wide enough to accommodate the wire posts. Further, a top housing post 124 is included in top housing 156, while holes are present in top housing 156 to accommodate wire posts. Similarly, in some embodiments, holes are also present in end housing 152 to provide a bearing for the other end of the wire posts. 164A-164D.

FIG. 38 illustrates how wire posts 164A, 164B, 164C and 164D are typically retained by top cap 162 and end housing 152. FIG. 38 is a bottom perspective view of TCD 122 with top housing 156, housing 154 and nut segment assemblies 75 and 73 removed to clearly show the under side of cap 162 and specifically pocket 172A, 172B, 172C and 172D and pocket hole 174B. Only pocket hole 174B is visible in the figure along with wire post 164B entering hole 174B. However each pocket 172 has a corresponding pocket hole 174. Also shown is end housing 152 sliced in half revealing post end bearings (or simply "bearings") 176A, 176C, and 176D. In the fully assembled TCD 122 bearings 176A, 176B, 176C and 176D reside in holes 170A, 170B, 170C and 170D respectively.

Referring to FIGS. 36, 37, 38, as nut segments 72A, 72B, 72C and 72D move in and out due to the ratcheting operation described previously, the space between nut segments 72A, 72B, 72C and 72D gets larger and smaller. With the rotation of top cap 162 by approximately 25 degrees, the wire posts 164A, 164B, 164C, 164D in turn are configured to rotate through a rotation angle of approximately 90 degrees. In this case, the wavy portion of the wire posts 164A, 164B, 164C, 164D occupy approximately twice the space and prevent nut segments 72A, 72B, 72C and 72D from closing (i.e., returning to the center position and engaging rod 11) after they open during the normal TCD operation described above. Once open, the nut segments remain open and TCD 122 (with the release mechanism) may be readily removed from threaded rod 11.

In the manner described above, in accordance with some embodiments of the present invention, by incorporating wire posts between upper and lower nut segment assemblies 73 and 75 of TCD 122, TCD 122 may be configured for quick release from its engaged position. More specifically, in some embodiments, upper and lower nut segments 72A, 72B, 72C and 72D of TCD 122 have a configuration so that the space between nut segments becomes wide slot 178 shown in FIG. 37 to accommodate the wire posts 164A, 164B, 164C, 164D, and further, a post 124 is present in top housing 156, while holes 166A, 166B, 166C, 166D are present in top housing 156 to accommodate wire posts 164A, 164B, 164C, 164D. Similarly referring to FIG. 38. in some embodiments, holes 170A, 170B, 170C, 170D are present in end housing 152 to provide a support for post end bearing 176A, 176B, 176C, 176D.

TCD with Mechanical Clip Attachment

FIG. 39 is a top perspective view of TCD 100 and coupler 60 in the pre-installed configuration (that is, the components are in the act of being installed). Shown in this illustration is a shrinking medium (typically a wood structure) 32, a typical sheet metal commercial hold-down 186, hold-down bolts ("bolts") 188, connector clip ("clip") 184 and bottom and top threaded rods 74 and 76.

FIG. 40 is a top perspective close up view of TCD 100, clip 184 and hold-down 186 in the installed configuration. Also shown is end housing groove 190.

FIG. 39 shows the installation of TCD 100, connector clip 184 and coupler 60. In this configuration coupler 60 engages rod 74 and rod 76 providing a solid connection between the rods. Hold-down 186 has already been installed to wood 32 with bolts 188. Rod 76 is fed through hold-down hole 208 as it is installed in coupler 60. TCD 100 is then slid down rod 76 until TCD 100 engages hold-down 186.

Now referring to FIG. 40, clip 184 is then installed into end housing groove ("groove") 190 in TCD end housing 134 shown in FIG. 29 and under hold-down 186. TCD 100 is now coupled to wood 32 through hold-down 186. This combination of TCD 100, hold-down 186, clip 184 and threaded rods 74 and 76 comprise a self-adjusting shrinkage compensation device.

TCD with Magnetic Attachment

FIG. 41 is a top perspective close up view of TCD 100 wire clip 196, groove 190, and sliced one half view of magnet bracket ("bracket") 194 and ring magnet 192. Also shown is bracket slot 198. Bracket assembly 200 is comprised of bracket 194 and ring magnet 192 bonded to the internal diameter of bracket 194.

FIG. 42 is a top perspective close up view of TCD 100, wire clip 196, slot 198, bracket assembly (or "magnetic bracket assembly") 200, hold-down 186 and threaded rod 76. FIG. 43 is a top perspective view of TCD 100, magnetic bracket assembly 200 and attaching wire clip 196, steel tube (or other magnetic material) hold-down 206, end plate 204, cross bolts 202 through wood 32. Also shown is threaded rod 76.

FIG. 43 is similar to the functionally shown in FIG. 42, except the sheet metal hold-down 186 shown in FIG. 42 is changed to a commercially available steel tube 206 with welded end plate 204. Tube 206 and end plate 204 are shown with a pie shaped slice removed to reveal attaching cross bolts 202.

FIG. 41 shows TCD 100 and a sliced magnetic bracket assembly 200. Bracket 194 also has a slot 198 through which wire clip 196 will pass when attaching assembly 200 to TCD 100.

FIG. 42 shows TCD after it has been installed to hold-down 186 by clip 196 passing through slot 198 except, instead of a clip 184 making the connection, there is a magnetic assembly 200 attached to TCD 100. This combination of TCD 100, hold-down 186, clip 196, bracket assembly 200 and threaded rods 74 and 76 comprise a self-adjusting shrinkage compensation device.

FIG. 43 shows TCD 100 after it has been installed to steel tube hold-down 204/206 by clip 196 passing through slot 198 except, instead of a clip 184 making the connection, there is a magnetic assembly 200 attached to TCD 100. FIG. 43 is similar to FIG. 42 except that in FIG. 42 the commercial hold-down is a steel tube with a welded end plate attached to wood 32 with bolts 202. This combination of TCD 100, hold-down 204/206, clip 196, bracket assembly 200 and threaded rods 74 and 76 comprise a self-adjusting shrinkage compensation device.

Various other modifications and alterations in the structure and method of operation of this invention will be apparent to those skilled in the art without departing from the scope and spirit of the invention. Although the invention has been described in connection with specific embodiments, it should be understood that the invention should not be unduly limited to such specific embodiments.

Although various embodiments which incorporate the teachings of the present invention have been shown and described in detail herein, those skilled in the art can readily devise many other varied embodiments that still incorporate these teachings.

What is claimed is:

1. A thread clamping device comprising:
   a) a top end housing and a bottom end housing surrounding a plurality of movable nut segments wherein each of said movable nut segments has a threaded inner surface suited for engaging a threaded rod; and,
   wherein a substantially planar outer segment surface of each of said movable nut segments engages a substantially planar inner bearing surface of said bottom end housing making planar contact therewith; and,
   wherein a substantially planar inner sloping surface of each of said movable nut segments engages a substantially planar top housing ramp making planar contact therewith; and,
   wherein said substantially planar inner sloping surface is substantially parallel to said inner bearing surface; and
   b) at least one spring circumferentially disposed around said nut segments, flexibly directing said nut segments against said threaded rod; and,
   wherein said thread clamping device moves axially along said threaded rod in a first direction without rotation and does not so move in a second opposite direction without rotation.

2. A thread clamping device as in claim 1 further comprising:
   a ridge protruding from said substantially planar outer segment surface of each of said movable nut segments; and,
   a slot in said substantially planar inner bearing surface of said bottom end housing,
   wherein said ridge has a structure for engaging said slot and sliding therein.

3. A thread clamping device as in claim 1 having four of said movable nut segments.

4. A thread clamping device as in claim 1 wherein said threaded inner surfaces of said movable nut segments are capable of forming a continuous spiral thread with said nut segments in alignment.

5. A thread clamping device as in claim 1 wherein said movable nut segments are identical including identically phased threads on the inner surfaces of said nut segments.

* * * * *